United States Patent
Onoe et al.

(10) Patent No.: US 8,421,871 B2
(45) Date of Patent: Apr. 16, 2013

(54) METHOD AND APPARATUS FOR IMAGE PICKUP AND IMAGE PROCESSING

(75) Inventors: Naoyuki Onoe, Kanagawa (JP); Shingo Tsurumi, Saitama (JP); Junichi Yamashita, Saitama (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/558,262

(22) Filed: Sep. 11, 2009

(65) Prior Publication Data

US 2010/0073519 A1 Mar. 25, 2010

(30) Foreign Application Priority Data

Sep. 22, 2008 (JP) ................................ 2008-241925

(51) Int. Cl.
 *H04N 5/225* (2006.01)
(52) U.S. Cl.
 USPC ...................................................... 348/218.1
(58) Field of Classification Search .................. 348/36, 348/284, 222.1, 218.1; 382/284
 See application file for complete search history.

(56) References Cited

U.S. PATENT DOCUMENTS

| | | | |
|---|---|---|---|
| 5,469,274 A | 11/1995 | Iwasaki et al. | |
| 5,649,032 A | 7/1997 | Burt et al. | |
| 5,657,402 A | 8/1997 | Bender et al. | |
| 5,706,416 A | 1/1998 | Mann et al. | |
| 5,920,657 A | 7/1999 | Bender et al. | |
| 5,991,444 A * | 11/1999 | Burt et al. | 382/232 |
| 5,999,662 A | 12/1999 | Burt et al. | |
| 6,393,163 B1 | 5/2002 | Burt et al. | |
| RE38,401 E * | 1/2004 | Goldberg et al. | 715/720 |
| 6,677,981 B1 * | 1/2004 | Mancuso et al. | 348/36 |
| 6,895,126 B2 | 5/2005 | Di Bernardo et al. | |
| 7,327,494 B2 | 2/2008 | Aiso | |
| 7,373,017 B2 * | 5/2008 | Edwards et al. | 382/284 |
| 2002/0135672 A1 * | 9/2002 | Sezan et al. | 348/36 |

(Continued)

FOREIGN PATENT DOCUMENTS

| | | |
|---|---|---|
| JP | 5-260264 | 10/1993 |
| JP | 6-121226 | 4/1994 |

(Continued)

OTHER PUBLICATIONS

Yukinobu et al., PanoramaExcerpts: extracting and packing panoramas for video browsing, Multimedia 97 Proceedings of the fifth ACM international conference on Multimedia (1997).*

(Continued)

*Primary Examiner* — Nelson D. Hernández Hernández

(74) *Attorney, Agent, or Firm* — Oblon, Spivak, McClelland, Maier & Neustadt, L.L.P.

(57) ABSTRACT

An image processing apparatus includes: a first image storing unit that stores a first history image including a first picked-up image forming a picked-up moving image; an image transforming unit that transforms, on the basis of transformation information concerning the first picked-up image and a second picked-up image forming the picked-up moving image located after the first picked-up image on a time axis of the picked-up moving image, the second picked-up image; and an image combining unit that causes a second image storing unit different from the first image storing unit to store the transformed second picked-up image, overwrites the first history image stored in the first image storing unit on the second picked-up image stored in the second image storing unit, and combines the first history image and the second picked-up image.

16 Claims, 39 Drawing Sheets

U.S. PATENT DOCUMENTS

2007/0031062 A1* 2/2007 Pal et al. .................. 382/284
2007/0237423 A1* 10/2007 Tico et al. ................. 382/284
2008/0291201 A1* 11/2008 Lafon ....................... 345/427

FOREIGN PATENT DOCUMENTS

| | | |
|---|---|---|
| JP | 9-62861 | 3/1997 |
| JP | 10-32754 | 2/1998 |
| JP | 11-4398 | 1/1999 |
| JP | 11-120353 | 4/1999 |
| JP | 11-134352 | 5/1999 |
| JP | 11-289517 | 10/1999 |
| JP | 2000-244814 | 9/2000 |
| JP | 2002-359798 | 12/2002 |
| JP | 2004-222025 | 8/2004 |
| JP | 2004-266670 | 9/2004 |
| JP | 2005-217874 | 8/2005 |
| JP | 2007-183588 | 7/2007 |
| WO | WO 2005/032125 A1 | 4/2005 |

OTHER PUBLICATIONS

Office Action issued Jul. 30, 2010 in Japanese Application No. 2008-241925.

U.S. Appl. No. 12/565,499, filed Sep. 23, 2009, Tsurumi.

U.S. Appl. No. 13/486,209, filed Jun. 1, 2012, Tsurumi.

* cited by examiner

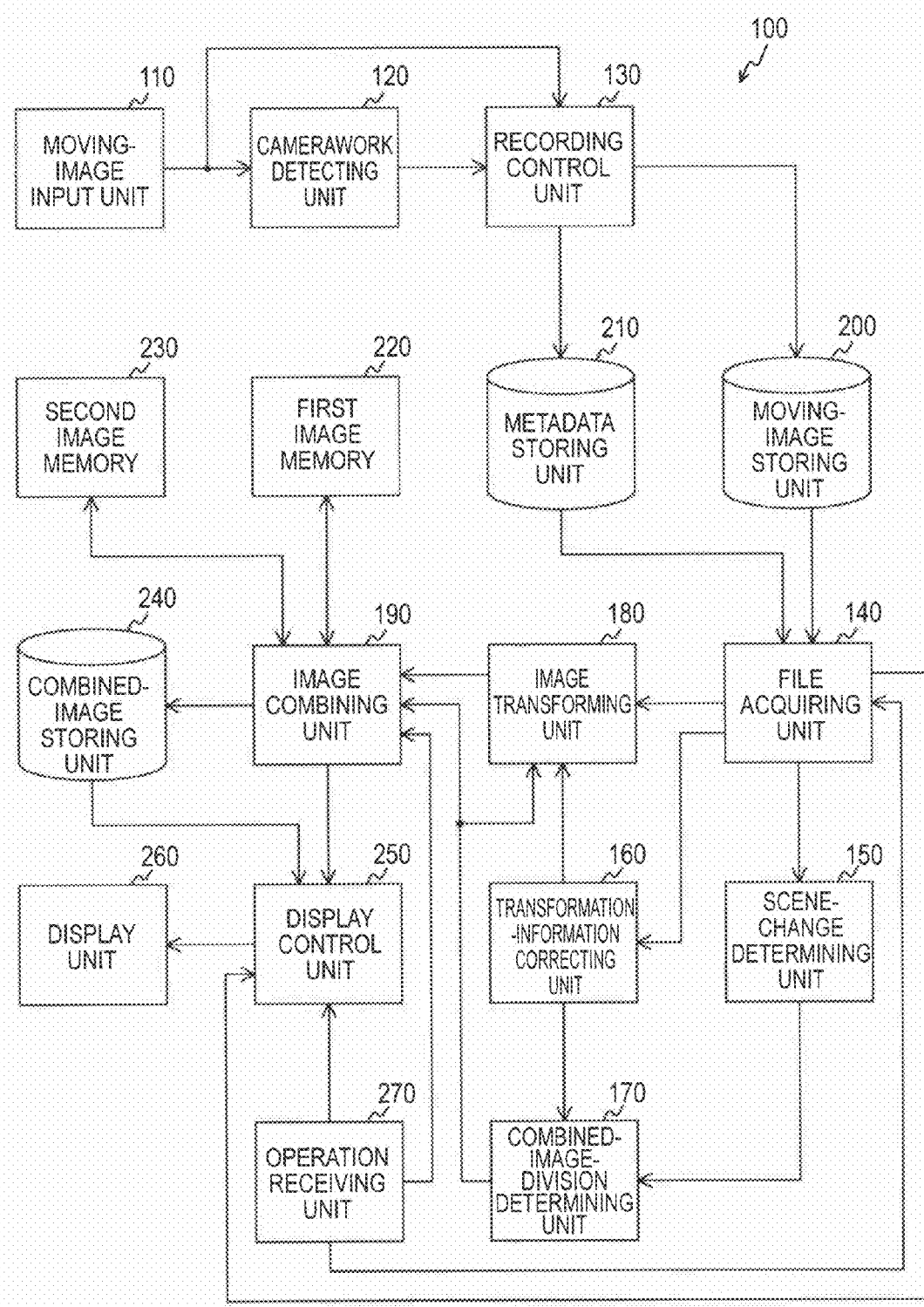

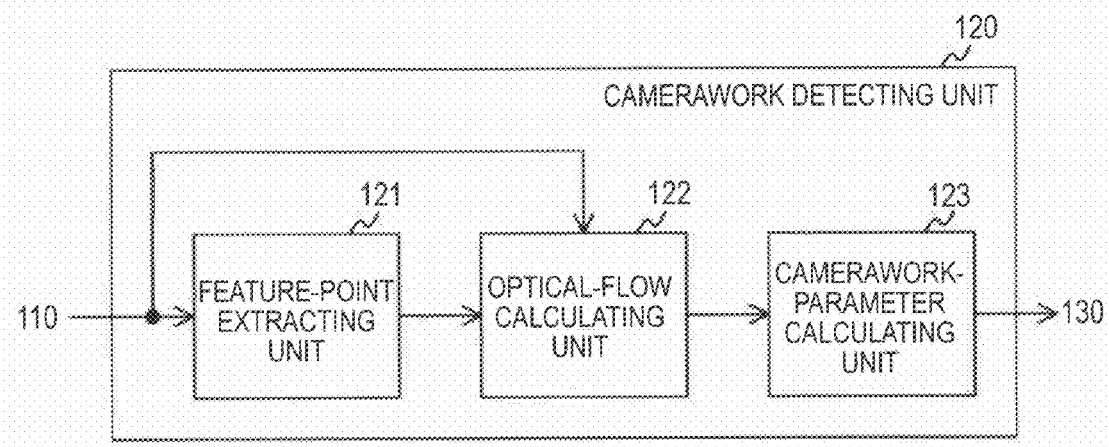

FIG.4

| MOVING IMAGE ID | FRAME NUMBER | COMBINED IMAGE |
|---|---|---|
| #1 | 1,2,⋯,n | COMBINED IMAGE |
| #2 | 1,2,⋯,p | COMBINED IMAGE |
| | p+1,p+2,⋯,q | COMBINED IMAGE |
| | q+1,q+2,⋯,r | COMBINED IMAGE |
| ⋮ | ⋮ | ⋮ |
| #n | ⋯ | ⋯ |

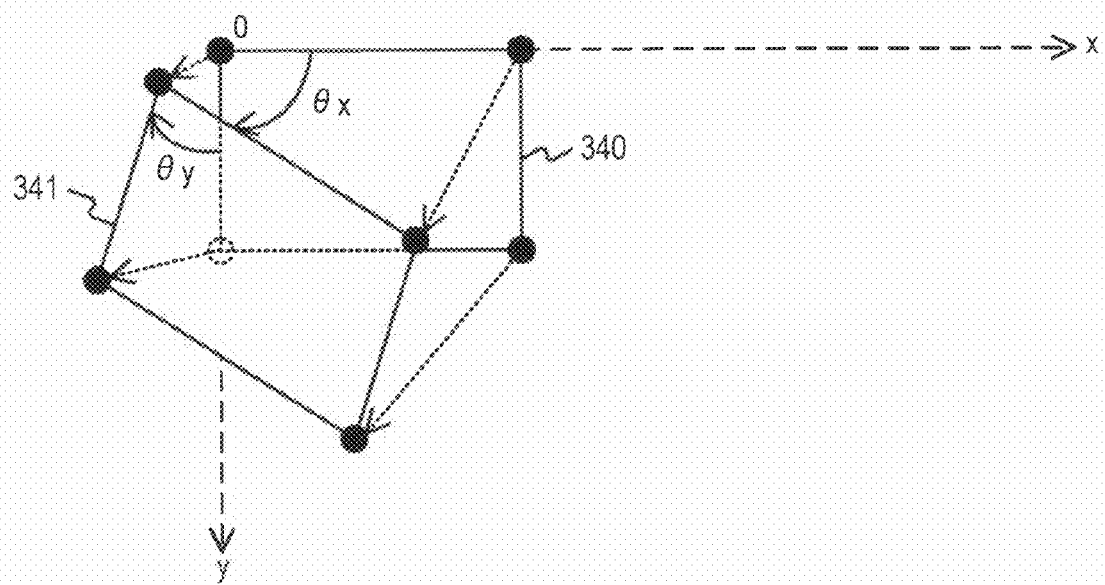

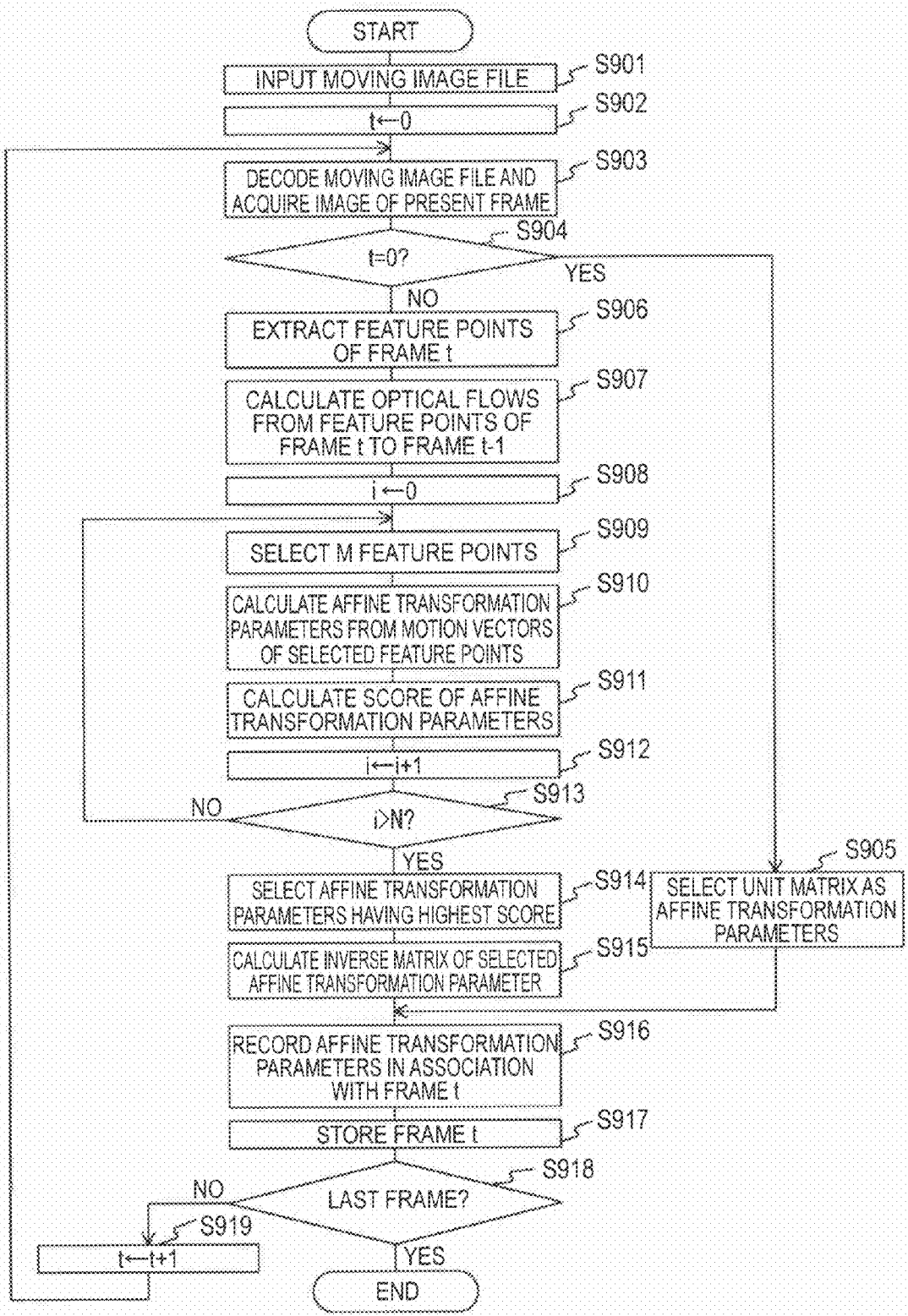

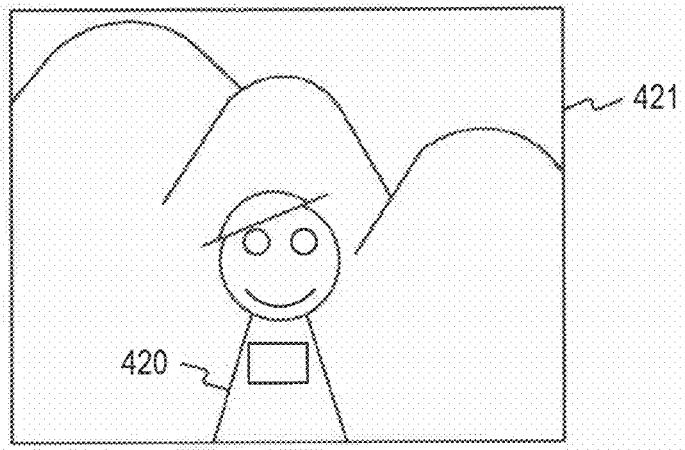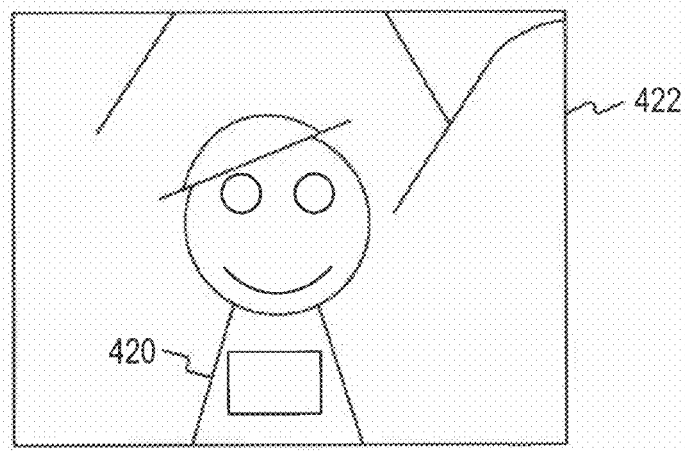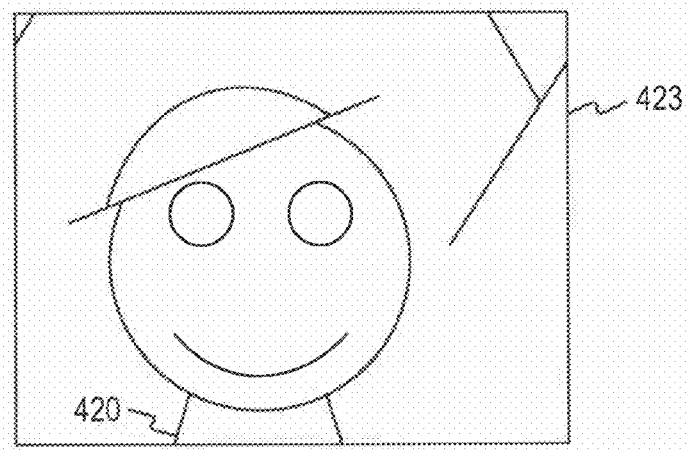

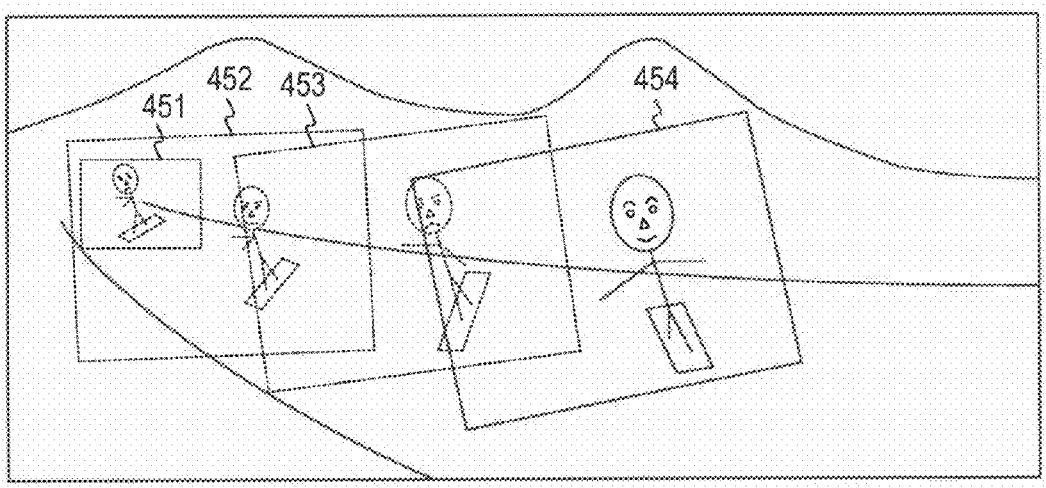
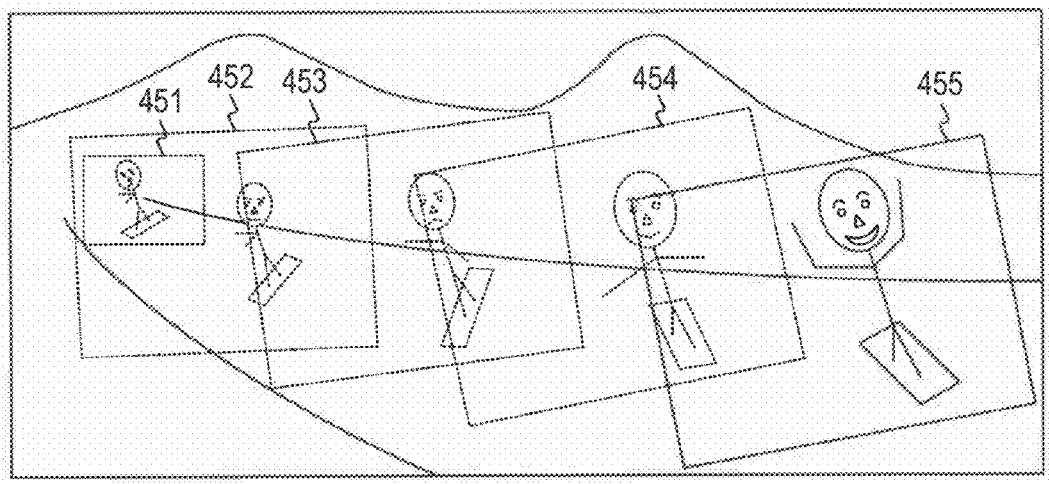

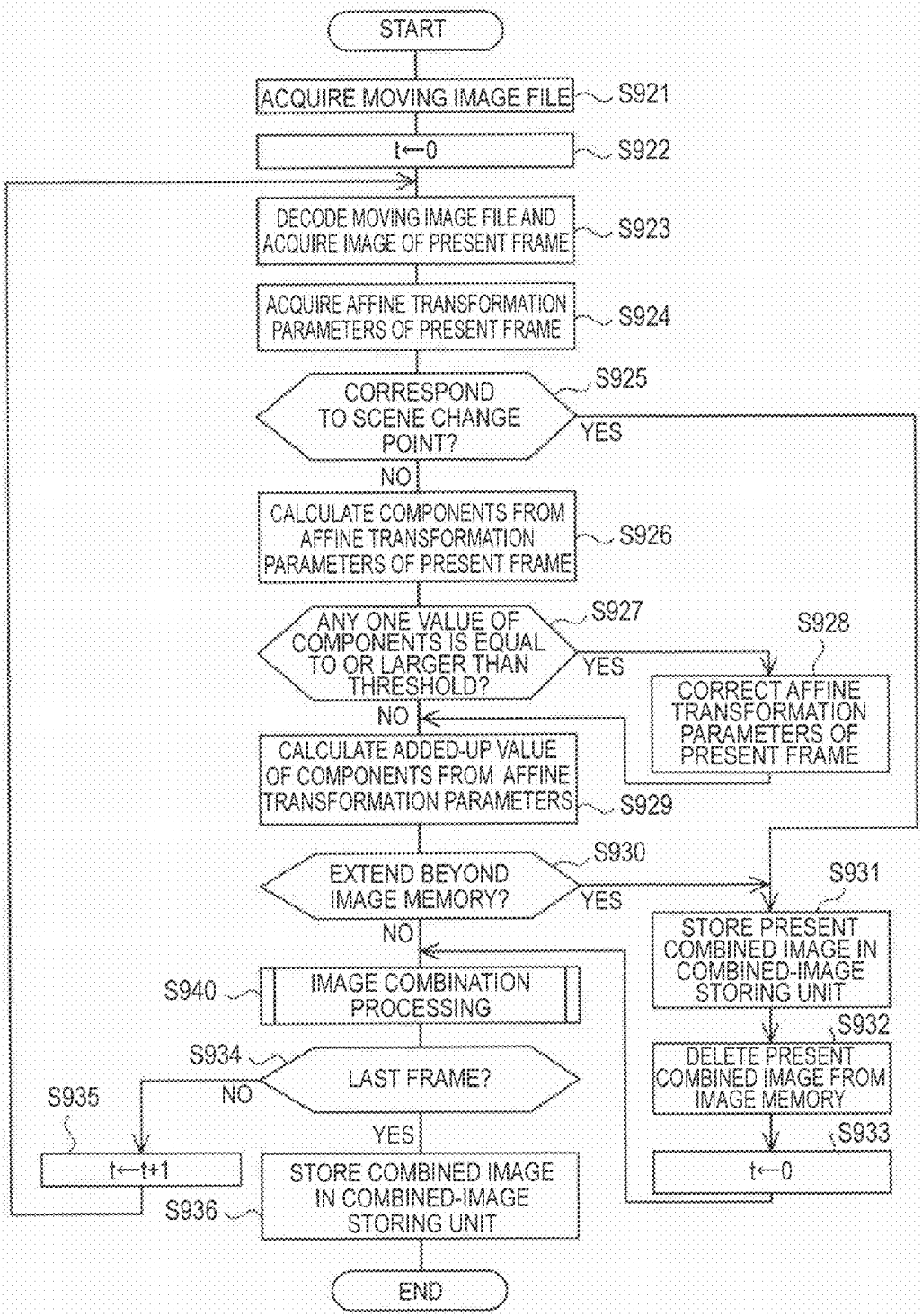

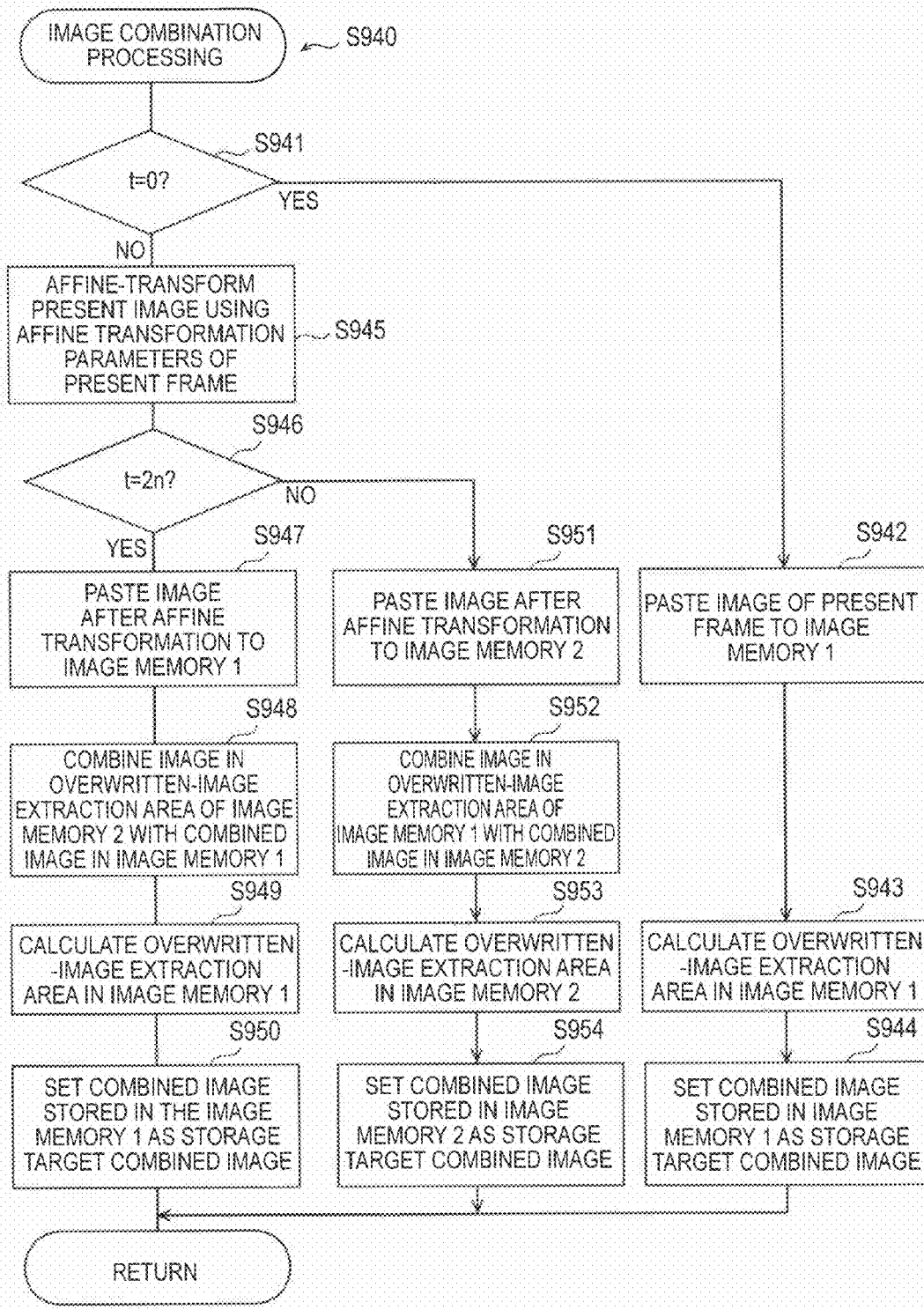

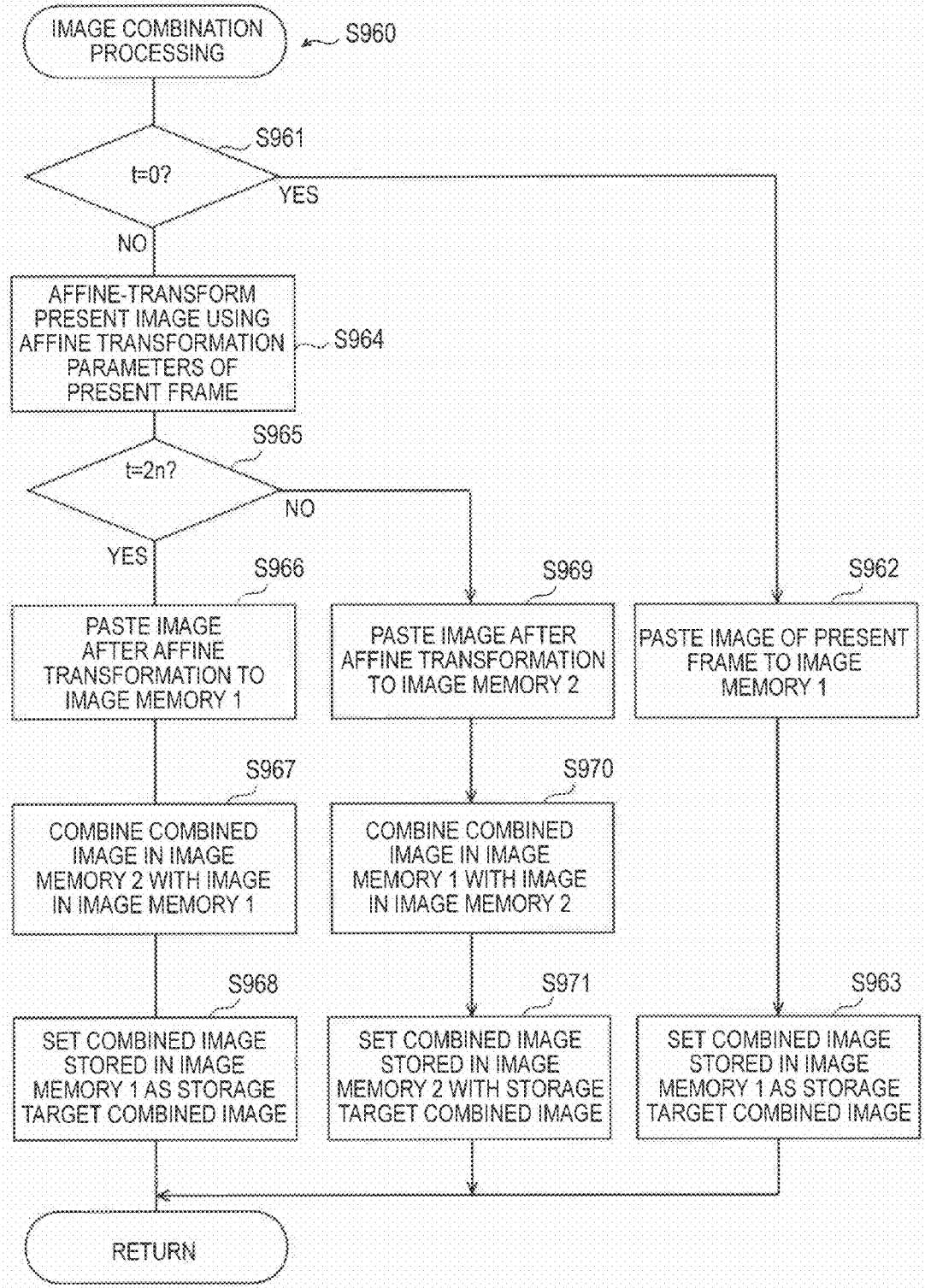

FIG.35A
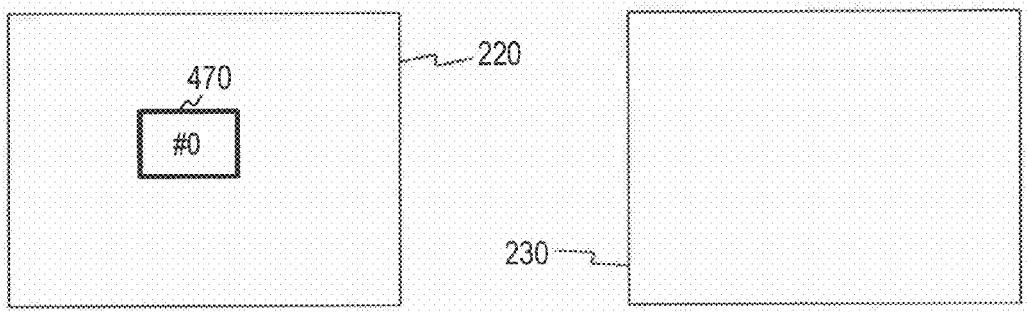
FIG.35B
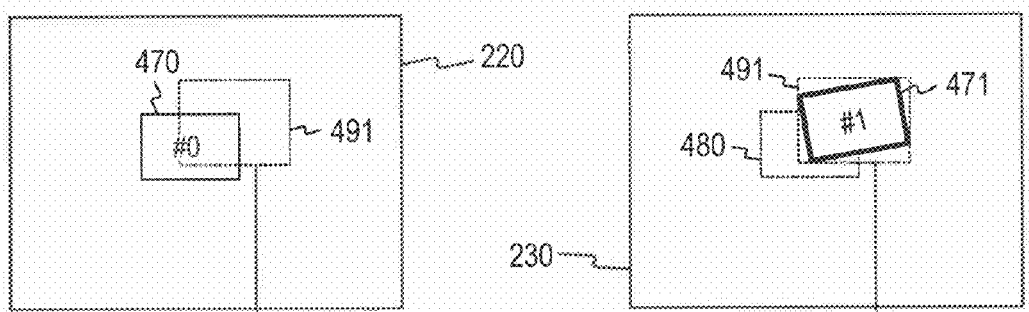
FIG.35C
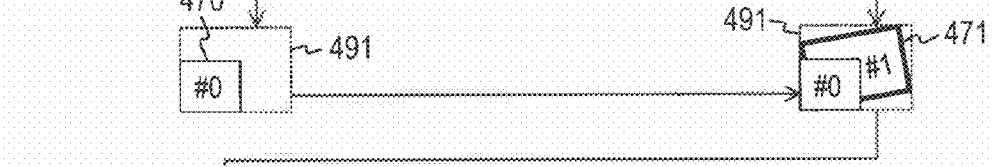
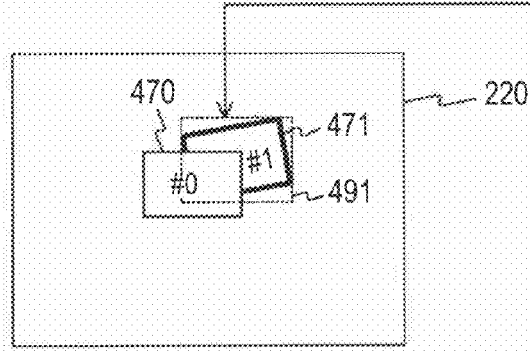

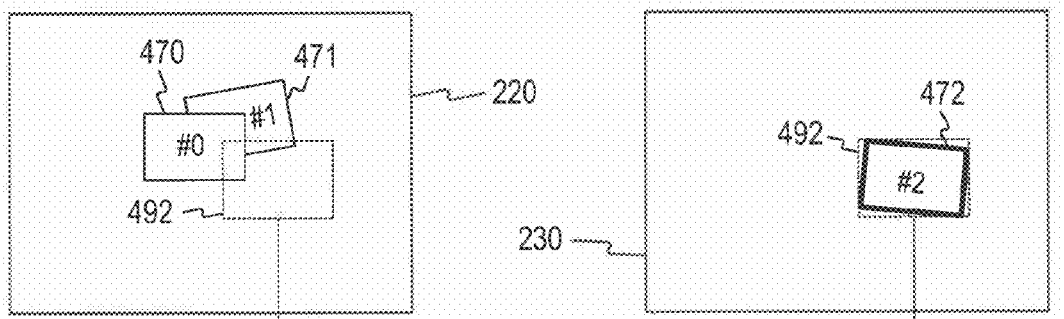
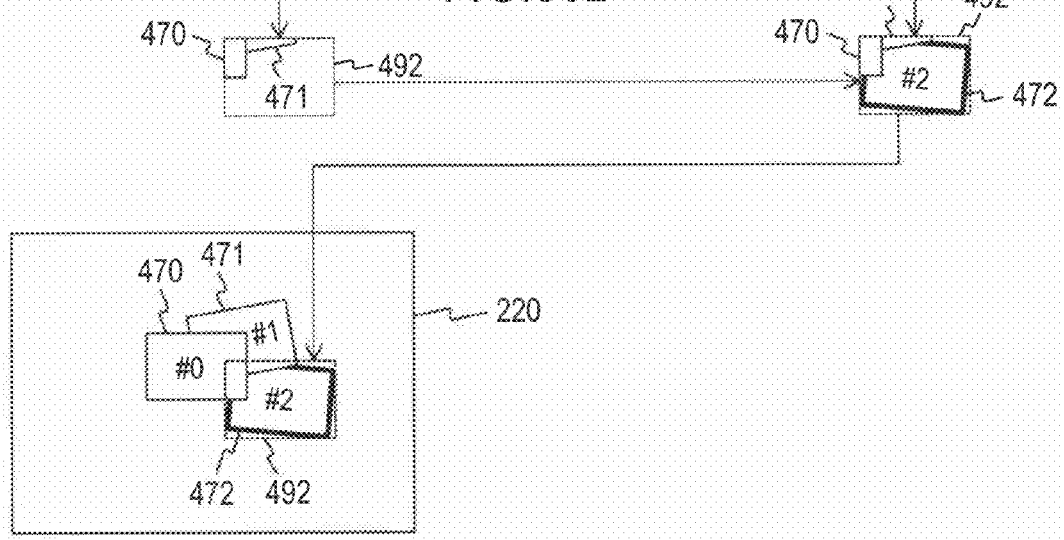

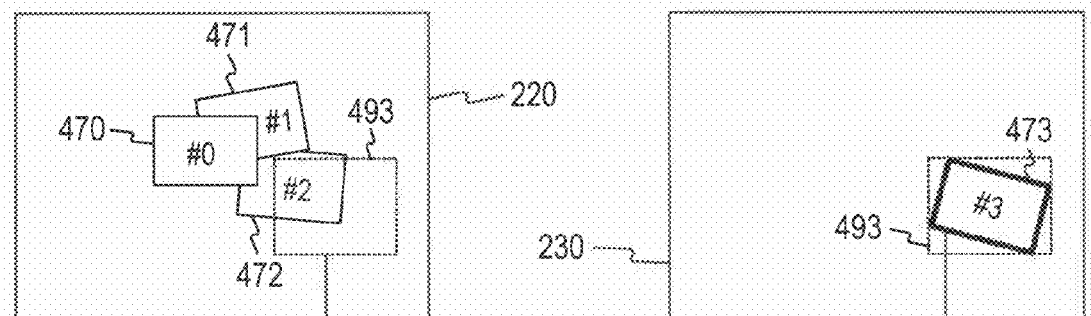
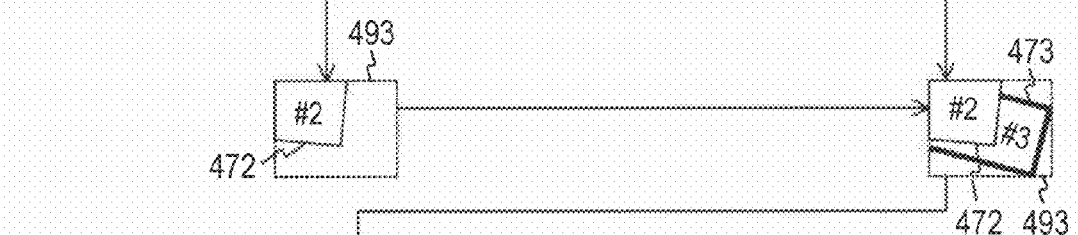
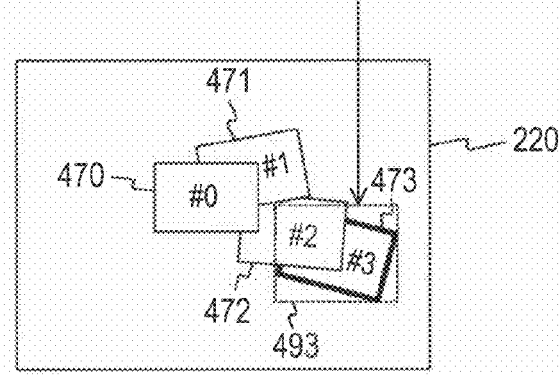
FIG.37A
FIG.37B

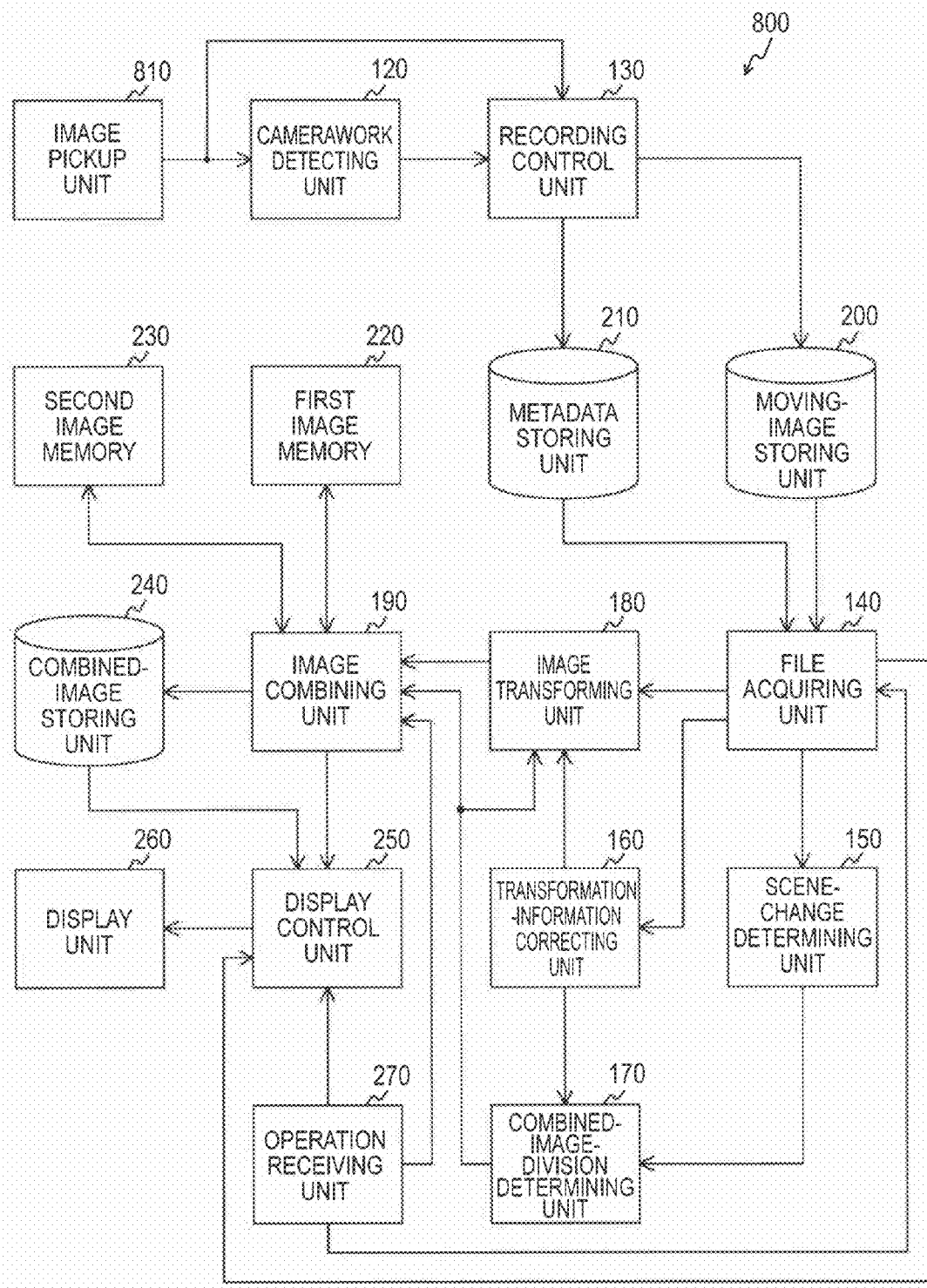

METHOD AND APPARATUS FOR IMAGE PICKUP AND IMAGE PROCESSING

BACKGROUND OF THE INVENTION

1. Field of the Invention

The present invention relates to an image processing apparatus, and, more particularly to an image processing apparatus and an image pickup apparatus that perform image processing for images, a processing method in the image processing apparatus and the image pickup apparatus, and a computer program for causing a computer to execute the method.

2. Description of the Related Art

In recent years, image pickup apparatuses such as a digital video camera (e.g., a camera-integrated recorder) are widely used. Therefore, for example, in an event of a kindergarten, fathers, mothers, and the like generally photograph moving images of the event using image pickup apparatuses. In such an event, the fathers, mothers, and the like often mainly photograph their children. However, scenes and the like of the event are also often photographed as appropriate to clearly show how the event is held. If photographing is performed every time an event of the kindergarten is held, the number of photographed moving images increases.

The moving images photographed in this way can be reproduced, for example, on a display of a moving image reproducing apparatus in a home. When the moving images are reproduced by the moving image reproducing apparatus, for example, if all moving images photographed in plural events are reproduced from the beginning, reproducing time is long. Therefore, if a viewer can retrieve desired moving images from all the moving images and sequentially reproduce the retrieved moving images, it is conceivable that the viewer can efficiently enjoy the moving images.

Therefore, there is proposed a technique for generating thumbnail images in sections of a moving image and reproducing the moving image from a desired recording position using the generated thumbnail images. For example, there is proposed a reproducing apparatus that forms, from scenes of plural moving images recorded in a recording medium, plural thumbnail images of screens indicating the scenes and displays the thumbnail image and, when a desired thumbnail image is selected from the displayed thumbnail images, starts reproduction of a moving image from the top of a scene corresponding to the selected thumbnail image (see, for example, JP-A-11-289517).

SUMMARY OF THE INVENTION

According to the related art, when viewing moving images photographed in plural events of a kindergarten or the like, it is possible to start reproduction of a moving image from the top of a desired scene using thumbnail images displayed for the moving images.

For example, when moving images of mainly an own child photographed in the plural events of the kindergarten are viewed, even if events are different, it is conceivable that many similar scenes mainly including the child are reproduced. In this case, generated thumbnail images are often also similar. When the number of photographed moving images is large, the number of generated thumbnail images is also large. When the thumbnail images similar to one another are displayed and when the large number of thumbnail images are displayed in this way, it is considered to be difficult to quickly perform appropriate retrieval.

For example, even when a person to be mainly photographed is the same, it may be easily determined whether a moving image is a target of retrieval according to a place where the photographing is performed, the atmosphere around the place, and the like. Therefore, for example, in viewing the moving images photographed in the plural events of the kindergarten or the like, if a user can easily refer to places where the events are held, atmospheres around the places, and the like, the user can easily grasp contents of the moving images. In this case, the user can quickly retrieve a desired moving image. If the user can increase the interest in the moving images while referring to the places where the events are held, the atmospheres around the places, and the like, the user can more efficiently enjoy the moving images.

Therefore, it is desirable to easily grasp contents of moving images photographed by an image pickup apparatus and increase the interest in the moving images.

According to an embodiment of the present invention, there is provided an image processing apparatus including: a first image storing unit that stores a first history image including a first picked-up image forming a picked-up moving image; an image transforming unit that transforms, on the basis of transformation information concerning the first picked-up image and a second picked-up image forming the picked-up moving image located after the first picked-up image on a time axis of the picked-up moving image, the second picked-up image; and an image combining unit that causes a second image storing unit different from the first image storing unit to store the transformed second picked-up image, overwrites the first history image stored in the first image storing unit on the second picked-up image stored in the second image storing unit, and combines the first history image and the second picked-up image. There is also provided a processing method in the image processing apparatus and a computer program for causing a computer to execute the method. This brings about an action of transforming the second picked-up image, causing the second image storing unit to store the transformed second picked-up image, overwriting the first history image stored in the first image storing unit on the second picked-up image, and combining the first history image and the second picked-up image.

In the embodiment, the image combining unit may overwrite the first history image in the position of the second image storing unit corresponding to a storage position of the first history image in the first image storing unit and combine the first history image and the second picked-up image. This brings about an action of overwriting the first history image in the position of the second image storing unit corresponding to the storage position of the first history image in the first image storing unit and combining the first history image and the second picked-up image.

In the embodiment, the first history image may be an image formed by combining a third picked-up image forming the picked-up moving image located before the first picked-up image on the time axis of the picked-up moving image and the first picked-up image. The second image storing unit may store a second history image including the third picked-up image. The image combining unit may overwrite the transformed second picked-up image on the second history image stored in the second image storing unit, combine the second picked-up image and the second history image, cause the second image storing unit to store a combined image. This brings about an action of overwriting the transformed second picked-up image on the second history image stored in the second image storing unit, combining the second picked-up image and the second history image, and causing the second image storing unit to store the combined image.

In the embodiment, the first history image may be an image formed by combining a picked-up image forming the picked-up moving image located before the third picked-up image on the time axis of the picked-up moving image, the first picked-up image, and the third picked-up image. The image combining unit may overwrite an image included in an area including the third picked-up image and the first picked-up image in the first history image stored in the first image storing unit on the second picked-up image stored in the second image storing unit and combine the image and the second picked-up image. This brings about an action of overwriting the image included in the area including the third picked-up image and the first picked-up image in the first history image stored in the first image storing unit on the second picked-up image stored in the second image storing unit and combining the image and the second picked-up image.

In the embodiment, the first history image may be an image formed by combining a third picked-up image forming the picked-up moving image located before the first picked-up image on the time axis of the picked-up moving image and the first picked-up image. The image combining unit may delete the first history image stored in the first image storing unit after overwriting the first history image on the second picked-up image stored in the second image storing unit and combining the first history image and the second picked-up image. This brings about an action of deleting the first history image stored in the first image storing unit after overwriting the first history image on the second picked-up image stored in the second image storing unit and combining the first history image and the second picked-up image.

In the embodiment, the first history image may be an image formed by combining a third picked-up image forming the picked-up moving image located before the first picked-up image on the time axis of the picked-up moving image and the first picked-up image. The image combining unit may overwrite an image in a target area corresponding to an area including the transformed second picked-up image in the first history image stored in the first image storing unit on the second picked-up image and combine the image and the second picked-up image, cause the first image storing unit to store a combined image in the target area, and delete the second picked-up image stored in the second image storing unit. This brings about an action of overwriting the image in the target area corresponding to the area including the transformed second picked-up image in the first history image stored in the first image storing unit on the second picked-up image and combining the image and the second picked-up image, causing the first image storing unit to store a combined image in the target area, and deleting the second picked-up image stored in the second image storing unit.

In the embodiment, the first picked-up image and the second picked-up image may be images corresponding to continuous two frames forming the picked-up moving image. The image processing apparatus may further include: a feature-point extracting unit that extracts feature points of the second picked-up image on the basis of pixels forming the second picked-up image; a shift-amount calculating unit that calculates a shift amount of the second picked-up image with respect to the first picked-up image on the basis of the extracted feature points; and a transformation-information calculating unit that calculates the transformation information on the basis of the calculated shift amount. This brings about an action of extracting feature points in the second picked-up image, calculating a shift amount of the second picked-up image with respect to the first picked-up image on the basis of the extracted feature points, and calculating transformation information on the basis of the calculated shift amount.

In the embodiment, the image processing apparatus may further include a display control unit that causes a display unit to display, as a representative image representing the picked-up moving image, a combined image formed by overwriting the first history image on the second picked-up image and combining the first history image and the second picked-up image. This brings about an action of causing the display unit to display, as the representative image representing the picked-up moving image, the combined image formed by overwriting the first history image on the second picked-up image and combining the first history image and the second picked-up image.

According to another embodiment of the present invention, there is provided an image pickup apparatus including: an image pickup unit that picks up an image of a subject and generates a picked-up moving image; a first image storing unit that stores a first history image including a first picked-up image forming the picked-up moving image; a transformation-information calculating unit that calculates, on the basis of the first picked-up image and a second picked-up image forming the picked-up moving image located after the first picked-up image on a time axis of the picked-up moving image, transformation information concerning the first picked-up image and the second picked-up image; an image transforming unit that transforms the second picked-up image on the basis of the calculated transformation information; and an image combining unit that causes a second image storing unit different from the first image storing unit to store the transformed second picked-up image, overwrites the first history image stored in the first image storing unit on the second picked-up image stored in the second image storing unit, and combines the first history image and the second picked-up image. There is also provided a processing method in the image pickup apparatus and a computer program for causing a computer to execute the method. This brings about an action of transforming the second picked-up image, causing the second image storing unit to store the transformed second picked-up image, overwriting the first history image stored in the first image storing unit on the second picked-up image, and combining the first history image and the second picked-up image.

According to the embodiments of the present invention, there is an excellent effect that it is possible to easily grasp content of a moving image photographed by the image pickup apparatus and increase the interest in the moving image.

BRIEF DESCRIPTION OF THE DRAWINGS

FIG. 1 is a block diagram of a functional configuration example of an image processing apparatus 100 according to a first embodiment of the present invention;

FIG. 2 is a block diagram of a functional configuration example of a camerawork detecting unit 120 according to the first embodiment;

FIG. 4 is a schematic diagram of content stored in a combined-image storing unit 240 according to the first embodiment;

FIG. 7 is a diagram of a rectangle 340 transformed by using affine transformation parameters;

FIG. 8 is a flowchart of a processing procedure of affine transformation parameter detection processing by the image processing apparatus 100 according to the first embodiment;

FIGS. 12A to 12C are diagrams of an example of transition of a moving image photographed by a camera;

FIGS. 21A and 21B are schematic diagrams of an image pickup range at each fixed interval in picking up an image of the person who is sliding on the slope of the snow mountain with the snowboard;

FIG. 30 is a flowchart of a processing procedure of combined image creation processing by the image processing apparatus 100 according to the first embodiment;

FIG. 31 is a flowchart of an image combination processing procedure among processing procedures of the combined image creation processing by the image processing apparatus 100 according to the first embodiment;

FIG. 34 is a flowchart of a processing procedure of an image combination processing procedure by the image processing apparatus 100 according to the second embodiment;

FIGS. 35A to 35C are diagrams of transition of a combined image created by using the first image memory 220 and the second image memory 230 according to a third embodiment of the present invention;

FIGS. 36A and 36B are diagrams of transition of a combined image created by using the first image memory 220 and the second image memory 230 according to the third embodiment;

FIGS. 37A and 37B are diagrams of transition of a combined image created by using the first image memory 220 and the second image memory 230 according to the third embodiment;

FIG. 39 is a block diagram of a functional configuration example of an image pickup apparatus 800 according to a fourth embodiment of the present invention.

DESCRIPTION OF THE PREFERRED EMBODIMENTS

Figure 3A:
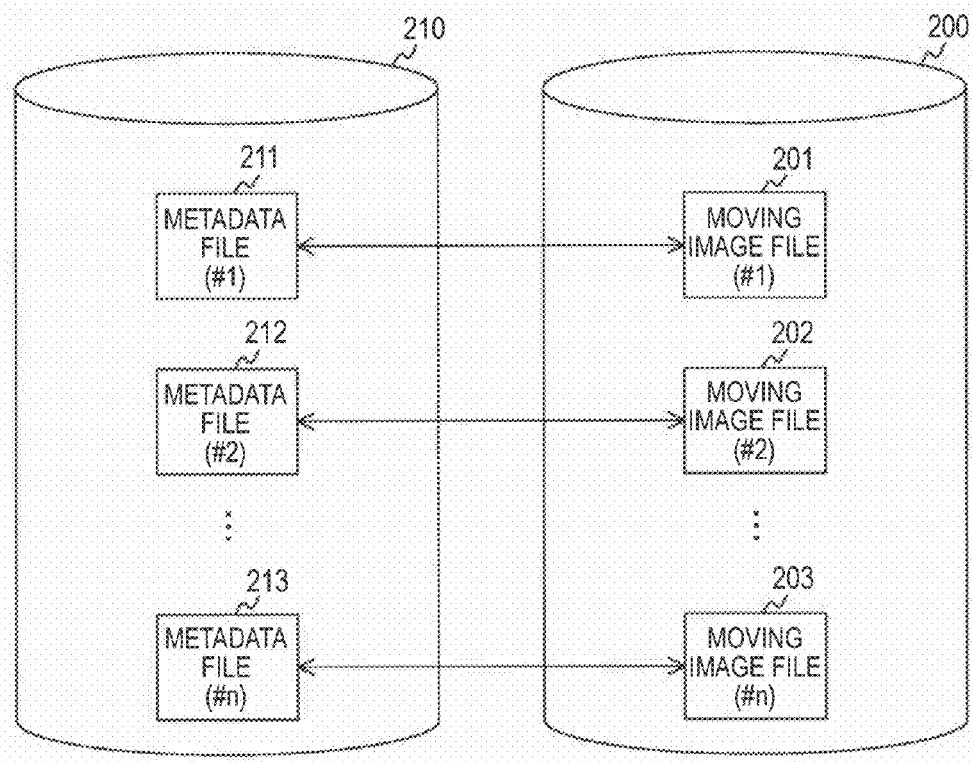
FIGS. 3A and 3B are schematic diagrams of files recorded in a moving-image storing unit 200 and a metadata storing unit 210 according to the first embodiment.

Embodiments of the present invention are explained in detail below with reference to the accompanying drawings. The explanation is made in order explained below.

1. First embodiment (combined image creation control: an example in which an image included in a rectangular area including the immediately preceding and second immediately preceding frames of the present frame is overwritten and combined)

2. Second embodiment (combined image creation control: an example in which an image including frames before the present frame is overwritten and combined)

3. Third embodiment (combined image creation control: an example in which an image included in a rectangular area including the present frame in a combined image including frames before the present frame is overwritten and combined)

4. Fourth embodiment (combined image creation control: an example of an image pickup apparatus)

1. First Embodiment

Functional configuration Example of an Image Processing Apparatus

FIG. 1 is a block diagram of a functional configuration example of an image processing apparatus 100 according to a first embodiment of the present invention. The image processing apparatus 100 includes a moving-image input unit 110, a camerawork detecting unit 120, a recording control unit 130, a moving-image storing unit 200, and a metadata storing unit 210. The image processing apparatus 100 includes a file acquiring unit 140, a scene-change determining unit 150, a transformation-information correcting unit 160, a combined-image-division determining unit 170, an image transforming unit 180, an image combining unit 190, a first image memory 220, and a second image memory 230. The image processing apparatus 100 further includes a display control unit 250, a display unit 260, and an operation receiving unit 270. The image processing apparatus 100 can be realized by a personal computer that can extract, concerning a picked-up moving image recorded by an image pickup apparatus such as a digital video camera, feature values by performing video analysis and apply various kinds of image processing using the extracted feature values.

The moving-image input unit 110 is a moving-image input unit that is input with a moving image (a picked-up moving image) picked up by an image pickup apparatus such as a digital video camera (hereinafter simply referred to as "camera"). The moving-image input unit 110 outputs the input moving image to the camerawork detecting unit 120.

The camerawork detecting unit 120 analyzes the moving image output from the moving-image input unit 110, detects motion information of a camera (camerawork) during photographing, and calculates affine transformation parameters (camerawork parameters) on the basis of the motion information of the camera. The camerawork detecting unit 120 outputs the calculated affine transformation parameters to the recording control unit 130. Specifically, the camerawork detecting unit 120 extracts feature points from images forming the moving image and extracts optical flows (motion vectors) with respect to the feature points. The camerawork detecting unit 120 analyzes the optical flows with respect to the extracted feature points, selects a feature point that shows dominant motion, and estimates the motion of the camera on the basis of the optical flow with respect to the feature points that shows the dominant motion. The dominant motion means regular motion indicated by a relatively large number of optical flows among optical flows with respect to plural feature points. An internal configuration of the camerawork detecting unit 120 is explained in detail with reference to FIG. 2.

The recording control unit 130 performs recording control for the moving-image storing unit 200 and the metadata storing unit 210. The recording control unit 130 records the moving image output from the moving-image input unit 110 in the moving-image storing unit 200 as a moving image file. The recording control unit 130 records the affine transformation parameters output from the camerawork detecting unit 120 in the metadata storing unit 210 as a metadata file in association with the moving image and frames.

The moving-image storing unit 200 stores, on the basis of the control by the recording control unit 130, the moving image output from the moving-image input unit 110 as a moving image file. The moving-image storing unit 200 supplies the moving image file to the file acquiring unit 140 in response to a request from the file acquiring unit 140. The moving image file stored in the moving-image storing unit 200 is explained in detail with reference to FIGS. 3A and 3B.

The metadata storing unit 210 stores, as a metadata file, the affine transformation parameters output from the camerawork detecting unit 120 on the basis of the control by the recording control unit 130. The metadata storing unit 210 supplies the metadata file to the file acquiring unit 140 in response to a request from the file acquiring unit 140. The metadata file stored in the metadata storing unit 210 is explained in detail with reference to FIGS. 3A and 3B.

The file acquiring unit 140 acquires, according to operation input received by the operation receiving unit 270, at least one of files stored in the moving-image storing unit 200 and the metadata storing unit 210 and supplies information concerning the acquired file to the units of the image processing apparatus 100. Specifically, when instruction operation for performing image combination processing is received by the operation receiving unit 270, the file acquiring unit 140 acquires a moving image file from the moving-image storing unit 200 and acquires a metadata file corresponding to the moving image file from the metadata storing unit 210. The file acquiring unit 140 outputs the acquired moving image file to the scene-change determining unit 150 and the image transforming unit 180 and outputs the acquired metadata file to the transformation-information correcting unit 160. When instruction operation for performing moving image reproduction is received by the operation receiving unit 270, the file acquiring unit 140 acquires a moving image file from the moving-image storing unit 200 and outputs the moving image file to the display control unit 250.

The scene-change determining unit 150 extracts feature values in images forming the moving image file output from the file acquiring unit 140, detects scene change points among the images on the basis of the feature values, and determines scene change. The scene-change determining unit 150 outputs a determination result to the combined-image-division determining unit 170. For example, when plural scenes photographed at different times and in different places are included in one moving image file, a composition, a color, and the like of a subject instantaneously change in frames in which the scenes are switched. Therefore, a scene change point can be detected by using, for example, degrees of changes in a color and luminance as the feature values in the images. The scene change point is a position indicating a boundary point in an instantaneous change of a photographing scene in a moving image. An image immediately after the boundary point is an image corresponding to the scene change point. For example, the scene-change determining unit 150 extracts, for each of frames, a color histogram of an entire screen in an image forming a moving image output from the file acquiring unit 140 and calculates a difference value of a color distribution of the color histogram between continuous two frames. The scene-change determining unit 150 calculates a scene change score on the basis of the calculated difference value between the two frames and detects a scene change point between the images on the basis of the scene change score. For example, when the composition, color, and the like of the subject instantaneously change and the histogram difference value between the continuous two frames is equal to or larger than a threshold, a boundary point between the continuous two frames is detected as a scene change point.

The transformation-information correcting unit 160 corrects, on the basis of affine transformation parameters included in the metadata file output from the file acquiring unit 140, the affine transformation parameter. The transformation-information correcting unit 160 outputs the corrected affine transformation parameters to the image transforming unit 180. Specifically, the transformation-information correcting unit 160 calculates components of camerawork (zoom components, translation components, and rotation components in an X direction and a Y direction) on the basis of affine transformation parameters corresponding to the present frame output from the file acquiring unit 140. The transformation-information correcting unit 160 determines whether a value of at least one of the components is equal to or larger than a threshold. When the value of at least one of the components is equal to or larger than the threshold, the transformation-information correcting unit 160 corrects the affine transformation parameters to affine transformation parameters of a unit matrix and outputs the affine transformation parameters to the image transforming unit 180. On the other hand, when values of all the components of camerawork are not equal to or larger than the threshold, the transformation-information correcting unit 160 does not correct the affine transformation parameters and outputs the affine transformation parameters, which are output from the file acquiring unit 140, to the image transforming unit 180. The transformation-information correcting unit 160 outputs the calculated components of camerawork to the combined-image-division determining unit 170.

The combined-image-division determining unit 170 determines whether an image corresponding to the present frame forming the moving image file output from the file acquiring unit 140 should be divided from the presently-created combined image. When it is determined that the image is divided, the combined-image-division determining unit 170 outputs a division instruction for the combined image to the image transforming unit 180 and the image combining unit 190. The combined-image-division determining unit 170 determines whether the division is necessary according to whether a combined image exceeds fixed size (e.g., the size of the first image memory 220 and the second image memory 230) when the image corresponding to the present frame is further combined with the presently-created combined image. Specifically, the combined-image-division determining unit 170 sequentially adds up components of camerawork concerning frames from a leading frame to the present frame output from the transformation-information correcting unit 160 and determines whether division is necessary on the basis of whether an added-up value exceeds a threshold. When it is determined that the image is divided, the combined-image-division determining unit 170 deletes an added-up value of camerawork components calculated up to the immediately preceding frame and adds up camerawork frames for the next frame of the frame for which the necessity of division is determined and subsequent frames. When a determination result indicating that a scene change point is detected is output from the scene-change determining unit 150, the combined-image-division determining unit 170 also outputs the division instruction for the combined image to the image transforming unit 180 and the image combining unit 190.

The image transforming unit 180 applies, for each of frames, affine transformation to an image forming the moving image file output from the file acquiring unit 140 using affine transformation parameters corresponding to the image. The image transforming unit 180 outputs the affine-transformed image to the image combining unit 190. Specifically, the image transforming unit 180 sequentially affine-transforms other images with the position of one image set as a reference. As the image set as the reference, for example, an image corresponding to a leading frame is set. The image transforming unit 180 sequentially multiplies the present frame and affine matrix specified by affine transformation parameters associated with the frames before the present frame to thereby affine-transform an image corresponding to the present frame. When a division instruction for a combined image is output from the combined-image-division determining unit 170, the image transforming unit 180 sets the image corresponding to the present frame as a reference position, affine-transforms the image corresponding to the present frame with a unit matrix, and outputs the image to the image combining unit 190. The image transformation is explained in detail with reference to FIGS. 9A to 9C to FIGS. 19A to 19C and the like.

The image combining unit 190 combines, according to content of operation input received by the operation receiving unit 270, the images affine-transformed by the image transforming unit 180 to create a combined image using the first image memory 220 and the second image memory 230. The image combining unit 190 causes the combined-image storing unit 240 to store the combined image. When a division instruction for a combined image is output from the combined-image-division determining unit 170, the image combining unit 190 causes the combined-image storing unit 240 to store a combined image created by the immediately preceding frames stored in the first image memory 220 or the second image memory 230. The image combining unit 190 deletes the combined image from the first image memory 220 or the second image memory 230 and creates a new combined image. The image combining unit 190 may sequentially output, according to the content of the operation input received by the operation receiving unit 270, created combined images to the display control unit 250 and cause the display unit 260 to display the combined images. The image combination is explained in detail with reference to FIGS. 23A to 23C to FIGS. 25A to 25C and the like.

The first image memory 220 and the second image memory 230 are work buffers used when a combined image is created by the image combining unit 190 and store a history image including an image affine-transformed by the image transforming unit 180. The first image memory 220 and the second image memory 230 supply the stored history image to the image combining unit 190. The first image memory 220 and the second image memory 230 are referred to as canvas equivalent to a memory for one side for storing image data. The first image memory 220 or the second image memory 230 is an example of a first image storing unit or a second image storing unit described in the appended claims.

The combined-image storing unit 240 stores a combined image created by the image combining unit 190. The combined-image storing unit 240 supplies the stored combined image to the display control unit 250. The combined image stored in the combined-image storing unit 240 is explained in detail with reference to FIG. 4.

The display control unit 250 causes, according to content of operation input received by the operation receiving unit 270, the display unit 260 to display images. For example, as indicators (e.g., icons) representing moving images stored in the moving-image storing unit 200, the display control unit 250 causes the display unit 260 to display the combined image stored in the combined-image storing unit 240. When selection operation for selecting an icon displayed on the display unit 260 is received by the operation receiving unit 270, the display control unit 250 causes the display unit 260 to display a moving image represented by the selected icon.

The display unit 260 displays the images on the basis of the control by the display control unit 250. For example, the display unit 260 can be realized by a display of a personal computer or a television. A display example of a combined image is explained in detail with reference to FIGS. 29A and 29C and the like.

The operation receiving unit 270 receives operation input from a keyboard including various input keys, a mouse (a pointing device), and the like. The operation receiving unit 270 outputs content of the received operation input to the file acquiring unit 140, the image combining unit 190, or the display control unit 250.

FIG. 2 is a block diagram of a functional configuration example of the camerawork detecting unit 120 according to the first embodiment. The camerawork detecting unit 120 includes a feature-point extracting unit 121, an optical-flow calculating unit 122, and a camerawork-parameter calculating unit 123.

The feature-point extracting unit 121 extracts feature points from an entire image corresponding to frames forming a moving image output from the moving-image input unit 110. The feature-point extracting unit 121 outputs the extracted feature points to the optical-flow calculating unit 122. As the feature points, for example, a point where a gradient of an edge is strong in the vertical or the horizontal direction (in general, referred to as "corner point"; in the following explanation, referred to as "corner point") can be extracted. The corner point is a feature point suitable for calculation of an optical flow and can be calculated by using edge detection. The extraction of the corner point is explained in detail with reference to FIGS. 5A to 5C and FIGS. 6A to 6C. The feature-point extracting unit 121 may extract, concerning a leading frame of the frames forming the moving image, feature points from an entire image and extract, concerning the frames other than the leading frame, feature points only from an area portion, an image of which is picked up later compared with the immediately preceding image.

The optical-flow calculating unit 122 calculates optical flows corresponding to the feature points output from the feature-point extracting unit 121. The optical-flow calculating unit 122 outputs the calculated optical flows to the camerawork-parameter calculating unit 123. Specifically, the optical-flow calculating unit 122 compares images corresponding to continuous two frames (the present frame and the immediately preceding frame) forming the moving image output from the moving-image input unit 110 to thereby calculate an optical flow of the present frame. Specifically, the optical-flow calculating unit 122 calculates, concerning feature points extracted from an entire image corresponding to the present frame, an optical flow for an image corresponding to the immediately preceding frame. The optical flow is calculated for each of the frames forming the moving image. As a detection method for detecting the optical flow, detection methods such as a gradient method and a block matching method can be used. The calculation of the optical flow is explained in detail with reference to FIGS. 5A to 5C and FIGS. 6A to 6C. The optical-flow calculating unit 122 is an example of a shift-amount calculating unit described in the appended claims.

The camerawork-parameter calculating unit 123 performs camerawork parameter calculation processing for calculating camerawork parameters using the optical flows corresponding to the feature points output from the optical-flow calculating unit 122. The camerawork-parameter calculating unit 123 outputs the calculated camerawork parameters to the recording control unit 130. The camerawork parameters are transformation information concerning the continuous two frames (the present frame and the immediately preceding frame).

In the first embodiment, images forming a moving image to be reproduced are transformed according to the motion of a camera and combined. In order to perform the transformation of the images, the motion of the camera is extracted by using an optical flow calculated by the optical-flow calculating unit 122. Camerawork parameters (transformation parameters) are calculated on the basis of the extracted motion.

In the first embodiment, as an example of an image transforming method for transforming an image forming a moving image to be reproduced, a method of transforming an image using affine transformation is explained. As an example of camerawork parameters, affine transformation parameters corresponding to an inverse matrix of a matrix of affine transformation parameters calculated on the basis of an optical flow are used. As the image transforming method, other image transforming methods such as projection transformation may be used. Affine transformation parameters can be calculated by using vectors at three points. Projection transformation parameters can be calculated by using vectors at four points. The camerawork parameters are transformation information for transforming other picked-up images with at least one picked-up image among picked-up images forming a picked-up moving image set as a reference. The camerawork parameters include at least position information and posture information described by a coordinate system of the camera. Specifically, the camerawork parameters include information concerning the position and the posture of the camera used for photographing by a photographer. The motion of the camera by the operation of the photographer such as zoom-in, zoom-out, panning, tilt, and rotation can be estimated on the basis of affine transformation parameters calculated by the camerawork-parameter calculating unit 123. The calculation of affine transformation parameters is explained in detail with reference to FIGS. 5A to 5C and FIGS. 6A to 6C. The camerawork-parameter calculating unit 123 is an example of a transformation-information calculating unit described in the appended claims.

Figure 3B:
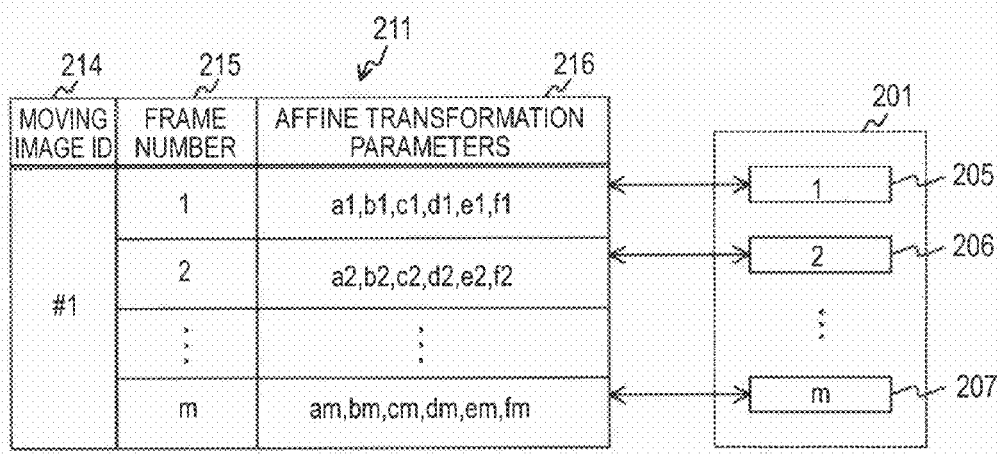

FIGS. 3A and 3B are schematic diagrams of files recorded in the moving-image storing unit 200 and the metadata storing unit 210 according to the first embodiment. In FIG. 3A, moving image files 201 to 203 stored in the moving-image storing unit 200 and metadata files 211 to 213 stored in the metadata storing unit 210 in association with the moving image files 201 and 203 are shown. It is assumed that moving image IDs as identification information for identifying the moving image files stored in the moving-image storing unit 200 are given to the respective moving image files. For example, "#1" is given to the moving image file 201, "#2" is given to the moving image file 202, and "#n" is given to the moving image file 203.

In FIG. 3B, the moving image file 201 stored in the moving-image storing unit 200 and the metadata file 211 stored in the metadata storing unit 210 in association with the moving image file 201 are schematically shown. The moving image file 201 is a file of a moving image including m frames. The m frames are shown as frames "1" 205 to "m" 207.

In the metadata file 211, a moving image ID 214, a frame number 215, and affine transformation parameters 216 are stored in association with one another.

The moving image ID 214 indicates a moving image ID given to a moving image file corresponding thereto. For example, "#1" given to the moving image file 201 is stored in the moving image ID 214.

The frame number 215 indicates serial numbers of frames forming a moving image of a moving image file corresponding thereto. For example, "1" to "m" corresponding to the frames "1" 205 to "m" 207 forming the moving image of the moving image file 201 are stored in the frame number 215.

The affine transformation parameters 216 indicate affine transformation parameters calculated concerning the frames of the moving image corresponding to the frame number 215. The affine transformation parameters 216 "a1, b1, c1, d1, e1, f1" corresponding to "1" of the frame number 215 are affine transformation parameters of a unit matrix. The affine transformation parameters 216 "am, bm, cm, dm, em, fm" corresponding to "m (m is an integer equal to or larger than 2)" of the frame number 215 are affine transformation parameters corresponding to the immediately preceding frame "m−1" of the frame "m".

FIG. 4 is a schematic diagram of content stored in the combined-image storing unit 240 according to the first embodiment. In the combined-image storing unit 240, combined images created by the image combining unit 190 concerning the moving image files stored in the moving-image storing unit 200 are stored. Specifically, in the combined-image storing unit 240, a moving image ID 241, a frame number 242, and a combined image 243 are stored in association with each other. In the combined-image storing unit 240, for example, one or plural combined images are stored for one moving image file. For example, concerning a moving image file for which division of a combined image is determined by the combined-image-division determining unit 170, since a combined image are created in division, plural combined images are stored in the combined-image storing unit 240 concerning the moving image file.

The moving image ID 241 indicates IDs corresponding to the moving image files stored in the moving-image storing unit 200. For example, "#1" and "#2" given to the moving image files 201 and 202 are stored.

The frame number 242 indicates numbers of frames corresponding to the combined images created by the image combining unit 190 concerning the moving image files stored in the moving-image storing unit 200. For example, when a combined image created by using all frames forming a moving image is stored, frame numbers of all the frames are stored. For example, when a combined image created by dividing a part of the frames forming the moving image is stored, frame numbers from which the combined image is created are stored in association with the combined image. For example, when a combined image is created by using all the frames "1" 205 to "m" 207 forming the moving image of the moving image file 201, as shown in FIG. 4, "1" to "m" are stored in association with "#1" of the moving image ID 241. For example, when a combined image is created by dividing a part of the frames forming the moving image of the moving image file 202, as shown in FIG. 4, frame numbers are stored in association with "#2" of the moving image ID 241 for each set of frames as targets of creation of the combined image.

The combined image 243 indicates a combined image combined by the image combining unit 190 concerning the moving image files stored in the moving-image storing unit 200. The combined image 243 is stored in association with the moving image ID 241 and the frame number 242 according to a frame as a target of creation of the combined image. In FIG. 4, only contours of panoramic images stored in the combined-image storing unit 240 are schematically shown as figures. The combined images can be displayed as, for example, icons for selecting a moving image that should be reproduced. The combined images are explained in detail with reference to FIGS. 9A to 9C to FIGS. 19A to 19C, FIGS. 23A to 23C to FIGS. 25A to 25C, and the like.

Camerawork Parameter Detection Example

A detection method for detecting camerawork parameters (affine transformation parameters) used for image transformation is explained in detail with reference to the drawings.

Figure 5A:
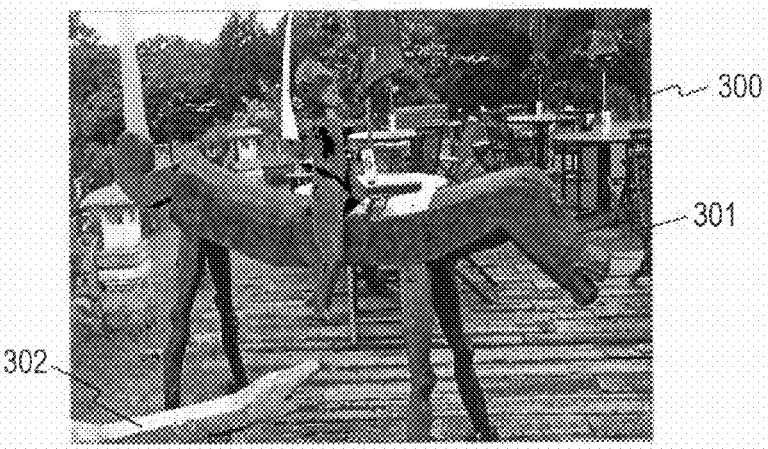
FIGS. 5A to 5C are diagrams of an example of an image forming a moving image.
Figure 5B:
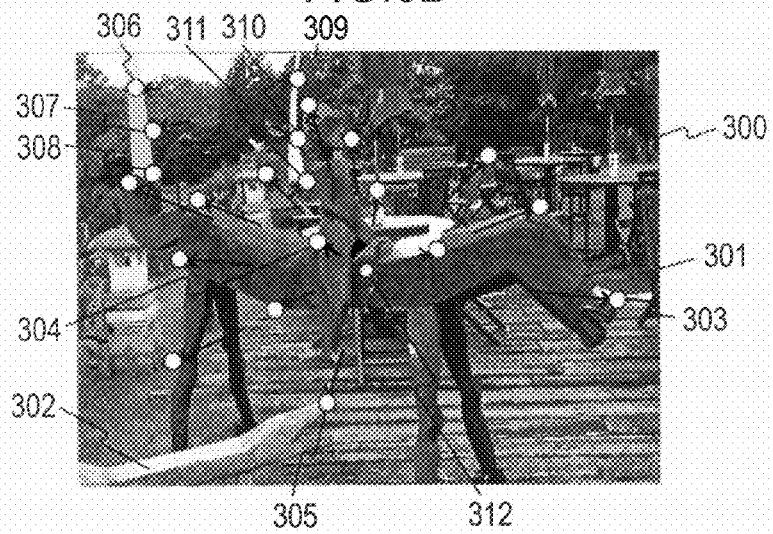
Figure 5C:
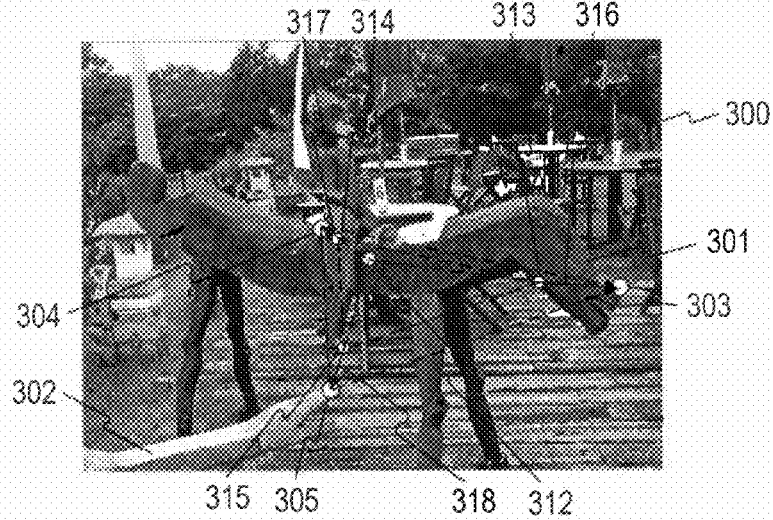
Figure 6A:
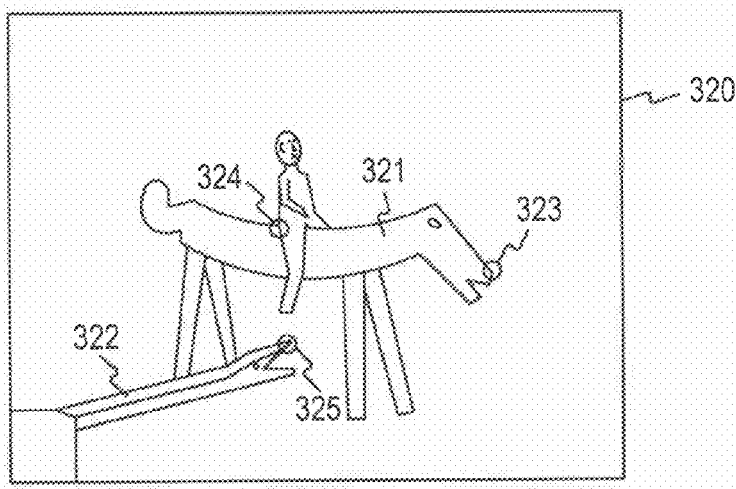
FIGS. 6A to 6C are diagrams of an image simplified by omitting a background and the like in the image forming the moving image.
Figure 6B:
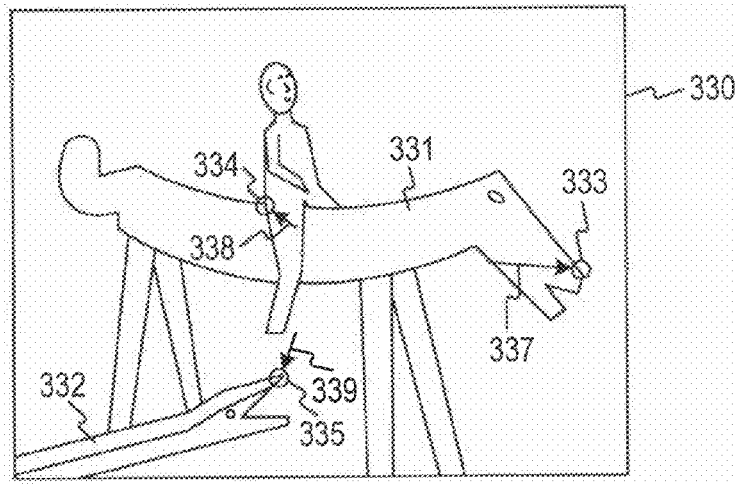
Figure 6C:
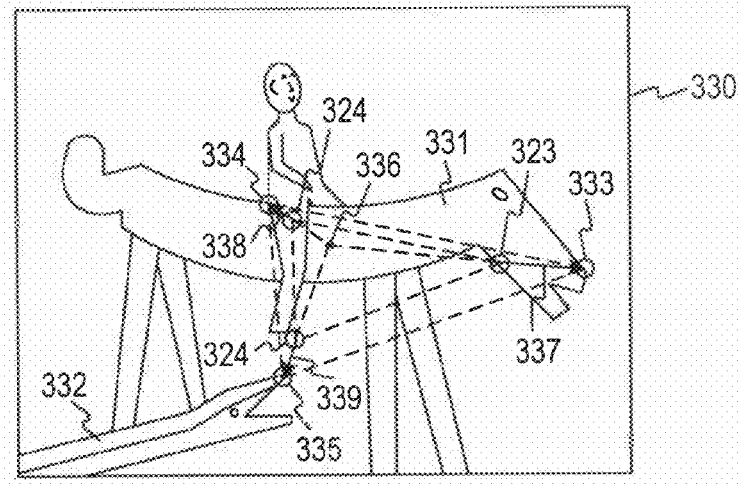

FIGS. 5A to 5C are diagrams of an example forming a moving image. FIGS. 6A to 6C are diagrams of an image simplified by omitting a background and the like in the image forming the moving image. In FIGS. 5A to 5C, an image 300 is shown as an example of an image forming a moving image. In FIG. 6A, an image 20 simplified by omitting a background and the like in an image corresponding to a frame immediately after the image 300 is shown. In FIGS. 6B and 6C, an image 330 simplified by omitting a background and the like in the image 300 is shown.

The images 300, 320, and 330 shown in FIGS. 5A to 6C include images 301, 321, and 331 of a horse on which a person sits astride and images 302, 322, and 332 of a snake set in the front of the images 301, 321, and 331 of the horse. As shown in FIGS. 5A to 5C, flags, chairs, and the like are preset in the background of these images. The flags are streaming in the wind.

The image 320 shown in FIG. 6A is an image formed by simplifying an image corresponding to a frame immediately after a frame corresponding to the images 300 and 330 shown in FIGS. 5A to 5C and FIGS. 6B and 6C. The images 320 and 330 corresponding to two continuous frames are images indicating transition of a subject in a screen that is gradually reduced in size. During photographing of the images, zoom-out operation for gradually reducing the subject in the screen in size is performed.

In the first embodiment, a method of detecting feature points from an entire image forming a moving image and calculating affine transformation parameters using optical flows corresponding to the feature points is explained as an example. For example, an image corresponding to the present frame forming a moving image is represented as image "t" and an image immediately preceding the image "t" is represented as image "t−1". The image "t−1" and the image "t" are continuous images forming the moving image. When affine transformation parameters concerning the image "t−1" and the image "t" are calculated, feature points in an entire screen of the image "t" are extracted and optical flows from the image "t" to the image "t−1" corresponding to the feature points are calculated. In this example, corner points are used as the feature points.

For example, in FIGS. 6A to 6C, an image corresponding to the present image is represented as image 320 and an image corresponding to the immediately preceding frame of the image 320 is represented as image 330. In FIGS. 6A to 6C, a method of calculating affine transformation parameters using optical flows corresponding to three corner points detected from the image 320 is explained as an example.

For example, in the image 320 shown in FIG. 6A, it is assumed that a corner point 323 near the mouth of the image 321 of the horse, a corner points 324 near the buttocks of the person in the image 321 of the horse, and a corner point 325 near the mouth of the image 322 of the snake are detected as feature points. In this case, in the image 330 shown in FIG. 6B, optical flows 337, 338, and 339 corresponding to the corner points 323, 324, and 325 in the image 320 are detected by the gradient method, the block matching method, or the like. Corner points 333, 334, and 335 corresponding to the corner points 323, 324, and 325 in the image 320 are detected on the basis of the detected optical flows 337, 338, and 339.

For example, since the images 321 and 331 of the horse and the images 322 and 332 of the snake included in the images 320 and 330 shown in FIGS. 6A and 6B are set on the ground, the images do not move irrespective of the motion of the camera. Therefore, the motion of the camera can be accurately estimated on the basis of optical flows calculated with respect to the corner points detected concerning the images 321 and 331 of the horse and the images 322 and 332 of the snake. For example, as shown in FIG. 6C, it can be estimated, on the basis of the three optical flows 337 to 339 of the image 320 with respect to the image 330, that the image 320 is obtained by reducing the image 330 with a point 336 set as the center. Consequently, it can be determined that the motion of the camera during photographing of the image 320 is zoom-out operation with the point 336 set as the center. In this way, it is possible to detect corner points concerning an object that does not move irrespective of the motion of the camera and accurately detect the motion of the camera having fixed regularity on the basis of optical flows calculated with respect to the corner points. Therefore, it is possible to calculate affine transformation parameters using the optical flows calculated with respect to the corner points.

However, it is conceivable that objects that move irrespective of the motion of the camera such as flags streaming in the wind are included in an image. For example, flags streaming in the wind are included in the image 300 shown in FIGS. 5A to 5C. When corner points are detected concerning such objects that move irrespective of the motion of the camera and the motion of the camera is estimated by using optical flows calculated with respect to the corner points, it is difficult to accurately estimate the motion of the camera.

For example, optical flows detected concerning the image 300 shown in FIG. 5B are indicated by arrows. Corner points detected by the optical flows are indicated by white circles at the tips of the arrows. Corner points 303 to 305 are corner points corresponding to the corner points 333 to 335 shown in FIGS. 6B and 6C. Corner points 306 to 311 are corner points detected concerning the flags present in the background of the image 301 of the horse. Since the flags are streaming in the wind, the motions of the flags due to the influence of the wind are detected as optical flows. Specifically, optical flows corresponding to the corner points 306 to 311 are detected concerning the flags that move irrespective of the motion of the camera. Therefore, when an optical flow corresponding to at least one corner point among the corner points 306 to 311 is included in three optical flows used in calculating affine transformation parameters, it is difficult to detect an accurate motion of the camera. In this case, it is difficult to calculate accurate affine transformation parameters.

As explained above, for example, optical flows corresponding to objects that move irrespective of the motion of the camera and optical flows having fixed regularity in a relation with the motion of the camera may be detected from a photographed image. The optical flows corresponding to the objects that move irrespective of the motion of the camera are, for example, the optical flows corresponding to the corner points 306 to 311 shown in FIG. 5B. The optical flows having fixed regularity in the relation with the motion of the camera are, for example, optical flows other than the optical flows corresponding to the corner points 306 to 311 shown in FIG. 5B.

In this way, the optical flows corresponding to the objects that move irrespective of the motion of the camera may be detected. Therefore, in the first embodiment, affine transformation parameter calculation processing for calculating affine transformation parameters on the basis of the three optical flows is performed plural times. Plural affine transformation parameters are calculated by the affine transformation parameter calculation processing and an optimum affine transformation parameter is selected out of the plural affine transformation parameters. In this example, it is assumed that the sizes of moving objects included in images forming the moving image are relatively small compared with areas of the images.

Affine transformation is explained. On a two-dimensional coordinate, when the position of a movement source is represented as (x, y) and the position of a movement destination after the affine transformation is represented as (x', y'), a determinant of the affine transformation can be represented by Formula (1). A 3×3 matrix on the right side of Formula (1) is an affine matrix.

$$[x'\ y'\ 1] = [x\ y\ 1] \begin{bmatrix} a & d & 0 \\ b & e & 0 \\ c & f & 1 \end{bmatrix} \quad (1)$$

In Formula (1), "a" to "f" are affine transformation parameters. The affine transformation parameters can be represented as a matrix AM by the following formula. A zoom component XZ in an X direction, a zoom component YZ in a Y direction, a translation component XT in the X direction, a translation component YT in the Y direction, a rotation component θx in the X direction, and a rotation component θy in the Y direction can be calculated by the following formulas, respectively. In the case of a unit matrix, a=e=1 and b=c=d=f=0.

$$AM = \begin{bmatrix} a & b & c \\ d & e & f \end{bmatrix}$$

$$XZ = \sqrt{a^2 + d^2}$$

$$YZ = \sqrt{b^2 + e^2}$$

$$XT = c$$

$$YT = f$$

$$\theta_x = \tan^{-1}\left[\frac{d}{a}\right]$$

$$\theta_y = \tan^{-1}\left[\frac{b}{e}\right]$$

In this way, components of camerawork (zoom components, translation components, and rotation components in the X direction and the Y direction) can be calculated from the affine transformation parameters. The rotation components are explained with reference to FIG. 7.

FIG. 7 is a diagram of a rectangle 340 transformed by using affine transformation parameters. As shown in FIG. 7, in an xy coordinate in which one vertex of the rectangle 340 is set as the origin and two sides of the rectangle 340 in contact with vertexes corresponding to the origin are set as an x axis and a y axis, a rectangle obtained by transforming the rectangle 340 using predetermined affine transformation parameters is represented as rectangle 341. In this case, an angle formed by sides on the x axis side of the rectangles 340 and 341 is represented as rotation component θx and an angle formed by sides on the y axis side of the rectangles 340 and 341 is represented as rotation component θy.

A method of calculating an added-up value of camerawork components is explained.

The added-up value of camerawork components is a value obtained by adding up respective components of camerawork corresponding to respective frames from a leading frame to the present frame. For example, the frames from the leasing frame to the present frame are represented as frames 1 to 5, respectively. Translation component in the X direction of camerawork components of the frames 1 to 5 are represented as XT1 to XT5. In this case, an added-up value of the translation components in the X direction of the camerawork components can be calculated by "XT1+XT2+XT3+XT4+XT5".

A method of calculating affine transformation parameters is explained.

First, in an image corresponding to the present frame as one frame among frames forming a moving image, three feature points are selected out of feature points where optical flows are detected. For example, three corner points are selected at random out of corner points (indicated by white circles) detected in the image 300 shown in FIG. 5B. When projection transformation parameters are used as camerawork parameters, four feature points are selected at random.

Subsequently, affine transformation parameters are calculated by using three optical flows corresponding to the selected three feature points. For example, affine transformation parameters are calculated by using optical flows (indicated by arrows connected to the white circles) corresponding to the three corner points selected out of the corner points (indicated by the white circles) in the image 300 shown in FIG. 5B. The affine transformation parameters can be calculated by using Formula (1).

A score of the calculated affine transformation parameters is calculated on the basis of the affine transformation parameters. Specifically, positions of movement destinations of all feature points in an image corresponding to a frame immediately preceding the present frame are calculated by using the calculated affine transformation parameters. The positions of the feature points calculated by using the affine transformation parameters and positions of feature points detected in the immediately preceding frame are compared. A difference value between positions of two feature points corresponding to each other is calculated for each of the feature points. As the difference value, for example, an absolute distance between the positions of the two feature points corresponding to each other is calculated. Subsequently, the calculated difference value and a threshold set in advance are compared for each of the feature points to calculate the number of feature points having difference values smaller than the threshold as a score of the affine transformation parameters. In this way, three feature points are selected at random out of the feature points where the optical flows are detected. The processing for calculating a score of the affine transformation parameters on the basis of the optical flows corresponding to the feature points is repeated a predetermined number of times to calculate plural scores of the affine transformation parameters. The predetermined number of times can be suitably set in accordance with a kind of images to be compared and a processing ability of the image processing apparatus 100 and fixed value may be used. The predetermined number of times can be set to, for example, about twenty times taking into account a processing ability of the image processing apparatus 100.

For example, it is assumed that three corner points other than the corner points 306 to 311 are selected out of the corner points detected in the image 300 shown in FIG. 5B. When affine transformation parameters are calculated by using the three optical flows corresponding to the three corner points selected in this way, as explained above, the three optical flows have fixed regularity. Therefore, affine transformation parameters for transforming the image corresponding to the present frame according to fixed rules are calculated. Concerning positions of the corner points calculated by using the affine transformation parameters and positions of the corner points detected in the immediately preceding frame, a difference value calculated for the corner points other than the corner points 306 to 311 is calculated as a relatively small value. Therefore, a score of the affine transformation parameters is a large value.

On the other hand, it is assumed that three corner points including at least one of the corner points 306 to 311 are selected out of the corner points detected in the image 300 shown in FIG. 5B. When affine transformation parameters are calculated by using three optical flows corresponding to the three corner points selected in this way, as explained above, the three optical flows include an optical flow that does not have fixed regularity. Therefore, there is a demand for affine transformation parameters not for transforming the image corresponding to the present frame according to the fixed rules. A difference value calculated concerning the positions of the corner points calculated by using the affine transformation parameters and the positions of the corner points detected in the immediately preceding frame is calculated as a relatively large value at an arbitrary corner point. Therefore, a score of the affine transformation parameters is a small value.

Subsequently, an affine transformation parameter having a largest score value among calculated scores of plural affine transformation parameters is selected as a representative affine transformation parameter. An inverse matrix of a matrix of the selected representative affine transformation parameter is calculated. An affine transformation parameter of the inverse matrix is stored in the metadata storing unit 210 in association with the present frame. Consequently, when the image forming the moving image is affine-transformed, the affine transformation can be performed by using an optimum affine transformation parameter.

As explained above, even when an object (a moving object) such as a person or a car is included in images forming the moving image, if the size of the moving object with respect to an area of the images is relatively small, the motion of the camera can be extracted without being affected by the moving object.

A motion considered to be intentionally performed by the photographer such as zoom-in, zoom-out, panning, tilt, and rotation can be estimated by extracting the motion of the camera. In Formula (1), assuming that a=e and d=−b, affine transformation parameters can be calculated on the basis of two optical flows. For example, when an image is affine-transformed by using affine transformation parameters calculated on the basis of three optical flows, a rectangular image may be deformed into a parallelogram. On the other hand, when an image is affine-transformed by using affine transformation parameters calculated on the basis of two optical flows, at least one transformation among translation, rotation, and zoom (zoom ratios in the x and y directions are the same) can be performed in a state of the rectangular image. In an example explained in the first embodiment, an image is transformed by using affine transformation parameters calculated on three optical flows. However, the present invention can be applied in the same manner when an image is transformed by using affine transformation parameters calculated on the basis of two optical flows.

The operation of the image processing apparatus 100 according to the first embodiment is explained with reference to the drawings.

FIG. 8 is a flowchart of a processing procedure of affine transformation parameter detection processing by the image processing apparatus 100 according to the first embodiment.

First, a moving image file is input to the moving-image input unit 110 (step S901). A variable "t" is initialized to "0" (step S902). Subsequently, the moving image file input to the moving-image input unit 110 is decoded and an image of one frame is acquired in time series order (step S903). It is determined whether the acquired one frame (hereinafter referred to as frame "t") is a leading frame of the moving image file input to the moving-image input unit 110 (i.e., t=0) (step S904). When the frame "t" is the leading frame (Yes in step S904), affine transformation parameters of a unit matrix are selected as affine transformation parameters (step S905) and the processing proceeds to step S915. On the other hand, when the frame "t" is not the leading frame (i.e., t≠0) (No in step S904), feature points are extracted from an entire image corresponding to the frame "t" (step S906).

Concerning the feature points extracted from the entire image corresponding to the frame "t", optical flows corresponding to the immediately preceding frame on a time axis (hereinafter referred to as frame "t−1") are calculated (step S907). As shown in FIG. 5B, optical flows corresponding to corner points are calculated. Feature points in an image corresponding to the frame "t−1" are detected according to the calculated optical flows.

A variable "i" is initialized to "0" (step S908). M feature points are selected out of the feature points where the optical flows are detected (step S909). For example, when affine transformation parameters are used as camerawork parameters, the three feature points are selected at random. When projection transformation parameters are used as camerawork parameters, four feature points are selected at random. Affine transformation parameters are calculated on the basis of M optical flows calculated to correspond to the selected M feature points (step S910).

A score of the calculated affine transformation parameters is calculated on the basis of the affine transformation parameters (step S911). Specifically, positions of movement destinations of all the feature points in the image corresponding to the frame "t" (i.e., positions in the image corresponding to the frame "t−1") are calculated by using the calculated affine transformation parameters. The positions of the feature points calculated by using the affine transformation parameters and the positions of the feature points in the image corresponding to the frame "t−1" calculated in calculating the optical flows in step S907 are compared. According to the comparison, for each of the feature points, a difference value between positions of two feature points corresponding to each other is calculated. As the difference value, for example, an absolute difference between two positions corresponding to each other is calculated. For each of the feature points, the calculated difference value and a threshold set in advance are compared. The number of feature points having difference values smaller than the threshold is calculated as a score of the affine transformation parameters.

"1" is added to the variable "i" (step S912) and it is determined whether the variable "i" is larger than a constant N (step S913). When the variable "i" is equal to or smaller than the constant N (No in step S913), the processing returns to step S909 and the score calculation processing for the affine transformation parameters is repeated (steps S909 to S911). For example, 20 can be used as the constant N.

On the other hand, when the variable "i" is larger than the constant N (Yes in step S913), as a representative affine transformation parameter, an affine transformation parameter having a largest value of a score among calculated scores of the affine transformation parameters is selected (step S914). An inverse matrix of an affine matrix of the selected representative affine transformation parameter is calculated (step S915) Affine transformation parameters of the inverse matrix are recorded in the metadata storing unit 210 in association with the frame "t" (step S916). When the frame "t" is a leading frame, affine transformation parameters of a unit matrix are recorded in the metadata storing unit 210 in association with the leading frame (step S916). An image corresponding to the frame "t" is overwritten and stored (step S917).

It is determined whether the frame "t" is a last frame of the moving image file input to the moving-image input unit 110 (step S918). When the frame "t" is not the last frame (No in step S918), "1" is added to the variable "t" (step S919) the processing returns to step S903, and the affine transformation parameter detection processing is repeated (steps S903 to S917). On the other hand, when the frame "t" is the last frame (Yes in step S918), the affine transformation parameter detection processing ends.

In the example explained in the first embodiment, as detection of camerawork parameters, affine transformation parameters are detected on the basis of optical flows detected in the image forming the moving image. However, a sensor such as an acceleration sensor or a gyro sensor and a zoom button used in performing zoom operation may be provided in the camera to calculate camerawork parameters using the sensor and the zoom button. In other words, it is possible to detect a movement amount of the camera during photographing using the sensor and the zoom button and calculate camerawork parameters on the basis of the movement amount of the camera. For example, affine transformation parameters concerning the image "t−1" and the image "t" may be calculated using optical flows from the image "t−1" to the image "t" calculated concerning feature points in an entire screen of the image "t−1".

Image Combination Example

Processing for combining images forming a moving image to create a combined image using affine transformation parameters calculated by the camerawork detecting unit 120 is explained in detail with reference to the drawings. Images shown in FIGS. 9A to 9C to FIGS. 17A to 17C are simplified for explanation and a shift amount between continuous two frames is shown large. In an example shown in FIGS. 9A to 9C to FIGS. 17A to 17C, images corresponding to later frames are sequentially overwritten on images corresponding to earlier frames on a time axis and combined.

First, during photographing by the camera, although magnification is not changed, the direction of a lens of the camera is shifted in upward, downward, to the left, or to the right around the position of the camera.

Figure 9A:
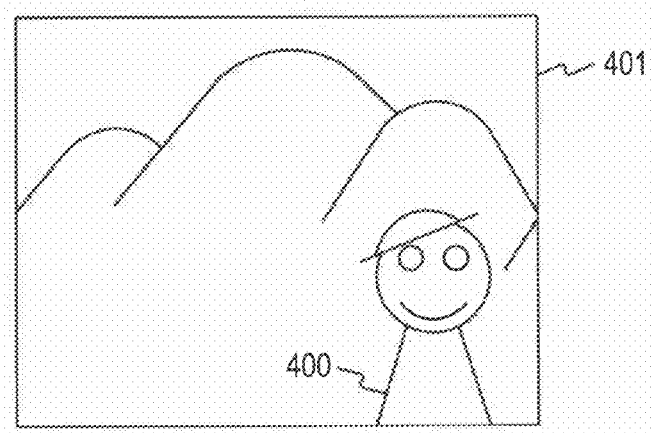
FIGS. 9A to 9C are diagrams of an example of transition of a moving image photographed by a camera.
Figure 9B:
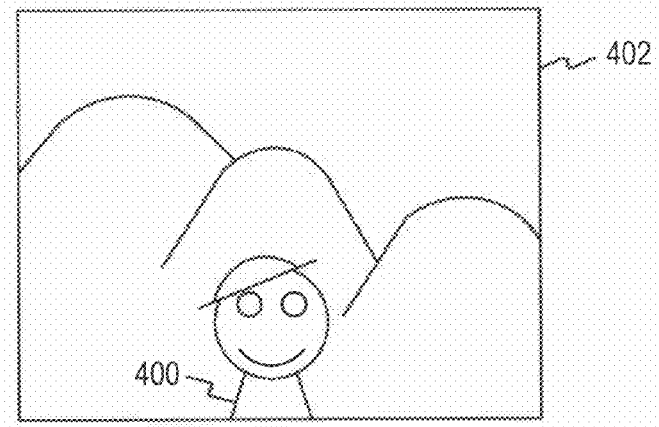
Figure 9C:
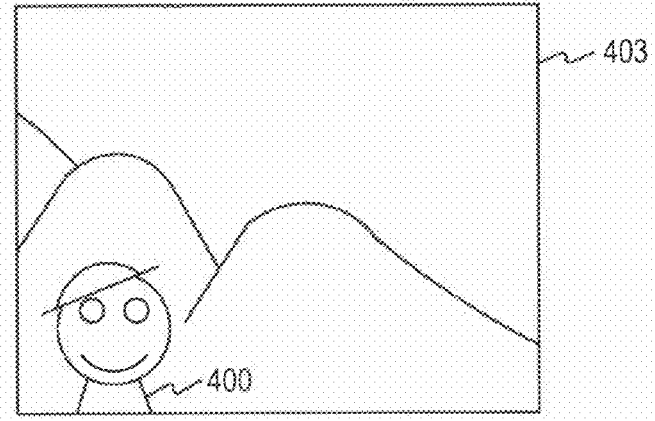

FIGS. 9A to 9C are diagrams of an example of transition of a moving image photographed by the camera. In FIGS. 9A to 9C, images 401 to 403 corresponding to continuous frames included in a moving image obtained by photographing a person 400 with mountains as a background are shown. In this example, a photographer performs photographing while shifting the direction of the lens of the camera to the right and upward. In this case, the person 400 included in the moving image photographed by the camera moves from the right side to the left side and moves downward in an image forming the moving image.

Figure 10A:
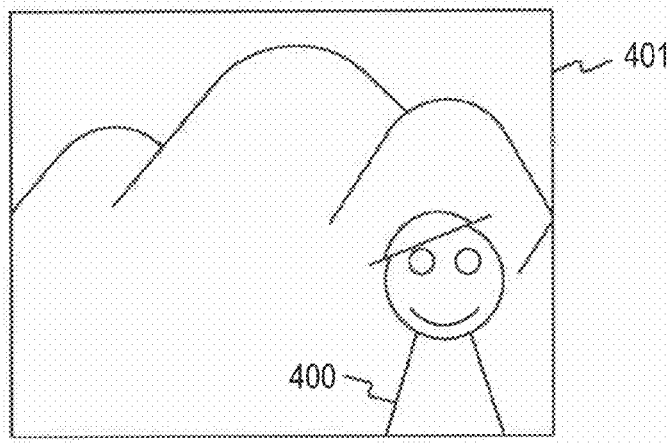
FIGS. 10A to 10C are diagrams of an optical flow calculation example in calculating an optical flow with an optical-flow calculating unit 122 according to the first embodiment.
Figure 10B:
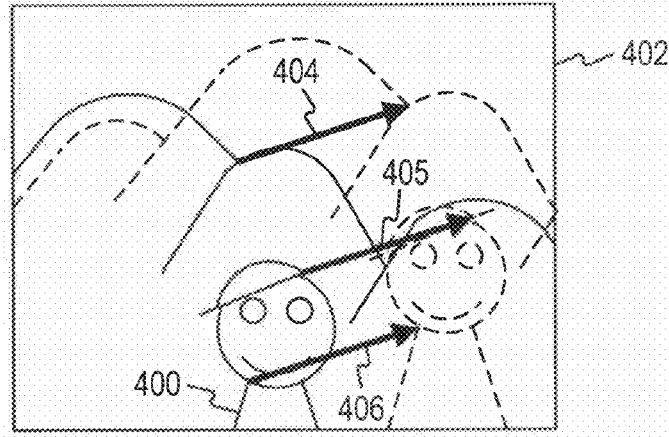
Figure 10C:
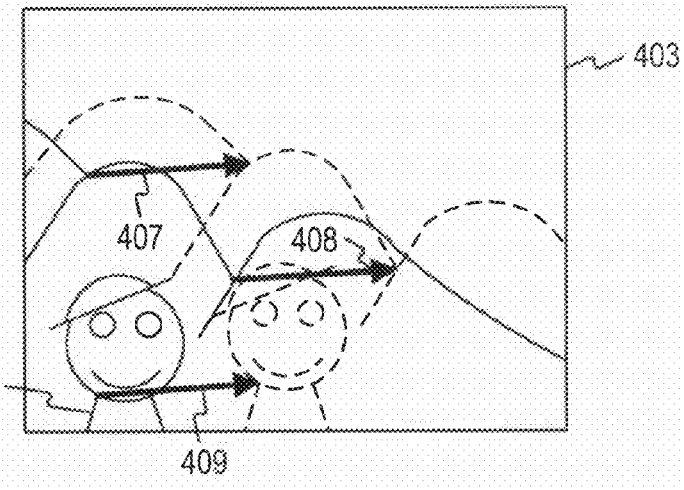

FIGS. 10A to 10C are diagrams of an optical flow calculation example in calculating optical flows with the optical-flow calculating unit 122 according to the first embodiment. In the images 402 and 403 shown in FIGS. 10B and 10C, an image corresponding to the immediately preceding frame is indicated by a broken line. The image 401 shown in FIG. 10A is the same as the image 401 shown in FIG. 9A. A solid line portion of the image 402 shown in FIG. 10B is the same as the image 402 shown in FIG. 9B. A broken line portion of the image 402 shown in FIG. 10B is the same as a solid line portion of the image 401 shown in FIG. 10A. Arrows 404 to 406 in the image 402 shown in FIG. 10B indicate an example of optical flows detected from the image 402. Similarly, a solid line portion of the image 403 shown in FIG. 10C is the same as the image 403 shown in FIG. 9C. A broken line portion of the image 403 shown in FIG. 10C is the same as the solid line portion of the image 402 shown in FIG. 10B. Arrows 407 to 409 in the image 403 shown in FIG. 10C indicate an example of optical flows detected from the image 403.

As shown in FIGS. 10B and 10C, the person 400 and the mountains in the background included in the image move according to the movement of the camera. Affine transformation parameters can be calculated for each of frames on the basis of optical flows detected by the movement.

Figure 11A:
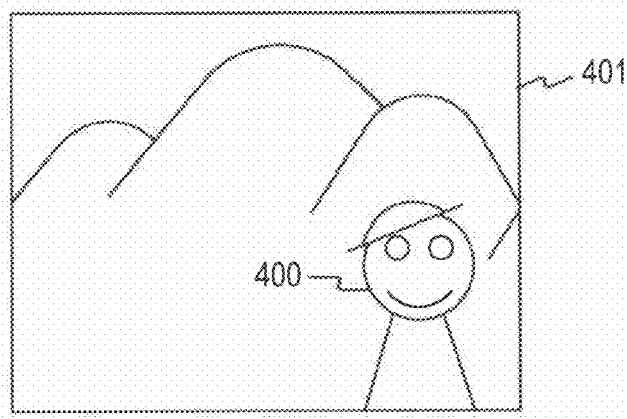
FIGS. 11A to 11C are diagrams of an image combination example in combining images forming a moving image with an image combining unit 190 according to the first embodiment.
Figure 11B:
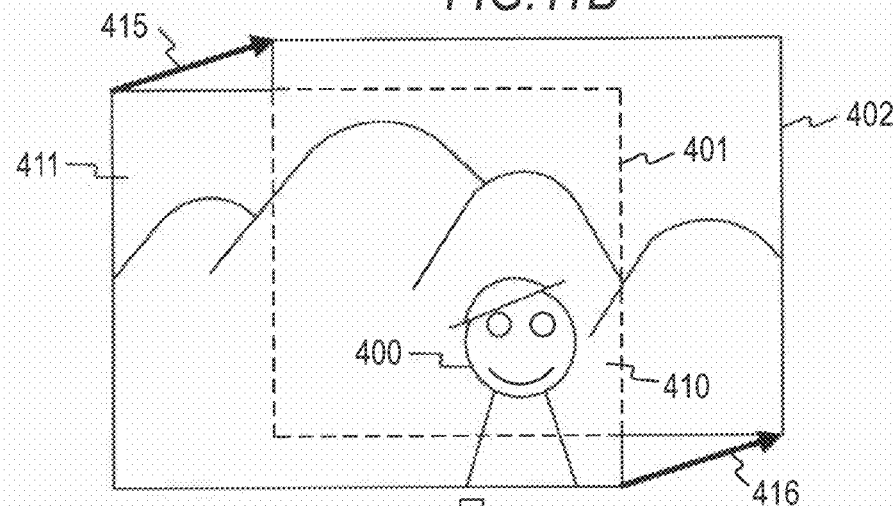
Figure 11C:
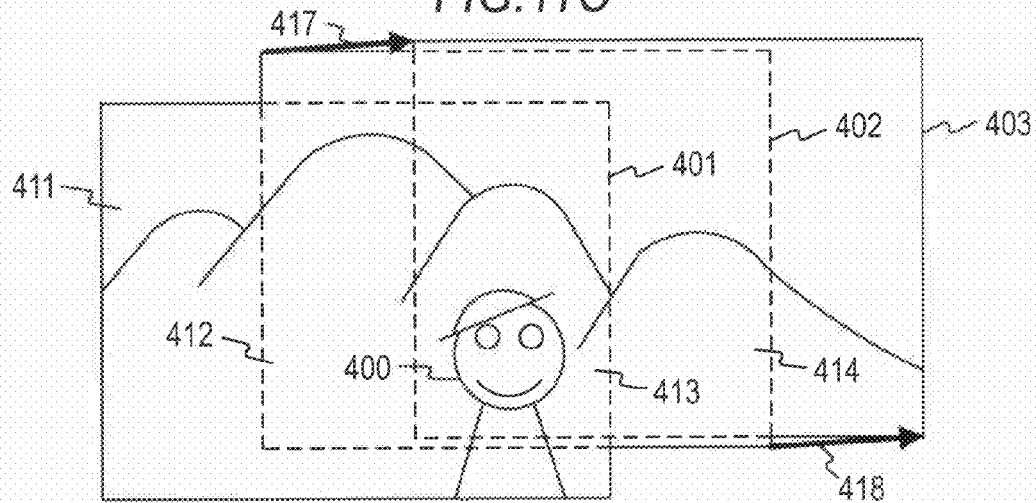

FIGS. 11A to 11C are diagrams of an image combination example in combining images forming a moving image with the image combining unit 190 according to the first embodiment. In this example, it is assumed that the image 401 corresponds to a leading frame.

For example, when an affine matrix of affine transformation parameters associated with the image 401 is represented as A1, the image transforming unit 180 affine-transforms the image 401 according to a matrix of A1 with the position and the size of the image 401 of the leading frame set as a reference. Since the image 401 is an image corresponding to the leading frame, A1 is a unit matrix. Therefore, the position and the size of the image 401 are not transformed. Affine transformation parameters obtained by affine-transforming the image 401 are stored in the image transforming unit 180.

Subsequently, when the image 402 corresponding to the next frame is combined, the image transforming unit 180 affine-transforms the image 402 using affine transformation parameters associated with the image 402. For example, a matrix of affine transformation parameters associated with the image 402 is represented as A2 and a matrix of affine transformation parameters associated with the image 401 is represented as A1. In this case, the image transforming unit 180 reads out a value of A1×A2 and affine-transforms the image 402 according to a calculated matrix of A1×A2 with the position and the size of the image 401 of the leading frame set as a reference. In the example shown in FIG. 11B, as indicated by arrows 415 and 416, only the position of the image 402 is transformed. The image combining unit 190 overwrites the image 402 affine-transformed by the image transforming unit 180 to overlap the image 401 corresponding to the immediately preceding frame and combines the images. An image of the image 402 is overwritten in an area 410 that overlaps the image 402 in an area of the image 401. An image of the image 402 is not overwritten in an area 411 that does not overlap the image 402 in the area of the image 401. When the image 402 corresponding to a second frame is combined, as shown in FIG. 11B, an image is created by combining the entire portion of the image 402 and a portion corresponding to the area 411 in the image 401. Affine transformation parameters obtained by affine-transforming the image 402 are stored in the image transforming unit 180.

When the image 403 corresponding to the next frame is displayed, the image transforming unit 180 affine-transforms the image 403 using affine transformation parameters associated with the image 403. The image 403 is affine-transformed by using affine matrixes of affine transformation parameters corresponding to the images 401 to 403. For example, a matrix of affine transformation parameters corresponding to the image 403 is represented as A3, a matrix of affine transformation parameters corresponding to the image 402 is represented as A2, and a matrix of affine transformation parameters corresponding to the image 401 is represented as A1. In this case, the image transforming unit 180 calculates a value of A1×A2×A3 and affine-transforms the image 403 according to a calculated matrix of A1×A2×A3 with the position and the size of the image 401 of the leading frame set as a reference. In an image shown in FIG. 11C, as indicated by arrows 417 and 418, only the position of the image 403 is transformed. Subsequently, the image combining unit 190 overwrites the image 403 affine-transformed by the image transforming unit 180 to overlap a combined image of the images 401 and 402 corresponding to the preceding frame and combines the images. An image of the image 403 is overwritten in areas 413 and 414 that overlap the image 403 in an area of the combined image of the images 401 and 402. The combined image of the images 401 and 402 is combined with areas 411 and 412 that do not overlap the image 403 in the area of the combined image of the images 401 and 402. When the image 403 corresponding to a third frame is combined, as shown in FIG. 11C, an image is created by combining an entire portion of the image 403, a portion corresponding to the area 411 in the image 401, and a portion corresponding to the area 412 of the image 402. Affine transformation parameters obtained by affine-transforming the image 403 are stored in the image transforming unit 180. In this way, when the image corresponding to the present frame is affine-transformed, the image corresponding to the present frame is affine-transformed by using an affine matrix of the affine transformation parameters corresponding to the frames from the leading frame to the present frame. The affine transformation parameters calculated in the affine transformation are stored in the image transforming unit 180 and used in the next affine transformation. The same holds true in FIGS. 14A to 14C and FIGS. 17A to 17C.

In the following explanation, during photographing by the camera, although the direction of the lens of the camera is not shifted, magnification is changed.

FIGS. 12A to 12C are diagrams of an example of transition of a moving image photographed by the camera. In FIGS. 12A to 12C, images 421 to 423 corresponding to continuous frames included in a moving image obtained by photographing a person 420 with mountains as a background are shown. In this example, the photographer performs photographing while increasing the magnification of the lens of the camera. In this case, the person 420 included in the moving image photographed by the camera is gradually increased in size in an image forming the moving image. The position of the camera may shift a little when the magnification is increased. However, in this example, the shift of the position of the camera is not taken into account.

Figure 13A:
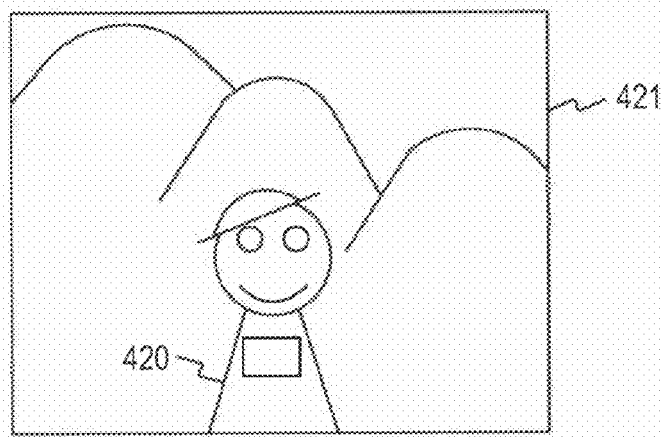
FIGS. 13A to 13C are diagrams of an optical flow calculation example in calculating an optical flow with the optical-flow calculating unit 122 according to the first embodiment.
Figure 13B:
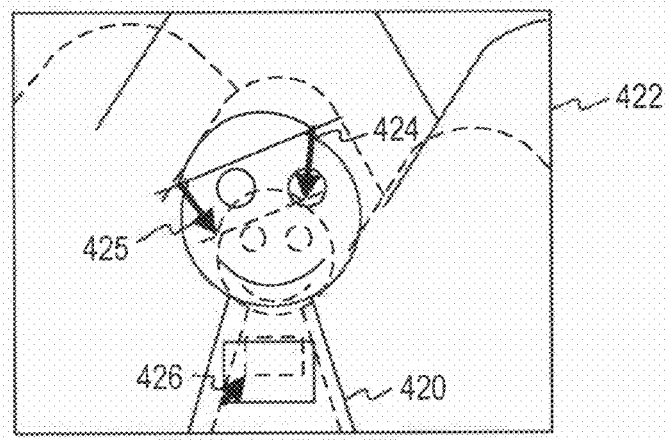
Figure 13C:
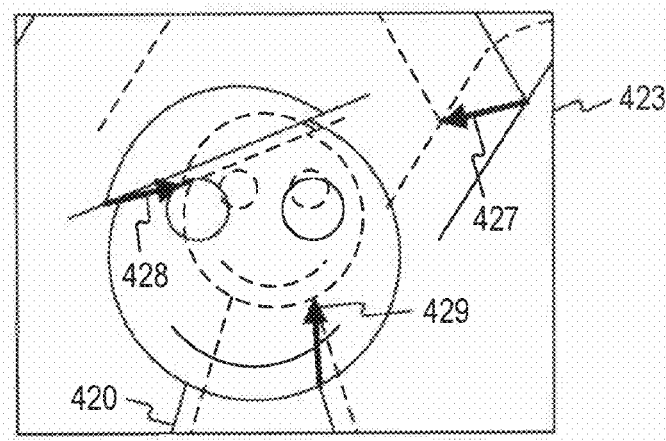

FIGS. 13A to 13C are diagrams of an optical flow calculation example in calculating optical flows with the optical-flow calculating unit 122 according to the first embodiment. In the images 422 and 423 shown in FIGS. 13B and 13C, an image corresponding to the immediately preceding frame is indicated by a broken line. The image 421 shown in FIG. 13A is the same as the image 421 shown in FIG. 12A. A solid line portion of the image 422 shown in FIG. 13B is the same as the image 422 shown in FIG. 12B. A broken line portion of the image 422 shown in FIG. 13B is the same as the solid line portion of the image 421 shown in FIG. 12A. Arrows 424 to 426 in the image 422 shown in FIG. 13B indicate an example of optical flows detected from the image 422. Similarly, a solid line portion of the image 423 shown in FIG. 13C is the same as the image 423 shown in FIG. 12C. A broken line portion of the image 423 shown in FIG. 13C is the same as the solid line portion of the image 422 shown in FIG. 12B. Arrows 427 to 429 in the image 423 shown in FIG. 13C indicate an example of optical flows detected from the image 423.

As shown in FIGS. 13B and 13C, the sizes of the person 420 and the mountains in the background included in the image are changed according to the change in the magnification. Affine transformation parameters can be calculated for each of the frames on the basis of optical flows detected according to the change.

Figure 14A:
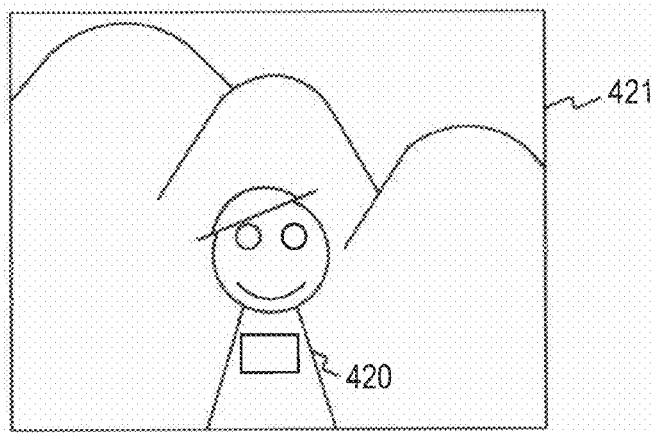
FIGS. 14A to 14C are diagrams of an image combination example in combining images forming a moving image with the image combining unit 190 according to the first embodiment.
Figure 14B:
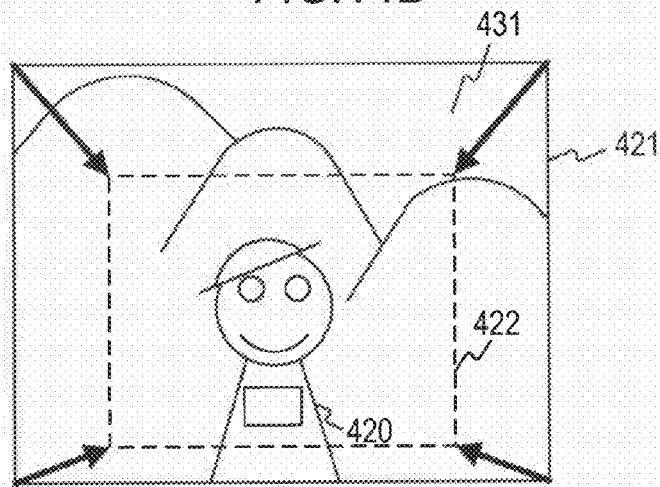
Figure 14C:
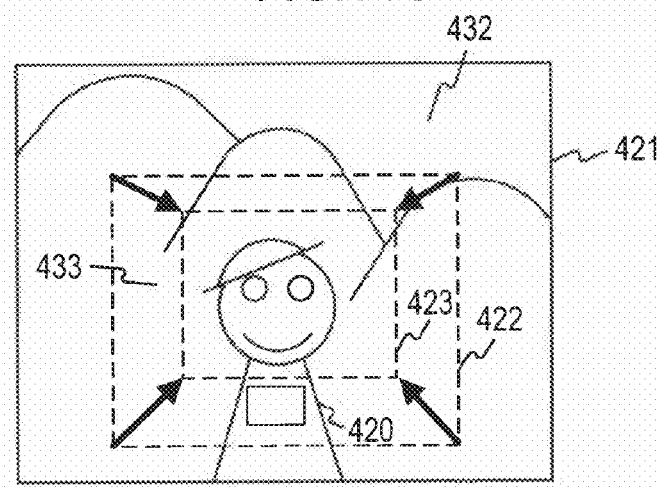

FIGS. 14A to 14C are diagrams of an image combination example in combining images forming a moving image with the image combining unit 190 according to the first embodiment. In this example, it is assumed that the image 421 is an image corresponding to the leading frame.

For example, when the image 422 is combined, the image 422 is affine-transformed by using affine transformation parameters associated with a frame of the image 422. In the example shown in FIG. 14B, as indicated by arrows, only the size of the image 422 is transformed. The image 422 affine-transformed by the affine transformation parameters is overwritten to overlap the image 421 corresponding to the immediately preceding frame. Specifically, an image of the image 422 is overwritten in an area that overlaps the image 422 among areas of the image 421. In this case, since the image 421 overlaps all the areas of the image 422, the entire image is overwritten on the image 421. An image of the image is combined in an area 431 that does not overlap the image among the areas of the image 421. When the image 422 corresponding to a second frame is combined, as shown in FIG. 14B, the entire portion of the image 422 and a portion corresponding to the area 431 in the image 421 are combined. Affine transformation parameters obtained by affine-transforming the image 422 are stored in the image transforming unit 180.

Subsequently, when the image 423 corresponding to the next frame is combined, the image 423 is affine-transformed by using affine transformation parameters associated with the frame. Specifically, the image 423 is affine-transformed by affine transformation parameters calculated by multiplying together affine matrixes of affine transformation parameters corresponding to the images 421 to 423. In the example shown in FIG. 14C, as indicated by arrows, only the size of the image 423 can be transformed. The affine-transformed image 423 is overwritten to overlap the combined image of the images 421 and 422 corresponding to the preceding frame. Specifically, an image of the image 423 is overwritten in an area that overlaps the image 423 among areas of the combined image of the images 421 and 422. In this case, since the image 423 overlaps all the areas of the images 421 and 422, the entire image 423 is overwritten on the combined image of the images 421 and 422. The combined image of the images 421 and 422 is combined in areas 432 and 433 that do not overlap the image 423 among the areas of the combined image of the images 421 and 422. When the image 423 corresponding to the third frame is combined, as shown in FIG. 14C, the entire portion of the image 423, a portion corresponding to the area 432 in the image 421, and a portion corresponding to the area 433 in the image 422 are combined. Affine transformation parameters obtained by affine-transforming the image 423 are stored in the image transforming unit 180. Specifically, affine transformation parameters calculated by using affine transformation parameters corresponding to the images 421 to 423 are stored in the image transforming unit 180.

In the following explanation, during photographing by the camera, although the direction and the magnification of the lens of the camera are not changed, the camera is rotated with an optical axis direction set as a rotation center.

Figure 15A:
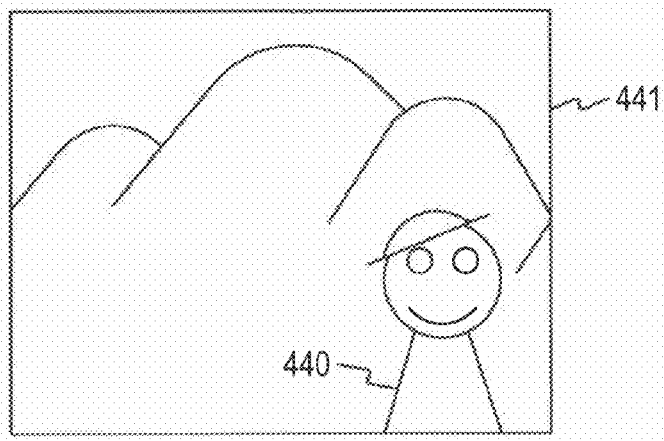
FIGS. 15A to 15C are diagrams of an example of transition of a moving image photographed by a camera.
Figure 15B:
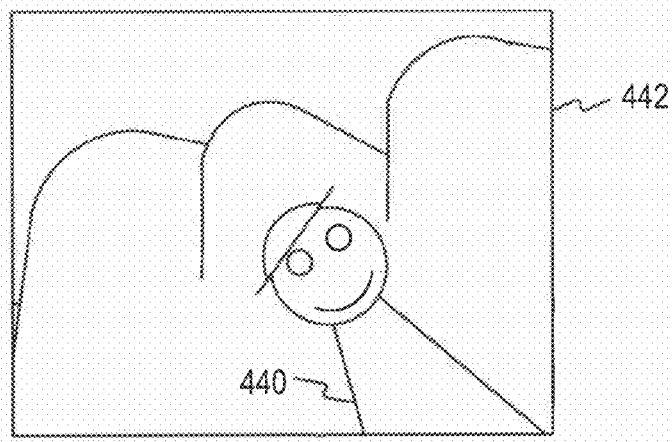
Figure 15C:
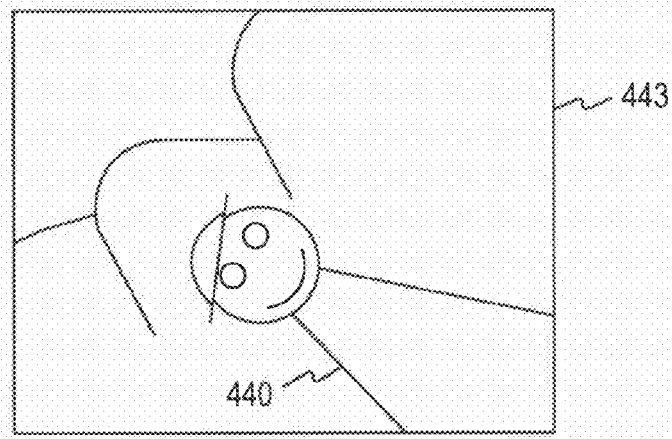

FIGS. 15A to 15C are diagrams of an example of transition of a moving image photographed by the camera. In FIGS. 15A to 15C, images 441 to 443 corresponding to continuous frames included in a moving image obtained by photographing a person 440 with mountains as a background are shown. In this example, the photographer is performing photographing while rotating the camera with an optical axis direction set as a rotation center. In this case, the person 440 included in the moving image photographed by the camera rotates in images forming the moving image. Although the position of the camera may shift a little because of the rotation of the camera, in this example, the shift of the position of the camera is not taken into account.

Figure 16A:
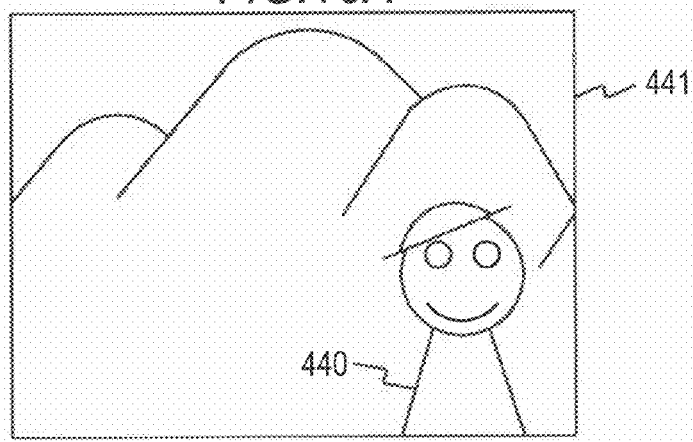
FIGS. 16A to 16C are diagrams of an optical flow calculation example in calculating an optical flow with the optical-flow calculating unit 122 according to the first embodiment.
Figure 16B:
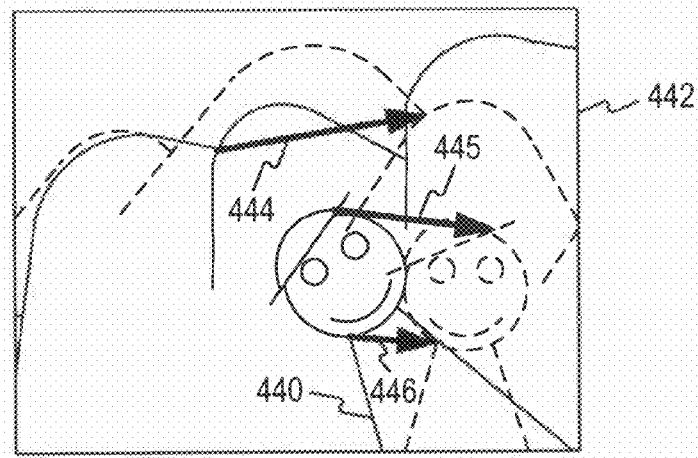
Figure 16C:
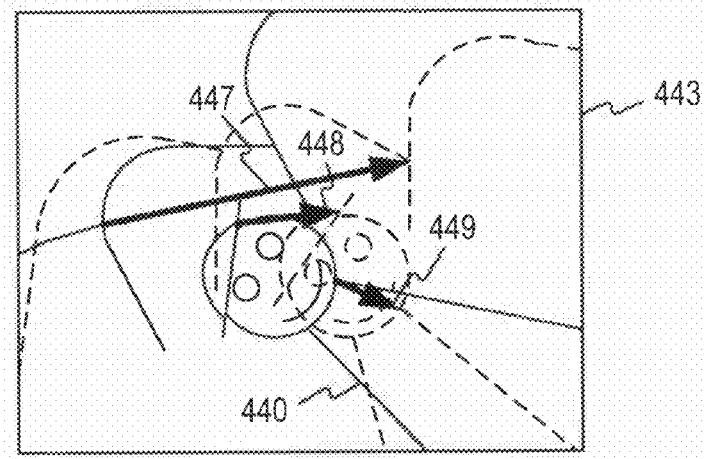

FIGS. 16A to 16C are diagrams of an optical flow calculation example in calculating optical flows with the optical-flow calculating unit 122 according to the first embodiment. In the images 442 and 443 shown in FIGS. 16B and 16C, an image corresponding to the immediately preceding frame is indicated by a broken line. The image 441 shown in FIG. 16A is the same as the image 441 shown in FIG. 15A. A solid line portion of the image 442 shown in FIG. 16B is the same as the image 442 shown in FIG. 15B. A broken line portion of the image 442 shown in FIG. 16B is the same as the solid line portion of the image 441 shown in FIG. 15A. Arrows 444 to 446 in the image 442 shown in FIG. 16B indicate an example of optical flows detected from the image 442. Similarly, a solid line portion of the image 443 shown in FIG. 16C is the same as the image 443 shown in FIG. 15C. A broken line portion of the image 443 shown in FIG. 16C is the same as the solid line portion of the image 442 shown in FIG. 15B. Arrows 447 to 449 in the image 443 shown in FIG. 16C indicate an example of optical flow detected from the image 443.

As shown in FIGS. 16B and 16C, the person 440 and the mountains in the background included in the image rotationally move according to the rotation of the camera. Affine transformation parameters can be calculated for each of the frames on the basis of optical flows detected according to the rotational movement.

Figure 17A:
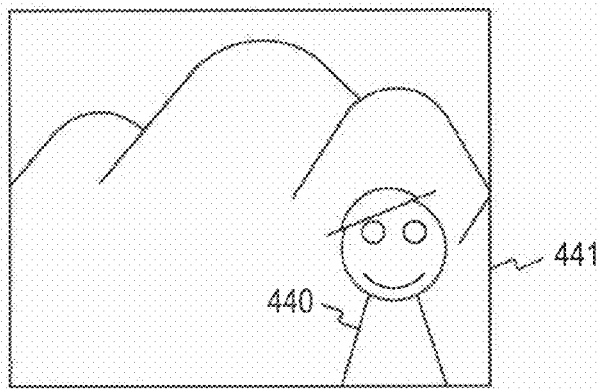
FIGS. 17A to 17C are diagrams of an image combination example in combining images forming a moving image with the image combining unit 190 according to the first embodiment.
Figure 17B:
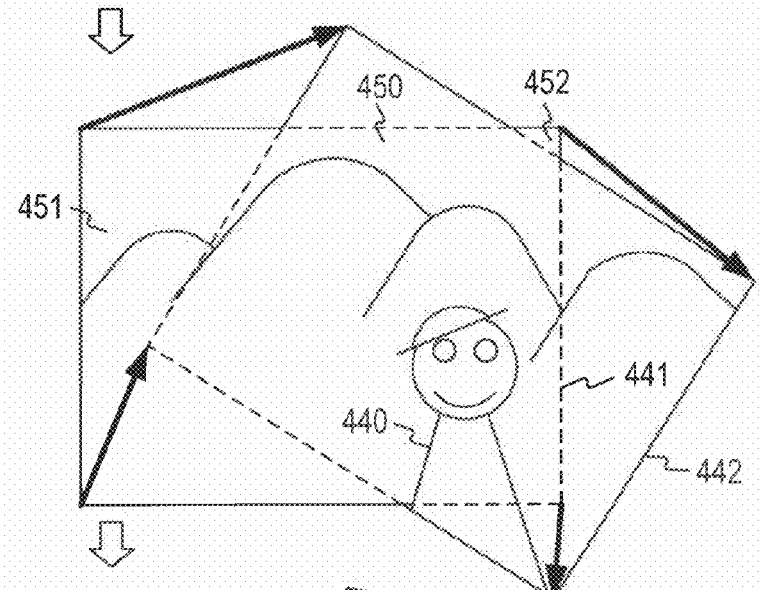
Figure 17C:
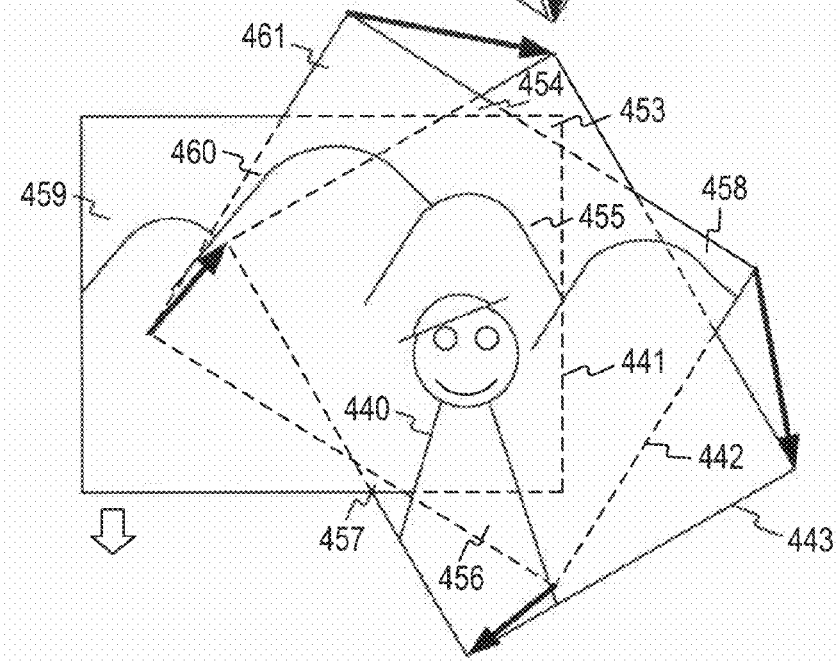
Figure 18A:
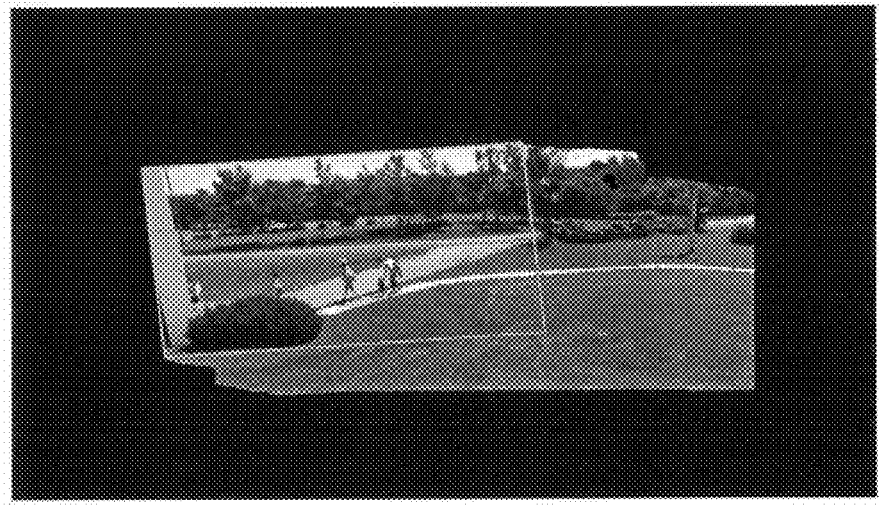
FIGS. 18A to 18C are diagrams of an example of transition in combining images forming a moving image photographed by a camera.
Figure 18B:
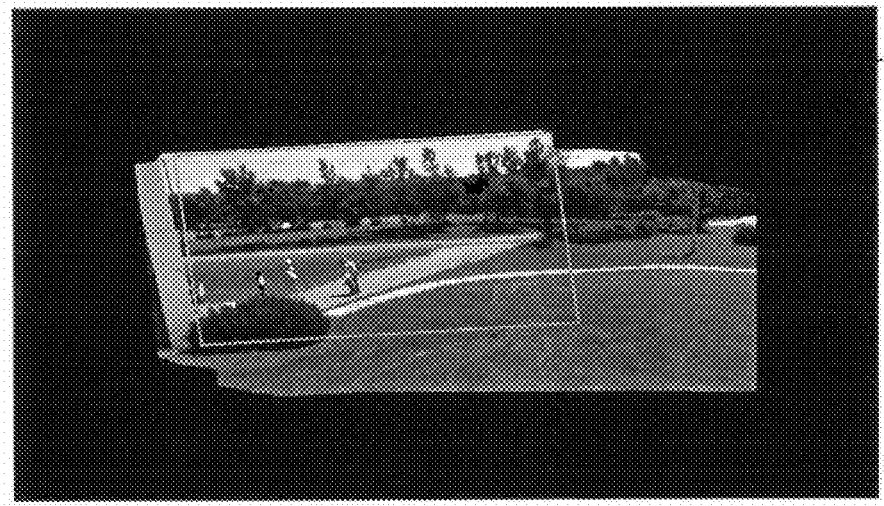
Figure 18C:
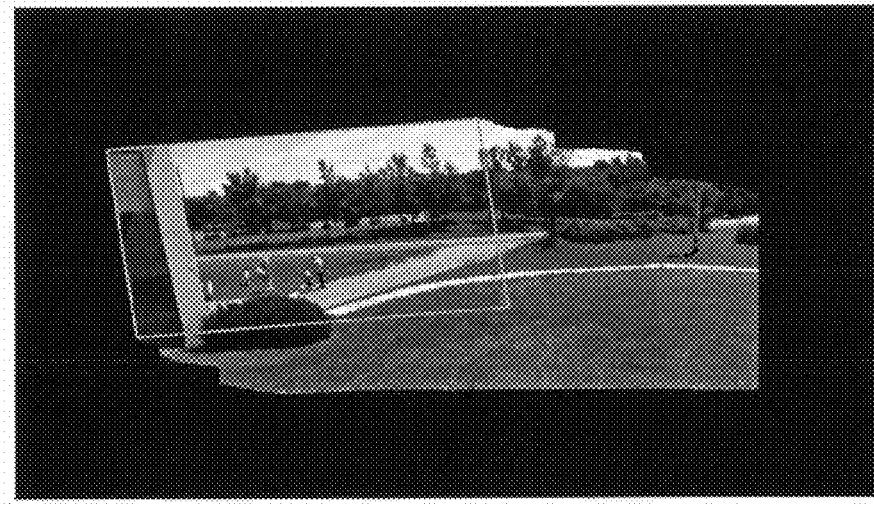
Figure 19A:
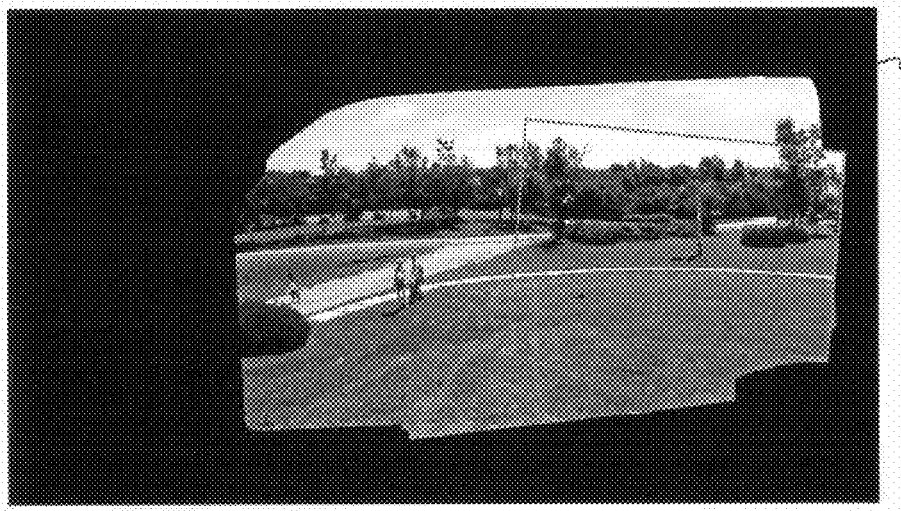
FIGS. 19A to 19C are diagrams of an example of transition in combining images forming a moving images photographed by the camera.
Figure 19B:
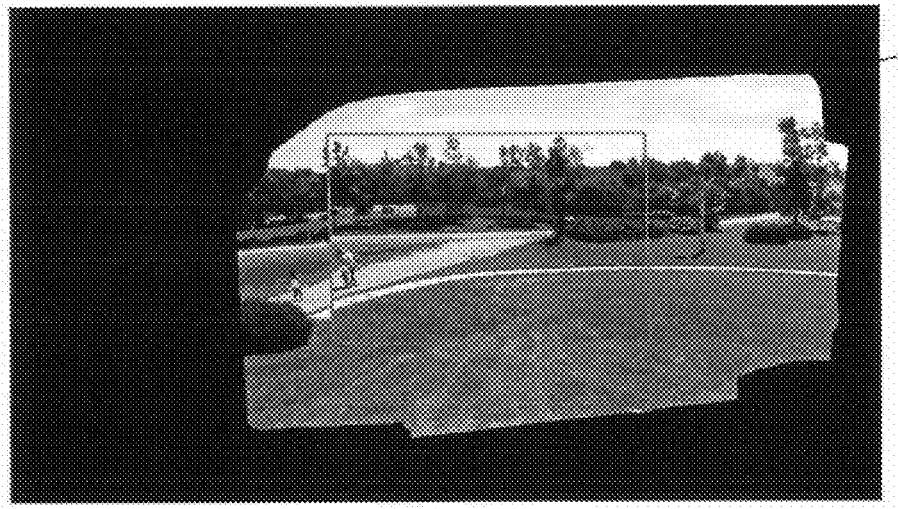
Figure 19C:
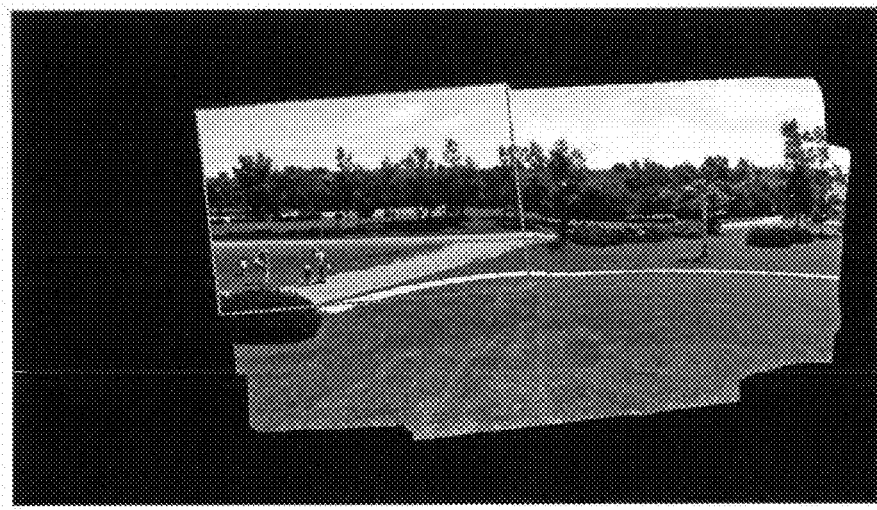

FIGS. 17A to 17C are diagrams of an image combination example in combining images forming a moving image with the image combining unit 190 according to the first embodiment. In this example, it is assumed that the image 441 is an image corresponding to a leading frame.

For example, when the image 442 is combined, the image 442 is affine-transformed by using affine transformation parameters associated with a frame of the image 442. In the example shown in FIG. 17B, as indicated by arrows, only the angle of the image 442 is transformed. The image 442 affine-transformed by the affine transformation parameters is overwritten to overlap the image 441 corresponding to the immediately preceding frame. Specifically, an image of the image 442 is overwritten in an area 450 that overlaps the image 442 among areas of the image 441. An image of the image 441 is combined in areas 451 and 452 that do not overlap the image 442 among the areas of the image 441. When the image 442 corresponding to a second frame is combined, as shown in FIG. 17B, the entire portion of the image 442 and a portion corresponding to the areas 451 and 452 of the image 441 are combined. Affine transformation parameters obtained by affine-transforming the image 442 are stored in the image transforming unit 180.

Subsequently, when the image 443 corresponding to the next frame is combined, the image 443 is affine-transformed by using affine transformation parameters associated with the frame. Specifically, the image 423 is affine-transformed by affine transformation parameters calculated by multiplying together affine matrixes of affine transformation parameters corresponding to the images 441 to 443. In the example shown in FIG. 17C, as indicated by arrows, only the angle of the image 443 is transformed. The affine-transformed image 443 is overwritten to overlap the combined image of the images 441 and 442 corresponding to the preceding frame. Specifically, an image of the image 443 is overwritten in areas 453 to 457 that overlap the image 443 among areas of the combined image of the images 441 and 442. The combined image of the images 441 and 442 is further combined in areas 458 to 461 that do not overlap the image 443 among the areas of the combined image of the images 441 and 442. Specifically, when the image 443 corresponding to a third frame is combined, as shown in FIG. 17C, the entire portion of the image 443, a portion corresponding to an area 459 of the image 441, and a portion corresponding to areas 458 and 460 of the image 442 are combined. Affine transformation parameters obtained by affine-transforming the image 443 are stored in the image transforming unit 180. Specifically, affine transformation parameters calculated by using affine transformation parameters corresponding to the images 441 to 443 are stored in the image transforming unit 180.

A combination example in combining images of a moving image actually photographed by the camera is explained below.

FIGS. 18A to 18C and FIGS. 19A to 19C are diagrams of an example of transition in combining images forming a moving image photographed by a camera. In an example shown in the figures, a combined image is created concerning a moving image obtained by photographing a family playing in an open space of a park while moving the camera. In the example shown in the figures, combined images are sequentially shown in blackened rectangular areas 760 to 765. Specifically, in rectangular areas 760 to 765, a combined image is rendered only in areas in which images corresponding to the present frame and the preceding frames are combined and other areas are blackened. A frame is shown around the image corresponding to the present frame. In the figure, a combination example from halfway in combining images is shown. Actually, images are sequentially combined for each of the frames. However, in the figure, transition of combination at each interval of a predetermined number of frames is shown. Combined images combined among the frames are not shown. Therefore, the movement of the frame corresponding to the present frame is large in the figure. As shown in the figure, photographing objects (the open space of the park, etc.) included in photographed images are fixed on a screen. While an image corresponding to the present frame moves on a rectangular area according to the motion of the camera, the images are combined.

It is possible to sequentially combine the images forming the moving image to create a combined image using affine transformation parameters calculated by the camerawork detecting unit 120. As shown in FIGS. 9A to 9C to FIGS. 17A to 17C, for example, when a combined image is created concerning a moving image obtained by photographing a stationary person, a panoramic combined image including the person and a background can be created. For example, it is assumed that, for example, concerning a moving image obtained by mainly photographing a moving person, a combined image is created by the image combining method explained above. In this case, it is likely that the person included in images in a former half on a time axis disappears because images in a latter half are overwritten in areas of the person included in the images in the former half. Therefore, processing for creating a combined image according to the image combining method concerning a moving image obtained by mainly photographing a moving person is explained in detail with reference to the drawings.

Figure 20A:
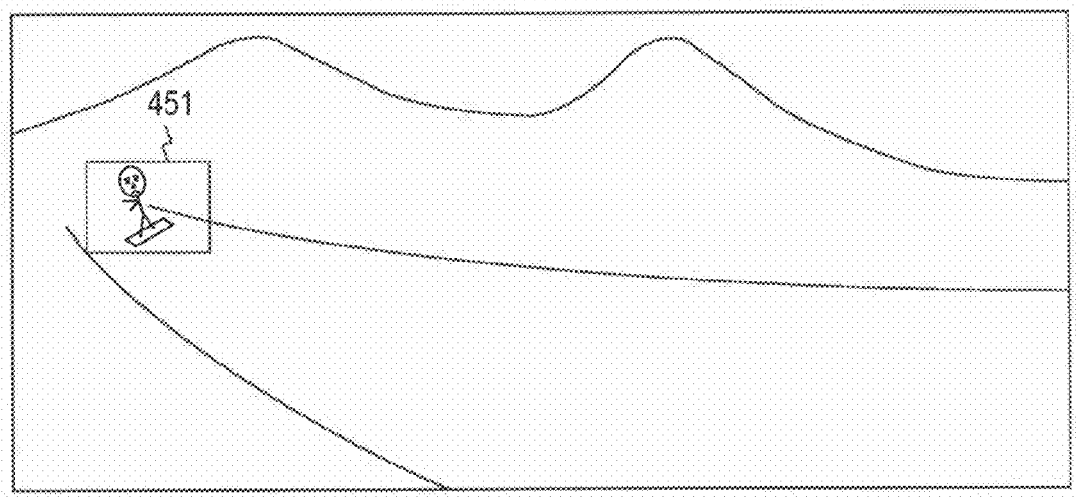
FIGS. 20A to 20c are schematic diagrams of an image pickup range at each fixed interval in picking up an image of a person who is sliding on a slope of a snow mountain with a snowboard.

FIGS. 20A to 20C and FIGS. 21A and 21B are schematic diagrams of image pickup ranges at each fixed interval in picking up an image of a person (a snowboarder) who is sliding on a slope of a snow mountain with a snowboard. In FIGS. 20A to 20C and FIGS. 21A and 21B, image pickup ranges 451 to 455 at each fixed interval are indicated in time series. Specifically, the image pickup range 451 shown in FIG. 20A is an image pickup range at the start of an image pickup operation. The image pickup range 455 shown in FIG. 21B is an image pickup range at the end of the image pickup operation. Image pickup ranges at each fixed interval from the image pickup range 451 to the image pickup range 455 are indicated as image pickup ranges 452 to 454 in time series. In FIGS. 20B and 20C and FIGS. 21A and 21B, image pickup ranges corresponding to frames before the present frame are indicated by broken lines.

Figure 20B:
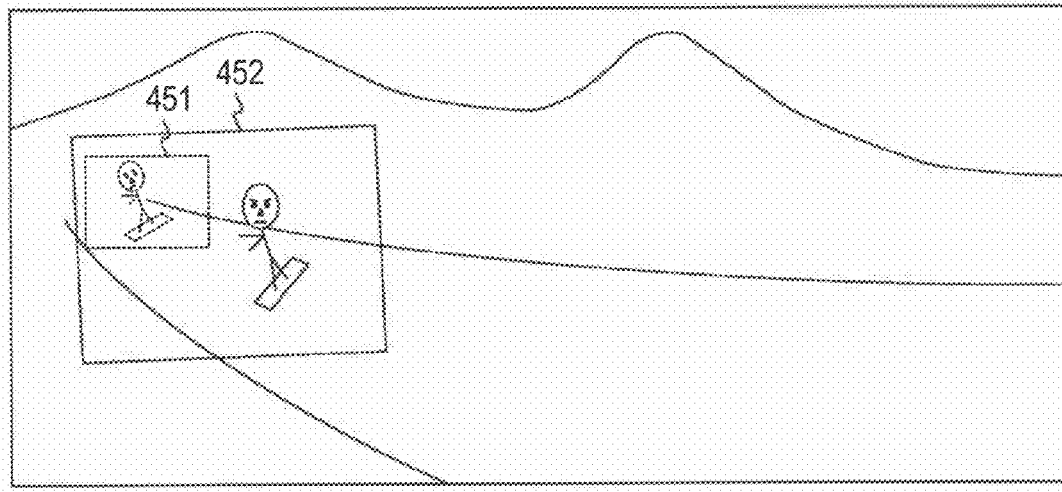
Figure 20C:
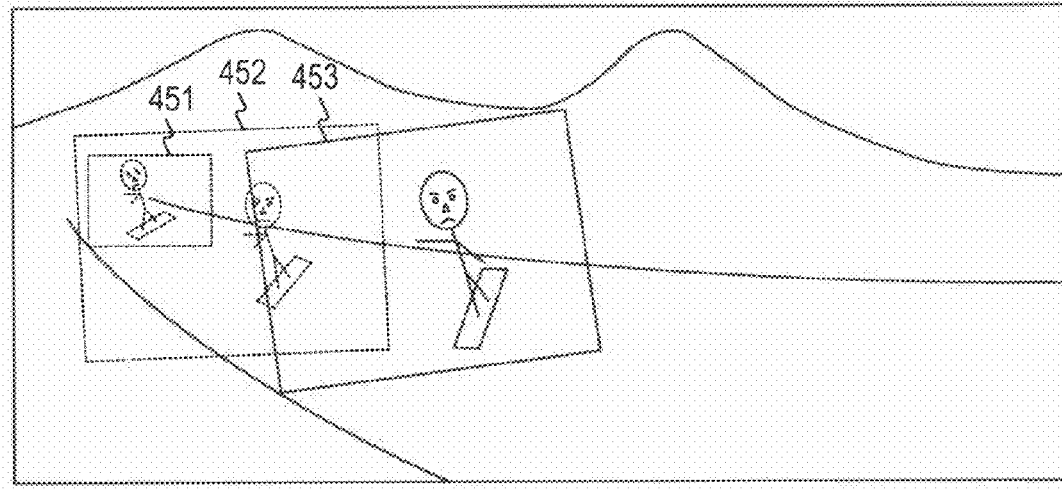

For example, as shown in FIG. 20B, when the image pickup range 452 includes the image pickup range 451, if an image corresponding to the image pickup range 452 is overwritten on an image corresponding to the image pickup range 451, the person included in the image pickup range 451 disappears. Similarly, for example, as shown in FIG. 20C, when the image pickup range 453 includes a part of the image pickup range 452, if an image corresponding to the image pickup range 453 is overwritten on an image corresponding to the image pickup range 452, a part of the person included in the image pickup range 452 disappears. In FIGS. 20A to 20C and FIGS. 21A and 21B, since the image pickup ranges at each fixed interval are shown, the person included in the image pickup ranges 452 to 454 does not entirely overlap the other image pickup ranges. However, when all the images forming the moving image are combined, it is highly likely that the person included in the image pickup areas 451 to 454 completely disappears.

Figure 22A:
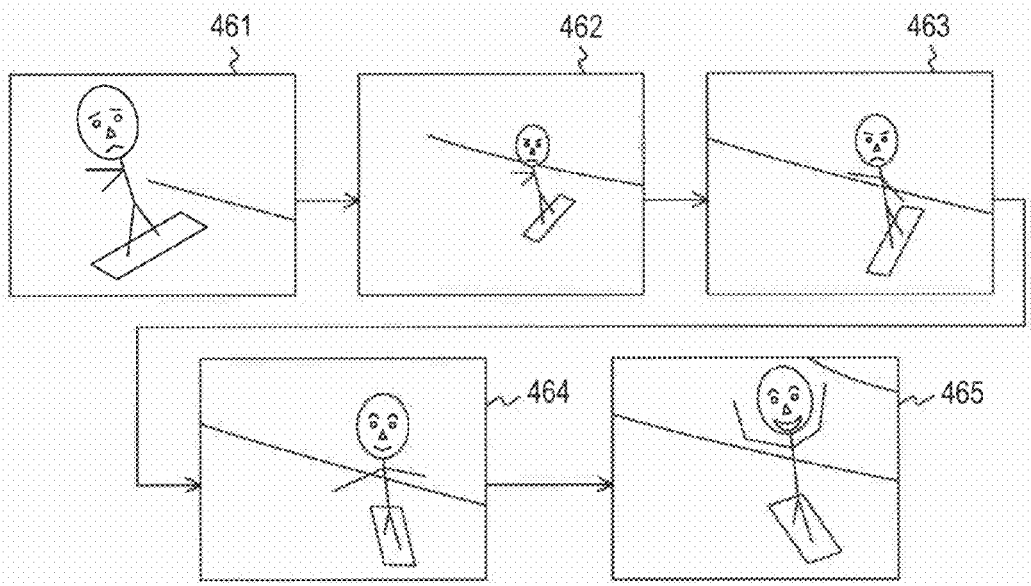
FIGS. 22A to 22C are schematic diagrams of picked-up images 461 to 465 corresponding to image pickup ranges 451 to 455 shown in FIGS. 20A to 20C and FIGS. 21A and 21B and a combined image 466 created by a moving image including the picked-up images 461 to 465.
Figure 22B:
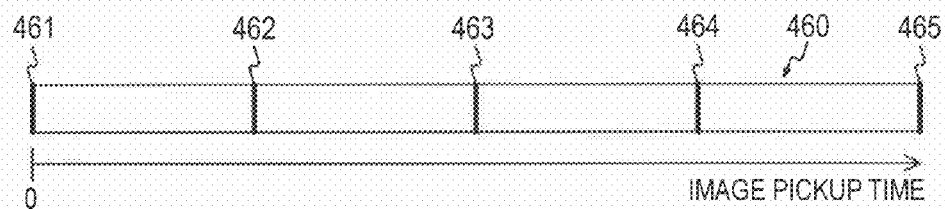
Figure 22C:
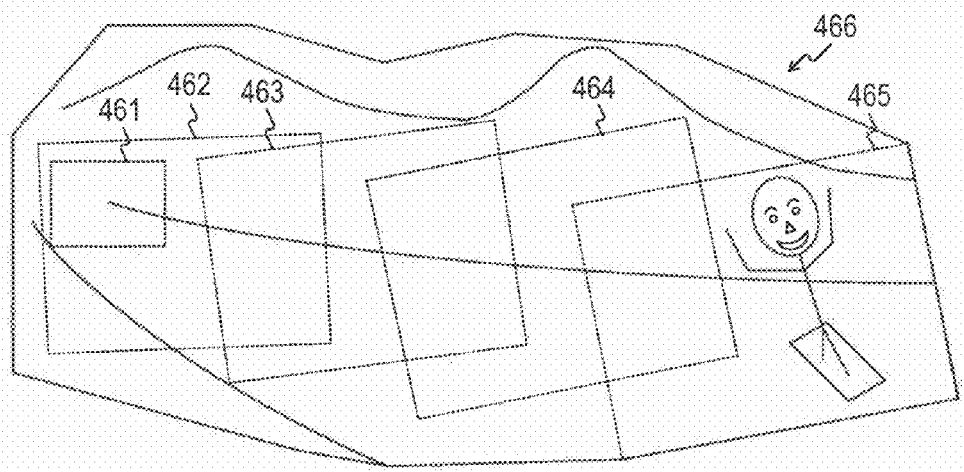

FIGS. 22A to 22C are schematic diagrams of picked-up images 461 to 465 corresponding to the image pickup ranges 451 to 455 shown in FIGS. 20A to 20C and FIGS. 21A and 21B and a combined image 466 created by a moving image including the picked-up images 461 to 465. In FIG. 22A, picked-up images 461 to 465 corresponding to the image pickup ranges 451 to 455 shown in FIGS. 20A to 20C and FIGS. 21A and 21B are shown in time series. In FIG. 22B, a moving image 460 including the picked-up images 461 to 465 is schematically shown in time series. On a time axis of the moving image 460 shown in FIG. 22B, positions corresponding to the picked-up images 461 to 465 are denoted by reference numerals same as the picked-up images 461 to 465. In FIG. 22C, a combined image 466 formed by the moving image 460 including the picked-up images 461 to 465 is schematically shown. In the combined image 466, positions corresponding to the picked-up images 461 to 465 shown in FIG. 22A are indicated by broken lines and denoted by the same reference numerals.

For example, when a combined image is created concerning the moving image 460 including the images 461 to 465, as shown in FIG. 22C, it is surmised that the combined image 466 including only the person included in the image pickup range at the end of the image pickup operation is created. In this way, it is likely that the person included in the images in the former half disappears and a combined image including many subjects in the images in the latter half is created. For example, it is assumed that a combined image is displayed as an icon for selecting a moving image that should be reproduced. When the combined image is displayed as the icon in this way, many subjects included in the images in the latter half of the moving image are included in the combined image. Therefore, a user can easily grasp the latter half of the moving image. However, for example, a scene in which the user is considered to be most interested like a scene of the snowboarder filled with joy included in the picked-up image 465 at the end of the moving image 460 is shown before the reproduction of the moving image. Therefore, there is a risk that the interest is reduced. In other words, since an image corresponding to the last frame is included in the combined image, the user can understand the end of the story before the reproduction of the moving image. Therefore, there is a risk that the interest is reduced.

Therefore, when a combined image is created concerning a moving image obtained by photographing a moving person, to prevent the interest in the moving image from being reduced, for example, it is conceivable to overwrite an earlier image on a later image on a time axis among images forming the moving image and combine the images. For example, it is conceivable to perform image combination from a later frame toward a leading frame on the time axis. For example, it is assumed that, concerning a moving image encoded by using inter-frame information as in the MPEG-2 format, image combination is performed from a later frame to a leading frame. For example, in order to decode frames in order from a later frame, it is necessary to decode all the frames in time order in a GOP (Group of Pictures), record the decoded frames in a memory, and sequentially acquire the frames in order from the later frame recorded in the memory. Therefore, when image combination is performed from the later frame toward the leading frame on the time axis, time necessary for image combination processing is long. However, when the combined image is displayed as the icon for selecting a moving image that should be reproduced, for example, it is important to reduce processing time when there are a large number of moving images to be reproduced.

Therefore, in the following explanation, an example of combination processing performed from a leading frame toward a later frame on a time axis to overwrite an earlier image on a later image and combine the images is explained in detail with reference to the drawings.

FIGS. 23A to 23C to FIGS. 25A to 25C are diagrams of transition of a combined image created by using the first image memory 220 and the second image memory 230 according to the first embodiment. In FIGS. 23A to 23C and FIGS. 24A to 24C, identification numbers for identifying images forming a moving image are affixed in rectangles indicating the images. A frame of an image corresponding to the present frame is indicated by a bold line. In the first image memory 220 and the second image memory 230 shown in FIGS. 23A to 23C to FIGS. 25A to 25C, an area other than the areas in which the rectangles indicating an image are present is an area in which 0 is set as an α value. The α value is a numerical value representing clarity. Clarities of R, G, and B (red, green, and blue) are changed in a range of 0 to 255.

Figure 23A:
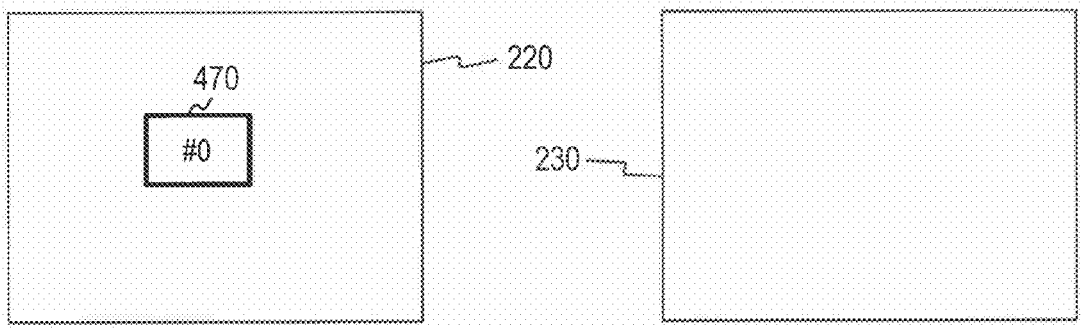
FIGS. 23A to 23C are diagrams of transition of a combined image created by using a first image memory 220 and a second image memory 230 according to the first embodiment.

First, as shown in FIG. 23A, the image combining unit 190 causes the first image memory 220 to store an image (#0) 470 corresponding to a leading frame forming the moving image. A position where the image corresponding to the leading frame is stored and the size of the image can be a position and size set in advance. For example, the size of a combined image may be calculated in advance by using affine transformation parameters associated with images forming a moving image as a target of combination processing. A position where a leading image is stored and the size of the image may be determined on the basis of the size.

Figure 23B:
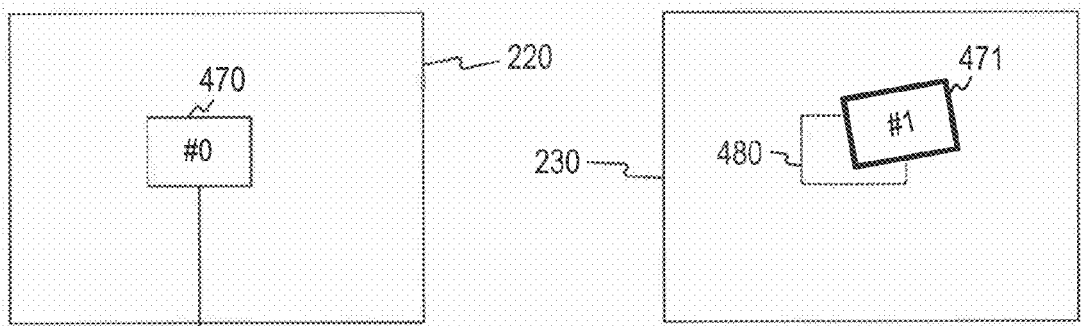

Subsequently, as shown in FIG. 23B, the image combining unit 190 causes the second image memory 230 to store an image (#1) 471 corresponding to a second frame forming the moving image. Specifically, the image transforming unit 180 affine-transforms the image (#1) 471 with the image (#0) 470 set as a reference image and using affine transformation parameters associated with the images (#0) 470 and (#1) 471. The image combining unit 190 causes the second image memory 230 to store the image (#1) 471 after the affine transformation. A rectangle 480 of a broken line in the second image memory 230 shown in FIG. 23B is an area indicating the position and the size of the image (#0) 470 stored in the first image memory 220.

Figure 23C:
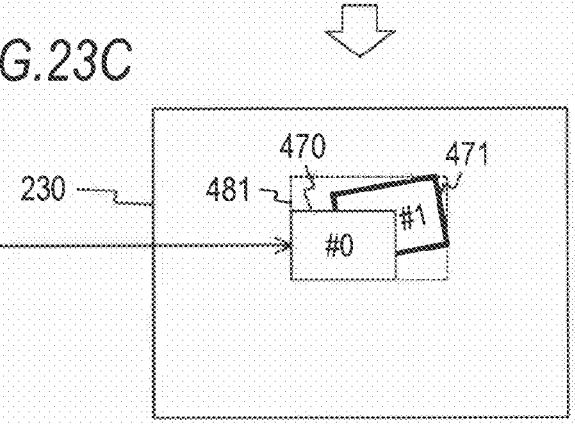

As shown in FIG. 23C, the image combining unit 190 extracts the image (#0) 470 stored in the first image memory 220 and causes the second image memory 230 to store the extracted image (#0) 470. In this case, it is assumed that a position where the image (#0) 470 is pasted to the second image memory 230 and the size of the image (#0) 470 are the same as the position and the size stored in the first image memory 220. The image (#0) 470 is stored in the second image memory 230 and also stored in the first image memory 220.

The image combining unit 190 calculates the position and the size of an overwritten-image extraction area 481 including the image (#1) 471 corresponding to the present frame and the image (#0) 470 corresponding to the immediately preceding frame. A method of calculating the overwritten-image extraction area is explained in detail with reference to FIGS. 26A to 26D and FIGS. 27A to 27C.

Figure 24A:
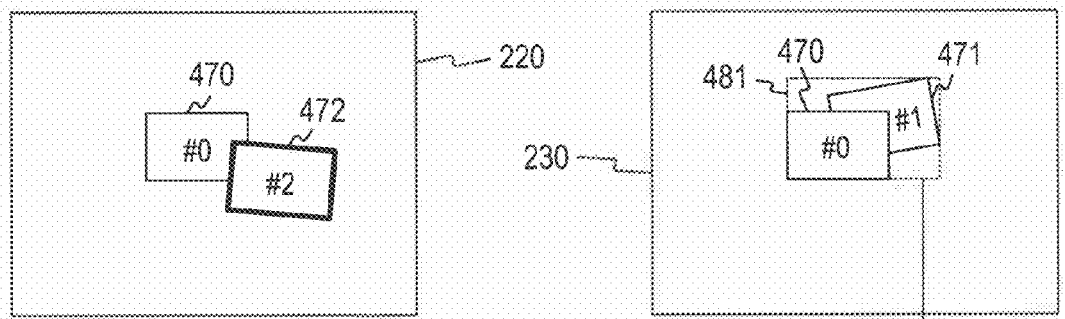
FIGS. 24A to 24C are diagrams of transition of a combined image created by using the first image memory 220 and the second image memory 230 according to the first embodiment.

As shown in FIG. 24A, the image combining unit 190 causes the first image memory 220 to store an image (#2) 472 corresponding to a third frame forming the moving image. Specifically, the image transforming unit 180 affine-transforms the image (#2) 472 with the image (#0) 470 set as a reference image and using affine transformation parameters associated with the images (#0) 470 to (#2) 472. The image combining unit 190 causes the first image memory 220 to store the image (#2) 472 after the affine transformation.

Figure 24B:
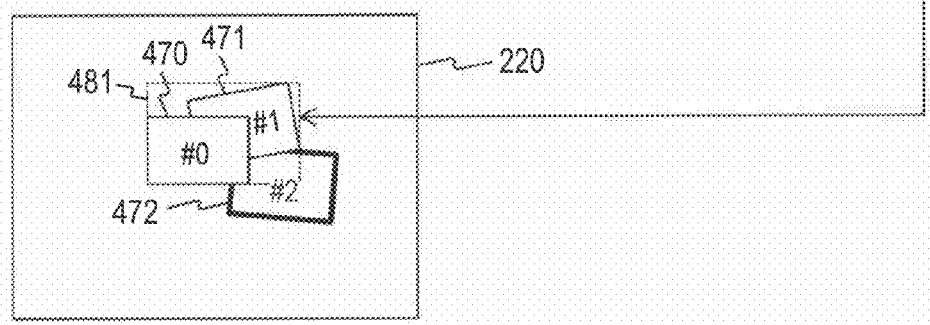

As shown in FIG. 24B, the image combining unit 190 extracts an image included in the overwritten-image extraction area 481 among the images stored in the second image memory 230 and causes the first image memory 220 to store the extracted image. In an example shown in FIG. 24B, only a combined image including the images (#0) 470 and (#1) 471 is included in the overwritten-image extraction area 481. Therefore, the combined image including the images (#0) 470 and (#1) 471 is extracted. The combined image is stored in the first image memory 220. It is assumed that a position where the combined image including the images (#0) 470 and (#1) 471 is pasted to the first image memory 220 and the size of the combined image are the same as the position and the size stored in the second image memory 230. The combined image including the images (#0) 470 and (#1) 471 is stored in the first image memory 220 and also stored in the second image memory 230.

Figure 24C:
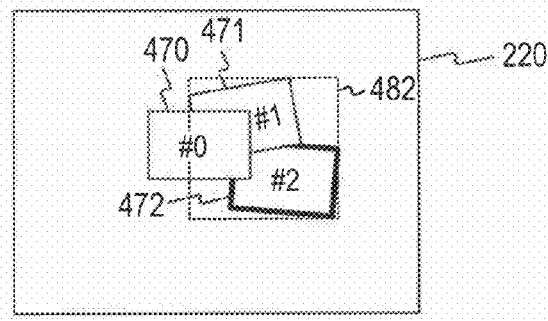

As shown in FIG. 24C, the image combining unit 190 calculates the position and the size of an overwritten-image extraction area 482 including the image (#2) 472 corresponding to the present frame and the image (#1) 471 corresponding to the immediately preceding frame.

Figure 25A:
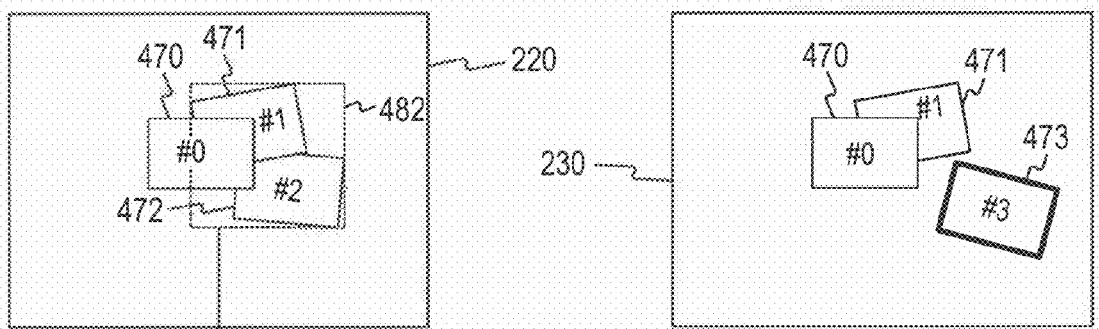
FIGS. 25A to 25C are diagrams of transition of a combined image created by using the first image memory 220 and the second image memory 230 according to the first embodiment.

As shown in FIG. 25A, the image combining unit 190 causes the second image memory 230 to store an image (#3) 473 corresponding to a fourth frame forming the moving image. Specifically, the image transforming unit 180 affine-transforms the image (#3) 473 with the image (#0) 470 set as a reference image and using affine transformation parameters associated with the images (#0) 470 to (#3) 473. The image combining unit 190 causes the second image memory 230 to store the image (#3) 473 after the affine transformation.

Figure 25B:
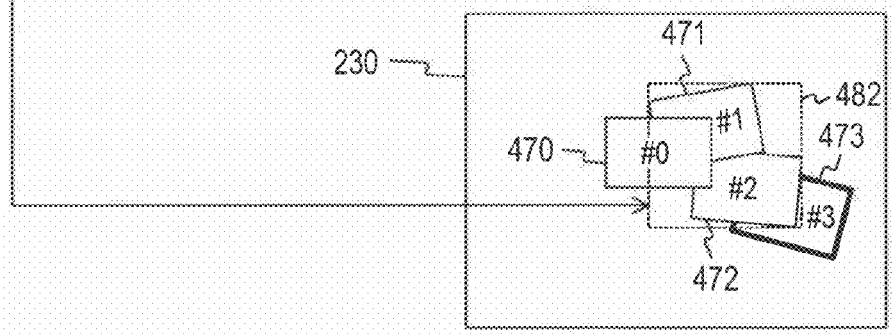

As shown in FIG. 25B, the image combining unit 190 extracts an image included in the overwritten-image extraction area 482 among the images stored in the first image memory 220 and causes the second image memory 230 to store the extracted image. In an example shown in FIG. 25B, a part of the combined image including the images (#0) 470 to (#2) 472 is included in the overwritten-image extraction area 482. Specifically, the entire combined image including the images (#1) 471 and (#2) 472 and a part of the image (#0) 470 are included in the overwritten-image extracting area 482. The combined image included in the overwritten-image extraction area 482 is extracted and stored in the second image memory 230. It is assumed that a position where the combined image included in the overwritten-image extraction area 482 is pasted to the second image memory 230 and the size of the combined image are the same as the position and the size stored in the first image memory 220. The combined image included in the overwritten-image extraction area 482 is stored in the second image memory 230 and also stored in the first image memory 220.

Figure 25C:
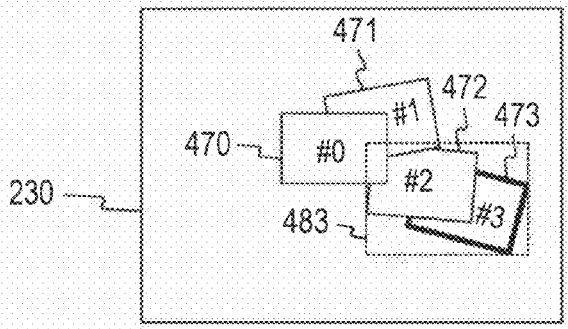

As shown in FIG. 25C, the image combining unit 190 calculates the position and the size of the overwritten-image extraction area 483 including the image (#3) 473 corresponding to the present frame and the image (#2) 472 corresponding to the immediately preceding frame.

Concerning fifth and subsequent frames forming the moving image, similarly, combined images are created by using the first image memory 220 and the second image memory 230. In this way, after an image corresponding to the present frame is pasted to one image memory, a combined image included in an overwritten-image extraction area in the other image memory is extracted. The extracted combined image is pasted to the image memory to which the image corresponding to the present frame is pasted. Therefore, it is possible to perform combination processing from a leading frame toward a later frame on a time axis, overwrite an earlier image on a later image, and combine the images.

It is assumed that a combined image stored by the combined-image storing unit 240 is, for example, a combined image created on an image memory to which an image corresponding to a last frame to be combined is pasted. For example, as shown in FIG. 24C, it is assumed that, when the image (#2) 472 is pasted to the first image memory 220, the image (#2) 472 is a last frame. In this case, a combined image (a combined image including images (#) 470 to (#2) 472) created on the first image memory 220 is set as a combined image stored by the combined-image string unit 240. For example, as shown in FIG. 25C, it is assumed that, when the image (#3) 473 is pasted to the second image memory 230, the image (#3) 473 is a last frame. In this case, a combined image (a combined image including the images (#0) 470 to (#3) 473) created on the second image memory 230 is set as a combined image stored by the combined-image storing unit 240.

When a division instruction for a combined image is output from the combined-image-division determining unit 170 to the image combining unit 190, a new combined image is created concerning the same moving image. In this case, it is assumed that a combined image stored by the combined-image storing unit 240 is, for example, a combined image created on an image memory to which an image is pasted immediately before division.

In the example explained above, a range of the overwritten-image extraction area is a range including two frames: the present frame and the immediately preceding frame. However, for example, the range including the present frame and the immediately preceding two or more frames may be set as a range of the overwritten-image extraction area.

A method of calculating the position and the size of an overwritten-image extraction area is explained in detail with reference to the drawings.

FIGS. 26A to 26D and FIGS. 27A to 27C are schematic diagrams for explaining a calculation method for calculating the position and the size of an overwritten-image extraction area with the image combining unit 190 according to the first embodiment. In an example of this calculation method, a rectangular area including the present frame and the immediately preceding frame is set as an overwritten-image extraction area. Rectangles 470 to 473 shown in FIGS. 26A to 26D and FIGS. 27A to 27C are rectangles formed by points after affine transformation of four vertexes of the image (#0) 470 shown in FIGS. 23A to 23C to FIGS. 25A to 25C. The size of the rectangles 470 to 473 is the same as the size of the images (#0) 470 to (#3) 473 shown in FIGS. 23A to 23C to FIGS. 25A to 25C. Therefore, in the following explanation, the rectangles are denoted by the same reference numerals as the images (#0) 470 to (#3) 473.

Figure 26A:
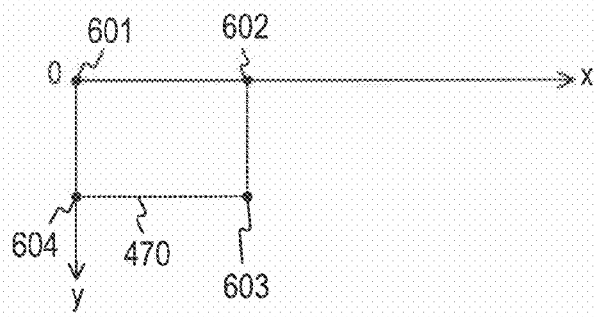
FIGS. 26A to 26D are schematic diagrams of a calculation method in calculating the position and the size of an overwriting image extraction area by the image combining unit 190 according to the first embodiment.

First, when the image (#0) 470 corresponding to the leading frame forming the moving image shown in FIGS. 23A to 23C to FIGS. 25A to 25C is set as a reference image, the overwritten-image extraction area 482 shown in FIG. 24C is calculated. For example, as shown in FIG. 26A, an xy coordinate with a vertex 601 on the upper left of the image (#0) 470 set as the origin is set. Other vertexes of the image (#0) 470 are vertexes 602 to 604. For example, when the resolution of the image (#0) 470 is 640 pixels×480 pixels, a coordinate of the vertex 601 is set as (0, 0), a coordinate of the vertex 602 is set as (640, 0), a coordinate of the vertex 603 is set as (640, 480), and a coordinate of the vertex 604 is set as (0, 480). In this case, a maximum in the x axis direction is "640", a minimum in the x axis direction is "0", a maximum in the y axis direction is "480", and a minimum in the y axis direction is "0". In the xy coordinate shown in FIGS. 26A to 26D and FIGS. 27A to 27C, a lower side in the y axis direction is a plus side.

Figure 26B:
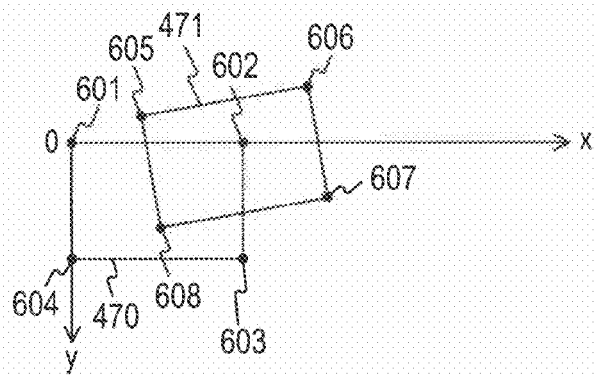
Figure 26C:
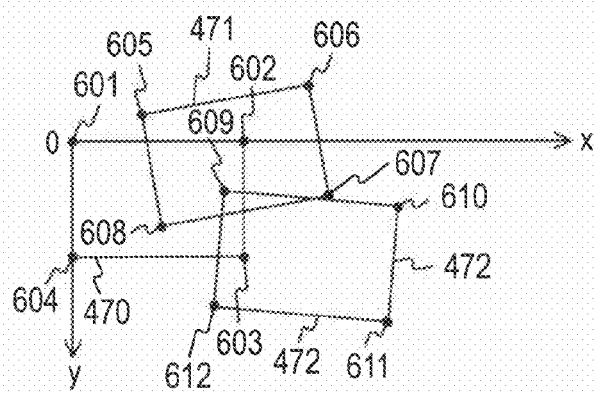

When the image (#1) 471 is affine-transformed by the image transforming unit 180, as shown in FIG. 26B, on the xy coordinate, the vertexes 601 to 604 of the image (#0) 470 are transformed to positions of vertexes 605 to 608 of the image (#1) 471. When the image (#2) 472 is affine-transformed by the image transforming unit 180, as shown in FIG. 26C, on the xy coordinate, the vertexes 601 to 604 of the image (#0) 470 are transformed to positions of vertexes 609 to 612 of the image (#2) 472.

Figure 26D:
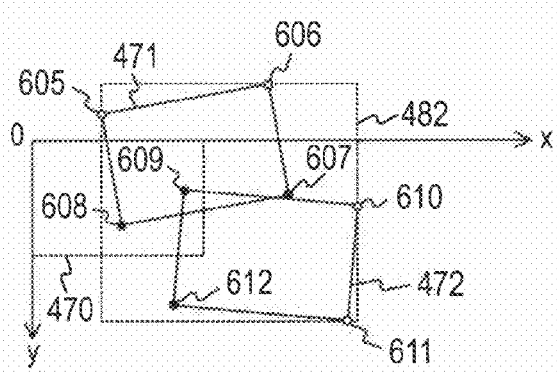

Subsequently, maximums and minimums in the x axis direction and the y axis direction are calculated on the basis of the vertexes 605 to 608 of the image (#1) 471 and the vertexes 609 to 612 of the image (#2) 472. For example, as shown in FIG. 26D, since the vertex 606 is a point present on the uppermost side among the vertexes 605 to 612, a value on the y axis of the vertex 606 is calculated as a minimum in the y axis direction. Since the vertex 611 is a point present on the lowermost side among the vertexes 605 to 612, a value on the y axis of the vertex 611 is calculated as a maximum in the y axis direction. Similarly, since the vertex 605 is a point present on the leftmost side, a value on the x axis of the vertex 605 is calculated as a minimum in the x axis direction. Since the vertex 610 is a point present on the rightmost side, a value on the x axis of the vertex 610 is calculated as a maximum in the x axis direction. A rectangle specified by the maximums and the minimums in the x axis direction and the y axis direction is calculated as an overwritten-image extraction area including the image (#1) 471 and the image (#2) 472. For example, as shown in FIG. 26D, the overwritten-image extraction area 482 is determined.

Figure 27A:
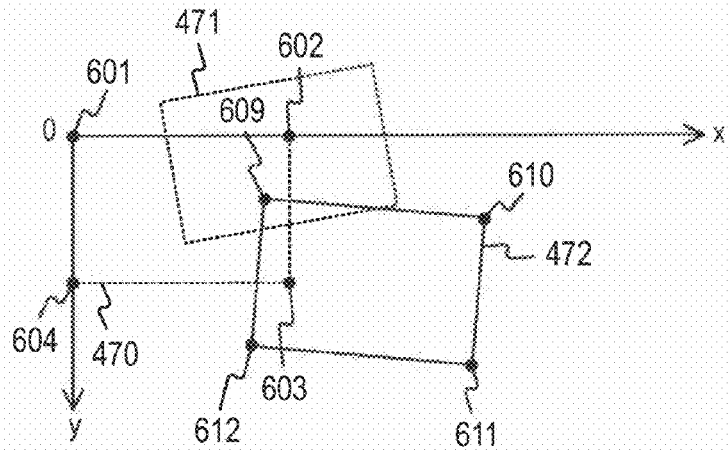
FIGS. 27A to 27C are schematic diagrams of a calculation method in calculating the position and the size of an overwriting image extraction area by the image combining unit 190 according to the first embodiment.
Figure 27B:
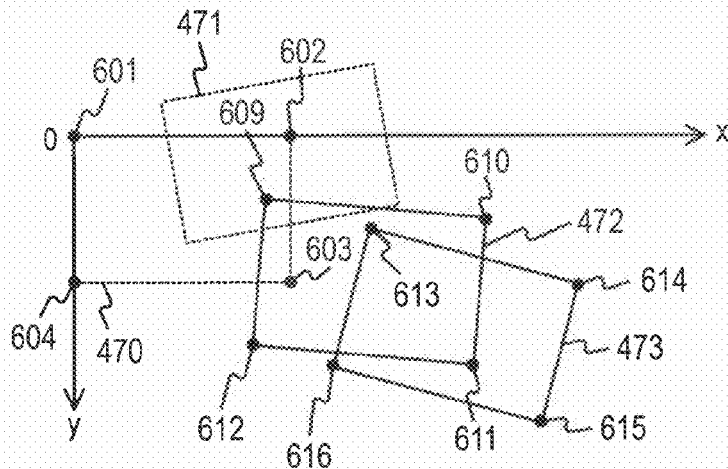

The calculation of an overwritten-image extraction area 483 shown in FIG. 25C is explained. When the image (#2) 472 is affine-transformed by the image transforming unit 180, as shown in FIG. 27A, on the xy coordinate, the vertexes 601 to 604 of the image (#0) 470 are transformed to the positions of the vertexes 609 to 612 of the image (#2) 472. The positions of the vertexes 609 to 612 of the image (#2) 472 shown in FIG. 27A are the same as the positions of the vertexes 609 to 612 of the image (#2) 472 shown in FIG. 26C. When the image (#3) 473 is affine-transformed by the image transforming unit 180, as shown in FIG. 27B, on the xy coordinate, the vertexes 601 to 604 of the image (#0) 470 are transformed to positions of vertexes 613 to 616 of the image (#3) 473.

Figure 27C:
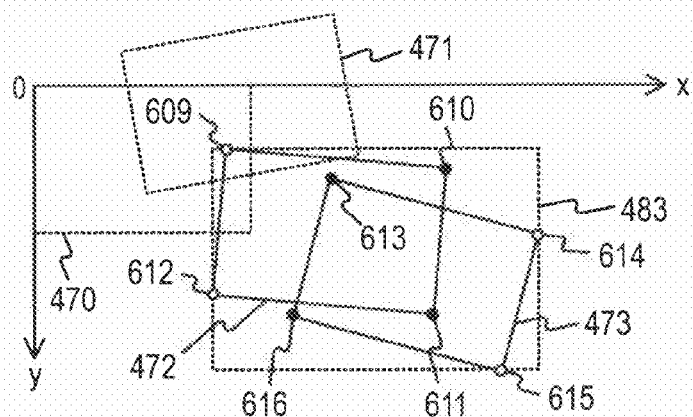

Subsequently, maximums and minimums in the x axis direction and the y axis direction are calculated on the basis of the vertexes 609 to 612 of the image (#2) 472 and the vertexes 613 to 616 of the image (#3) 473. For example, as shown in FIG. 27C, since the vertex 609 is a point present on the uppermost side among the vertexes 609 to 616, a value on the y axis of the vertex 609 is calculated as a minimum in the y axis direction. Since the vertex 615 is a point present on the lowermost side among the vertexes 609 to 616, a value on the y axis of the vertex 615 is calculated as a maximum in the y axis direction. Similarly, since the vertex 612 is a point present on the leftmost side, a value on the x axis of the vertex 612 is calculated as a minimum in the x axis direction. Since the vertex 614 is a point present on the rightmost side, a value on the x axis of the vertex 614 is calculated as a maximum in the x axis direction. A rectangle specified by the maximums and the minimums in the x axis direction and the y axis direction is calculated as an overwritten-image extraction area including the image (#2) 472 and the image (#3) 473. For example, as shown in FIG. 27C, the overwritten-image extraction area 483 is determined.

Figure 28A:
FIGS. 28A and 28B are diagrams of an example of a combined image created by the image combining unit 190 according to the first embodiment.
Figure 28B:
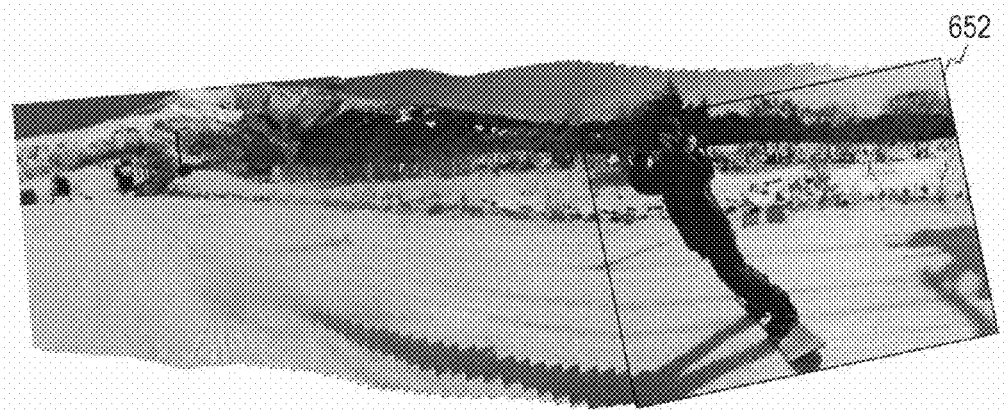

FIGS. 28A and 28B are diagrams of an example of combined images created by the image combining unit 190 according to the first embodiment. In FIG. 28A, a combined image created by the image combining method shown in FIGS. 23A to 23C to FIGS. 25A to 25C is shown. In FIG. 28B, a combined image created by sequentially overwriting and combining images in order from one corresponding to an earliest frame on a time axis is shown. A moving image as a target of creation of the combined images shown in FIGS. 28A and 28B is a moving image obtained by picking up an image of a snowboarder sliding on a slope of a snow mountain with a snowboard as a main subject. Specifically, the moving image as the target of creation of the combined images shown in FIGS. 28A and 28B is a picked-up moving image in which the figure of the snowboarder sliding from the upper left to the right is recorded in images. An area 651 included in the combined image shown in FIG. 28A indicates an image pickup range corresponding to a leading frame forming the moving image of the combine image. An area 652 included in the combined image shown in FIG. 28B indicates an image pickup range corresponding to a last frame forming the moving image of the combined image.

As shown in FIG. 28B, when images are sequentially overwritten and combined in order from one corresponding to the earliest frame on the time axis to create a combined image, only the figure of the snowboarder included in the image corresponding to the last frame is displayed in the combined image and the figure earlier than that disappears. If the user first sees a scene in which a main character appearing in a moving image appears last, there is a risk that the interest in the moving image is reduced. For example, if the user sees the combine image shown in FIG. 28B, the user can see a pose of joy at the end of the sliding of the snowboarder included in the area 652 even if the user does not reproduce and view the moving image from the start. When an ending of a moving image can be easily grasped in this way, it is conceivable that the interest in the moving image is reduced. In other words, there is a risk that it is difficult to provide the user with contents with improved interest.

On the other hand, as shown in FIG. 28A, when images are sequentially combined such that an earlier frame on the time axis is placed above a later frame to create a combined image, only the figure of the snowboarder included in an image corresponding to a leading frame is displayed in the combined image. The figure of the snowboarder included in later frames disappears. In this case, the figure of the snowboarder included in the area 651 has size that may not be able to be easily recognized. A background image (the slope of the snow mountain) as a subject of the moving image is mainly displayed. Therefore, the user can grasp rough content of the moving image. It is possible to give the user an expectation that something will happen on the slope of the snow mountain and improve the interest in the moving image. A main character appearing in the moving image is displayed in size that may not be able to be easily recognized on the combined image. Therefore, it is possible to improve the interest in the main character and expect how the main character slides in the moving image.

For example, when reproduction of a moving image stored in the moving-image storing unit 200 is instructed, these combined images can be displayed on the display unit 260 as icons representing the moving images. The image combination processing for overwriting an earlier image on a later image on the time axis and combining images and the image combination processing for overwriting a later image on an earlier image and combining the images may be changed according to user selection from the operation receiving unit 270. A combined image created according to the user selection can be displayed on the display unit 260. These two combined images may be sequentially created concerning one moving image and simultaneously displayed on the display unit 260 as signs representing the moving images. A display example in displaying combined images as icons representing moving images is explained below.

Figure 29A:
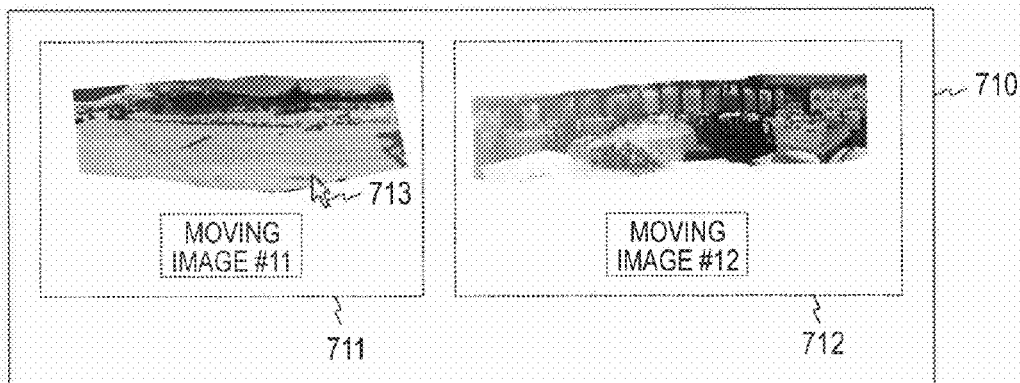
FIGS. 29A to 29C are diagrams of a display example of combined images displayed on a display unit 260 according to the first embodiment.
Figure 29B:
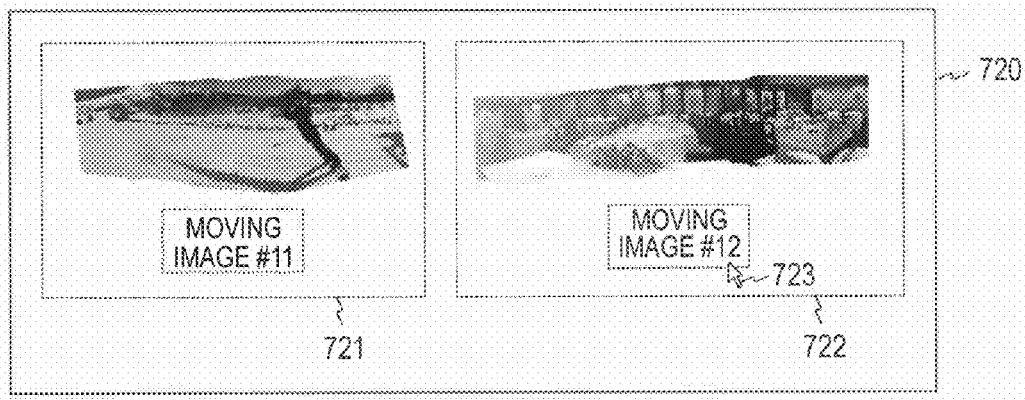
Figure 29C:
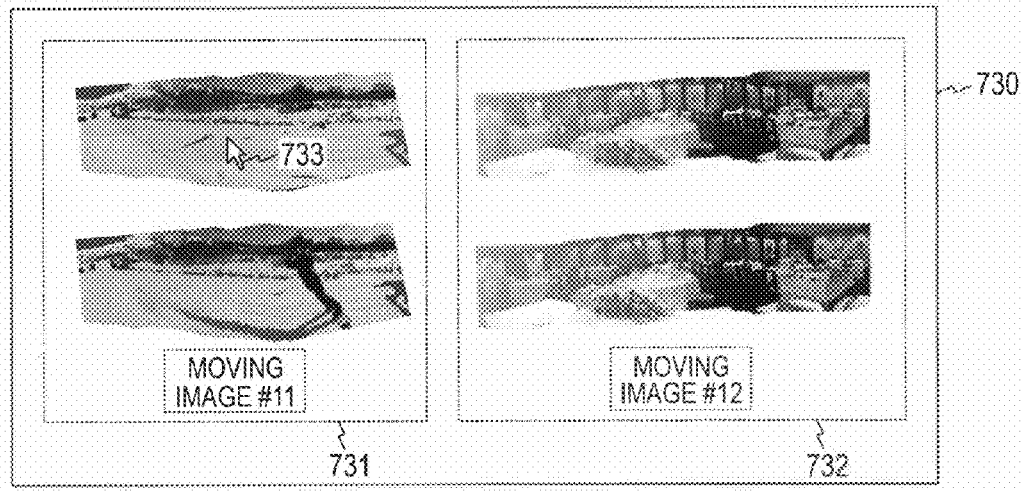

FIGS. 29A to 29C are diagrams of a display example of combined images displayed on the display unit 260 according to the first embodiment. Reproduced-moving-image selection areas 710, 720, and 730 shown in FIGS. 29A to 29C are areas displayed on the display unit 260 on the basis of the control by the display control unit 250. When a moving image stored in the moving-image storing unit 200 is reproduced, the reproduced-moving-image selection areas 710, 720, and 730 are used in selecting a moving image to be reproduced. In the example shown in FIGS. 29A to 29C, combined images are displayed as icons representing a moving image #11 and a moving image #12 stored in the moving-image storing unit 200. The moving image #11 is a moving image as a target of creation of the combined image shown in FIGS. 28A and 28B. The moving image #12 is a moving image photographed with a camera moved to the left and right in a wedding hall and does not include a moving subject.

In the reproduced-moving-image selection area 710 shown in FIG. 29A, a display example of a combined image displayed on the display unit 260 when the image combination processing for overwriting an earlier image on a later image and combining the images is selected by the user is shown. For example, in a display area 711, a combined image representing the moving image #11 is displayed as an icon and characters "moving image #11" are displayed. In the display area 712, a combined image representing the moving image #12 is displayed as an icon and characters "moving image #12" are displayed. When the reproduced-moving-image selection area 710 is displayed, a desired moving image can be reproduced by clicking an icon corresponding to the desired moving image or characters indicating the moving image using a cursor 713.

In the reproduced-moving-image selection area 720 shown in FIG. 29B, a display example of a combined image displayed on the display unit 260 when the image combination processing for overwriting a later image on an earlier image and combining the images is selected by the user is shown. The reproduced-moving-image selection area 720 is the same as the reproduced-moving-image selection area 710 shown in FIG. 29A except combined images included in a display area 721 and a display area 722. Therefore, explanation of the reproduced-moving-image selection area 720 is omitted.

In the reproduced-moving-image selection area 730 shown in FIG. 29C, a display example of a combined image displayed on the display unit 260 when the image combination processing for overwriting an earlier image on a later image and combining the images and the image combination processing for overwriting a later image on an earlier image and combining the images are selected by the user is shown. These two combined images are sequentially created concerning one moving image. The two combined images representing the one moving image are displayed as icons and characters indicating the moving image are displayed. For example, in the display area 731, the combined image shown in FIG. 28A and the combined image shown in FIG. 28B can be simultaneously displayed. The reproduced-moving-image selection area 730 is the same as the reproduced-moving-image selection area 710 shown in FIG. 29A except that the two combined images are included in the display area 731 and the display area 732. Therefore, explanation of the reproduced-moving-image selection area 730 is omitted. For example, when a large number of moving images are stored in the moving-image storing unit 200, it is possible to quickly grasp the entire contents and the beginnings and the ends of the moving images by simultaneously displaying two kinds of combined images concerning one moving image. In this way, it is possible to appropriately set a combined image creating method according to the taste of the user.

Operation Example of the Image Processing Apparatus

The operation of the image processing apparatus 100 according to the first embodiment is explained with reference to the drawings.

FIG. 30 is a flowchart of a processing procedure of combined image creation processing by the image processing apparatus 100 according to the first embodiment. In this example, the image combination processing for overwriting an earlier image on a later image on a time axis and combining the images is selected by the operation receiving unit 270. In this example, when a division instruction for a combined image is output from the combined-image-division determining unit 170, a new combined image is created concerning images corresponding to the present frame and subsequent frames.

First, the file acquiring unit 140 acquires a moving image file stored in the moving-image storing unit 200 and acquires a metadata file associated with the moving image file from the metadata storing unit 210 (step S921). The variable "t" is initialized to "0" (step S922).

Subsequently, the file acquiring unit 140 decodes the moving image file and acquires the present frame as one frame forming the moving image file (step S923). The file acquiring unit 140 acquires affine transformation parameters corresponding to the acquired present frame from the metadata file (step S924). When the present frame is a leading frame, affine transformation parameters of a unit matrix are acquired.

The scene-change determining unit 150 determines whether an image corresponding to the present frame is an image corresponding to a scene change point (step S925). When the image corresponding to the present frame is the image corresponding to the scene change point (Yes in step S925), the processing proceeds to step S931. On the other hand, when the image corresponding to the present frame is not the image corresponding to the scene change point (No in step S925), the transformation-information correcting unit 160 calculates components of camerawork from the affine transformation parameters corresponding to the present frame (step S926). The transformation-information correcting unit 160 determines whether at least one value of the components of camerawork is equal to or larger than a threshold (step S927). When at least one of the components of camerawork is equal to or larger than the threshold (Yes in step S927), the transformation-information correcting unit 160 corrects the affine transformation parameters to affine transformation parameters of a unit matrix (step S928). On the other hand, when all values of the components of camerawork are not equal to or larger than the threshold (No in step S927), the combined-image-division determining unit 170 calculates an added-up value of the components of camerawork concerning the frames from the leading frame to the present frame (step S929). The combined-image-division determining unit 170 determines, on the basis of the added-up value of the components of camerawork, whether the present combined image extends beyond an image memory because of the combination of the image corresponding to the present frame (step S930) In other words, necessity of division of the combined image is determined. When it is determined that the present combined image extends beyond the image memory (Yes step S930), the image combining unit 190 causes the combined-image storing unit 240 to store a combined image stored in an image memory to which the immediately preceding frame of the present frame is pasted (step S931). The image combining unit 190 deletes combined images stored in the first image memory 220 and the second image memory 230 (step S932). The variable "t" is initialized to "0" (step S933) and the processing proceeds to step S940.

When it is determined that the present combined image does not extend beyond the image memory (No step S930), the image combining unit 190 performs image combination processing (step S940). The image combination processing is explained in detail with reference to FIG. 31.

It is determined whether the present frame is a last frame among the frames forming the acquired moving image file (step S934). When the present frame is not the last frame (No in step S934), "1" is added to the variable "t" (step S935), the processing returns to step S923, and image combination processing is repeated (steps S923 to S940). On the other hand, when the present frame is the last frame (Yes in step S934), the image combining unit 190 causes the combined-image storing unit 240 to store the combined image stored in the image memory to which the present frame is pasted (step S936) and the combined image creation processing ends.

FIG. 31 is a flowchart of an image combination processing procedure (the processing procedure in step S940 shown in FIG. 30) among processing procedures of the combined image creation processing by the image processing apparatus 100 according to the first embodiment.

First, it is determined whether the variable "t" is "0" (step S941). When the variable "t" is "0" (Yes in step S941), the image combining unit 190 causes the first image memory 220 to store an image corresponding to the present frame without affine-transforming the image (step S942). In this case, the image corresponding to the present frame is stored in a position where an image corresponding to the leading frame is stored. The image combining unit 190 calculates an overwritten-image extraction area (step S943). In this case, an area of the image corresponding to the present frame is calculated as the overwritten-image extraction area. The image stored in the first image memory 220 is set as a combined image (a storage target combined image) that should be stored in the combined-image storing unit 240 (step S944). When the variable "t" is not "0" (No in step S941), the image transforming unit 180 affine-transforms the image corresponding to the present frame using the affine transformation parameters corresponding to the present frame (step S945).

Subsequently, it is determined whether the variable "t" is a multiple of 2 (step S946). In other words, it is determined whether t=2n (n is a positive integer). When the variable "t" is a multiple of 2 (Yes in step S946), the image combining unit 190 overwrites the affine-transformed image corresponding to the present frame on the combined image stored in the first image memory 220 and combines the images (step S947). The image combining unit 190 extracts an image included in the overwritten-image extraction area in the second image memory 230, overwrites the image included in the overwritten-image extraction area on the combined image stored in the first image memory 220, and combines the images (step S948). The image combining unit 190 calculates an overwritten-image extraction area in the first image memory 220 (step S949). In this case, an area including the images corresponding to the present frame and the immediately preceding frame in the combined image stored in the first image memory 220 is calculated as the overwritten-image extraction area. The combined image stored in the first image memory 220 is set as a storage target combined image (step S950).

On the other hand, when the variable "t" is not a multiple of 2 (No in step S946), the image combining unit 190 overwrites the affine-transformed image corresponding to the present frame on the combined image stored in the second image memory 230 and combines the images (step S951). When t=1, since the image stored in the second image memory 230 is not present, only the affine-transformed image corresponding to the present frame is stored in the second image memory 230. The image combining unit 190 extracts the image included in the overwritten-image extraction area in the first image memory 220, overwrites the image included in the overwritten-image extraction area on the combined image stored in the second image memory 230, and combines the images (step S952). The image combining unit 190 calculates an overwritten-image extraction area in the second image memory 230 (step S953). In this case, an area including the images corresponding to the present frame and the immediately preceding frame in the combined image stored in the second image memory 230 is calculated as the overwritten-image extraction area. When t=1, since the image stored in the second image memory 230 is not present, an area of the image corresponding to the present frame is calculated as the overwritten-image extraction area. The combined image stored in the second image memory 230 is set as a storage target combined image (step S954). Step S945 is an example of an image transforming procedure described in the appended claims. Steps S947, S948, S951, and S952 are an example of an image combining procedure described in the appended claims.

2. Second Embodiment

Image Combination Example

In the explanation of the first embodiment of the present invention, images are combined while an image included in the overwritten-image extraction is pasted to another image memory by using the first image memory 220 and the second image memory 230. In a second embodiment of the present invention, an example processing for creating a combined image using the first image memory 220 and the second image memory 230 without calculating an overwritten-image extraction area is explained in detail below with reference to the accompanying drawings. A functional configuration according to the second embodiment is the same as that of the image processing apparatus 100 except that a function of the image combining unit 190 included in the image processing apparatus 100 shown in FIG. 1 is different. Therefore, components same as those in the first embodiment are denoted by the same reference numerals. Only components having different functions are explained and explanation of other components is omitted.

FIGS. 32A to 32C and FIGS. 33A to 33D are diagrams of transition of a combined image created by using the first image memory 220 and the second image memory 230 according to the second embodiment. Concerning images shown in FIGS. 32A to 32C and FIGS. 33A to 33D, affine transformation same as that for the images shown in FIGS. 23A to 23C to FIGS. 25A to 25C is performed. Therefore, the images are denoted by the same reference numerals. A frame of an image corresponding to the present frame is indicated by a bold line. In the first image memory 220 and the second image memory 230 shown in FIGS. 32A to 32C and FIGS. 33A to 33D, an area other than an area in which a rectangle indicating an image is present is an area in which 0 is set as an α value.

Figure 32A:
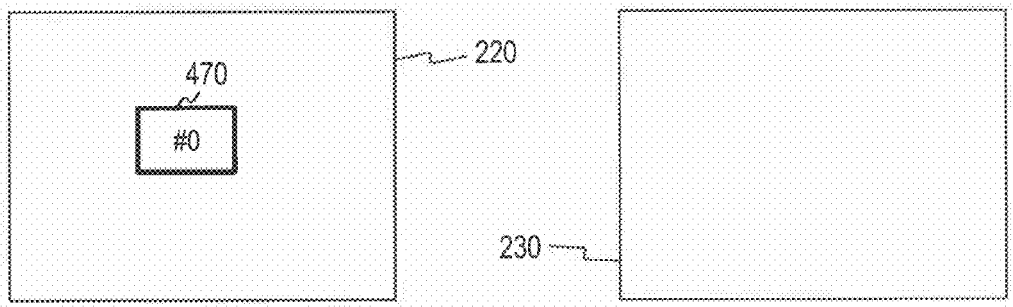
FIGS. 32A to 32C are diagrams of transition of a combined image created by using the first image memory 220 and the second image memory 230 according to a second embodiment of the present invention.

First, as shown in FIG. 32A, the image combining unit 190 causes the first image memory 220 to store the image (#0) 470 corresponding to a leading frame forming a moving image. A position where the image (#0) 470 is stored in the first image memory 220 and the size of the image (#0) 470 are the same as those in FIGS. 23A to 23C to FIGS. 25A to 25C. Therefore, explanation of the position and the size is omitted.

Figure 32B:
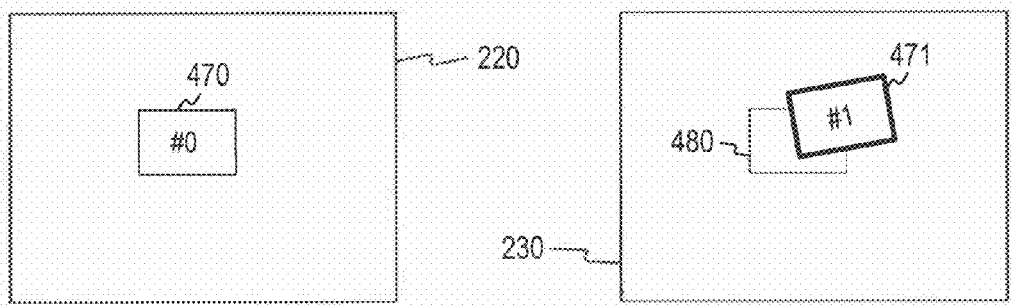

Subsequently, as shown in FIG. 32B, the image combining unit 190 causes the second image memory 230 to store the image (#1) 471 corresponding to a second frame forming the moving image. Affine transformation for images shown in this example is the same as that shown in FIGS. 23A to 23C and FIGS. 25A to 25C. Therefore, explanation of the affine transformation is omitted. The rectangle 480 of the broken line in the second image memory 230 shown in FIG. 32B is an area indicating the position and the size of the image (#0) 470 stored in the first image memory 220.

Figure 32C:
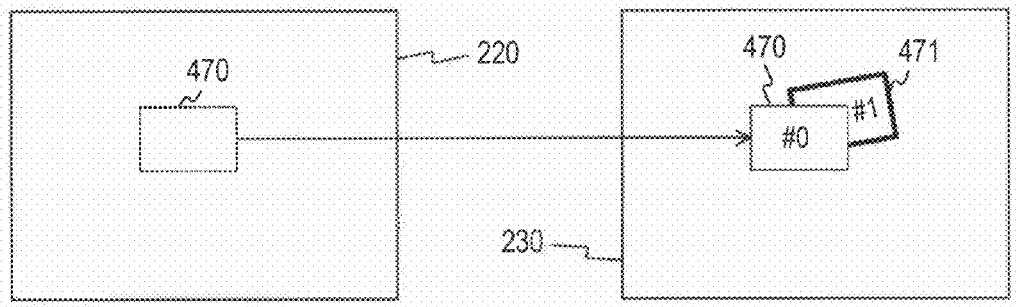

As shown in FIG. 32C, the image combining unit 190 extracts the image (#0) 470 stored in the first image memory 220 and causes the second image memory 230 to store the extracted image (#0) 470. In this case, it is assumed that a position where the image (#0) 470 is pasted to the second image memory 230 and the size of the image (#0) 470 are the same as the position and the size stored in the first image memory 220. In this example, unlike the image combination shown in FIG. 23C, the image (#0) 470 is deleted from the first image memory 220. In FIG. 32C, the position and the size of the image (#0) 470 after the deletion are indicated by the rectangle 470 of a broken line.

Figure 33A:
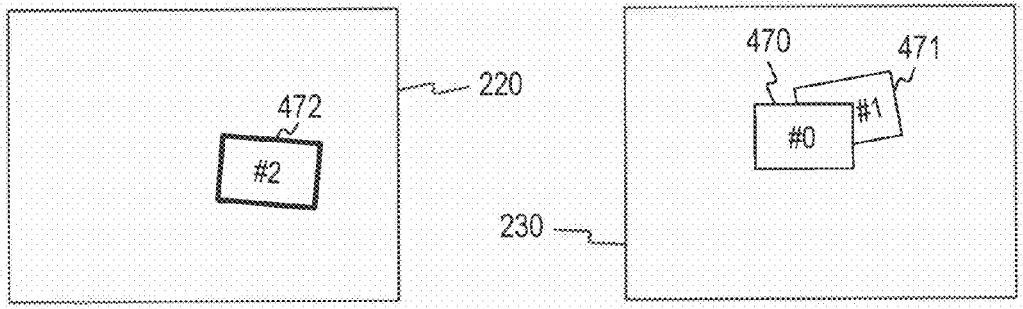
FIGS. 33A to 33D are diagrams of transition of a combined image created by using the first image memory 220 and the second image memory 230 according to the second embodiment.
Figure 33B:
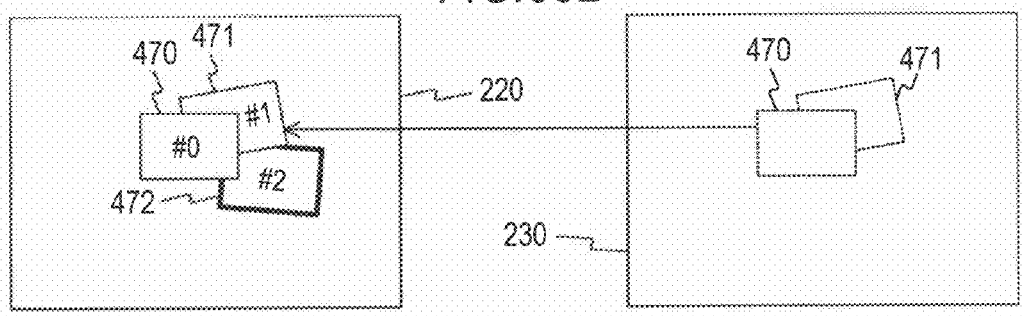

As shown in FIG. 33A, the image combining unit 190 causes the first image memory 220 to store the image (#2) 472 corresponding to a third frame forming the moving image. As shown in FIG. 33B, the image combining unit 190 extracts images (a combined image including the images (#0) 470 and (#1) 471) stored in the second image memory 230 and causes the first image memory 220 to store the extracted images. It is assumed that a position where the extracted images are pasted to the first image memory 220 and the size of the images are the same as the position and the size stored in the second image memory 230. The extracted images are deleted from the second image memory 230. In FIG. 33B, the position and the size of the images after the deletion are indicated by the rectangles 470 and 471 of a broken line.

Figure 33C:
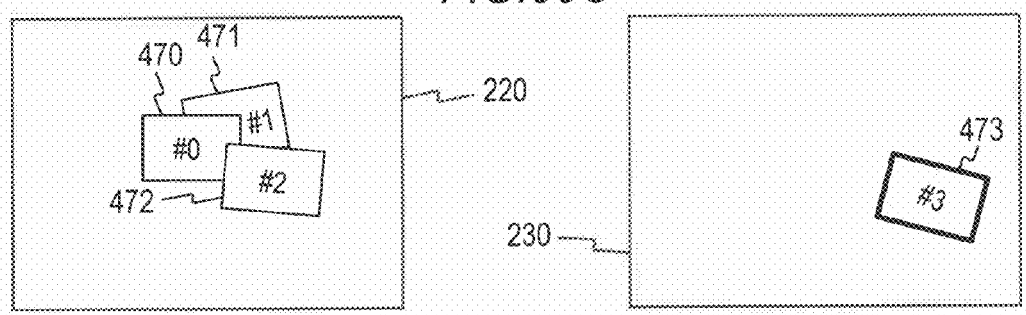
Figure 33D:
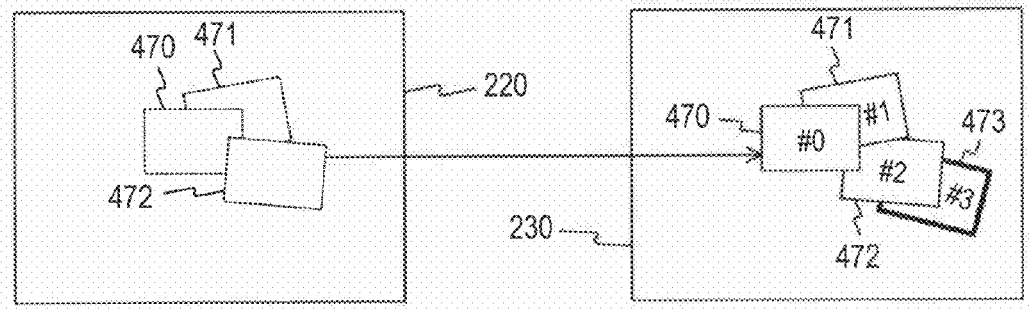

As shown in FIG. 33C, the image combining unit 190 causes the second image memory 230 to store the image (#3) 473 corresponding to a fourth frame forming the moving image. As shown in FIG. 33D, the image combining unit 190 extracts images (a combined image including the images (#0) 470 to (#2) 472) stored in the first image memory 220 and causes the second image memory 230 to store the extracted image. It is assumed that a position where the extracted images are pasted to the second image memory 230 and the size of the images are the same as the position and the size stored in the first image memory 220. The extracted images are deleted from the first image memory 220. In FIG. 33D, the position and the size of the images after the deletion are indicated by the rectangles 470 and 472 of a broken line.

Concerning fifth and subsequent frames forming the moving image, similarly, combined images are created by using the first image memory 220 and the second image memory 230. In this way, after an image corresponding to the present frame is pasted to one image memory, a combined image pasted to the other image memory is extracted. The extracted combined image is pasted to the image memory to which the image corresponding to the present frame is pasted. Therefore, while combination processing is performed from a leading frame toward a later frame on a time axis, an earlier image can be overwritten on and combined with a later image. An overwritten-image extraction area does not have to be calculated for each of the frames. It is assumed that a combined image stored by the combined-image storing unit 240 is, for example, a combined image created on an image memory to which an image corresponding to a last frame to be combined is pasted. It is assumed that, when a division instruction for a combined image is output from the combined-image-division determining unit 170 to the image combining unit 190, the combined image stored by the combined-image storing unit 240 is, for example, a combined image created on an image memory to which an image is pasted immediately before division.

Operation Example of the Image Processing Apparatus

FIG. 34 is a flowchart of a processing procedure of an image combination processing procedure by the image processing apparatus 100 according to the second embodiment. This example is a modification of the combined image creation processing (the processing procedure in step S940 shown in FIG. 30) according to the first embodiment.

First, it is determined whether the variable "t" is "0" (step S961). When the variable "t" is "0" (Yes in step S961), the image combining unit 190 causes the first image memory 220 to store an image corresponding to the present frame without affine-transforming the image (step S962). In this case, the image corresponding to the present frame is stored in a position where an image corresponding to a leading frame is stored. The image stored in the first image memory 220 is set as a storage target combined image (step S963). On the other hand, when the variable "t" is not "0" (No in step S961), the image transforming unit 180 affine-transforms the image corresponding to the present frame using affine transformation parameters corresponding to the present frame (step S964).

Subsequently, it is determined whether the variable "t" is a multiple of 2 (step S965). When the variable "t" is a multiple of 2 (Yes in step S965), the image combining unit 190 causes the first image memory 220 to store the affine-transformed image corresponding to the present frame (step S966). The image combining unit 190 extracts a combined image stored in the second image memory 230, overwrites the combined image on the image stored in the first image memory 220, and combines the images (step S967). In this case, the combined image extracted from the second image memory 230 is deleted. The combined image stored in the first image memory 220 is set as a storage target combined image (step S968).

On the other hand, when the variable "t" is not a multiple of 2 (No in step S965), the image combining unit 190 causes the second image memory 230 to store the affine-transformed image corresponding to the present frame (step S969). The image combining unit 190 extracts the combined image stored in the first image memory 220, overwrites the combined image on the image stored in the second image memory 230, and combines the images (step S970). In this case, the combined image extracted from the first image memory 220 is deleted. The combined image stored in the second image memory 230 is set as a storage target combined image (step S971). Step S964 is an example of the image transforming procedure described in the appended claims. Steps S966, S967, S969, and S970 are an example of the image combining procedure described in the appended claims.

3. Third Embodiment

Image Combination Example

In the example explained in the second embodiment, all combined images in an image memory to which an image corresponding to the immediately preceding frame of the present frame is pasted are extracted. Images are combined while the combined images are pasted to an image memory to which an image corresponding to the present frame is pasted. In a third embodiment of the present invention, an example of processing for creating a combined image using the first image memory 220 and the second image memory 230 without extracting all combined images in an image memory to which an image corresponding to the immediately preceding frame of the present frame is pasted is explained in detail with reference to the drawings. A functional configuration according to the third embodiment is the same as that of the image processing apparatus 100 except that a function of the image combining unit 190 included in the image processing apparatus 100 shown in FIG. 1 is different. Therefore, components same as those in the first embodiment are denoted by the same reference numerals. Only components having different functions are explained and explanation of other components is omitted.

FIGS. 35A to 35C to FIGS. 37A and 37B are diagrams of transition of a combined image created by using the first image memory 220 and the second image memory 230 according to the third embodiment. Images shown in FIGS. 35A to 35C to FIGS. 37A and 37B are affine-transformed in the same manner as the images shown in FIGS. 23A to 23C to FIGS. 25A to 25C. Therefore, the images are denoted by the same reference numerals. Frames of images corresponding to the present frame are indicated by a bold line. In the first image memory 220 and the second image memory 230 shown in FIGS. 35A to 35C to FIGS. 37A and 37B, an area other than an area in which a rectangle indicating an image is present is an area in which 0 is set as an α value.

First, as shown in FIG. 35A, the image combining unit 190 causes the first image memory 220 to store the image (#0) 470 corresponding to a leading frame forming a moving image. A position where the image (#0) 470 is stored in the first image memory 220 and the size of the image (#0) 470 are the same as those shown in FIGS. 23A to 23C to FIGS. 25A to 25C. Therefore, explanation of the position and the size is omitted.

Subsequently, as shown in FIG. 35B, the image combining unit 190 causes the second image memory 230 to store the image (#1) 471 corresponding to a second frame forming the moving image. Affine transformation for images explained in this example is the same as that shown in FIGS. 23A to 23C to FIGS. 25A to 25C. Therefore, explanation of the affine transformation is omitted. The rectangle 480 of the broken line in the second image memory 230 shown in FIG. 35B is an area indicating the position and the size of the image (#0) 470 stored in the first image memory 220.

As shown in FIG. 35C, the image combining unit 190 extracts the image (#1) 471 stored in the second image memory 230. The image combining unit 190 calculates a target area 491 including the image (#1) 471 stored in the second image memory 230. The target area is a rectangular area specified by four vertexes of the image corresponding to the present frame. The image combining unit 190 extracts an image included in the target area 491 in the image (#0) 470 stored in the first image memory 220. It is assumed that the positions and the sizes of target areas in the first image memory 220 and the second image memory 230 are the same. The image combining unit 190 overwrites the image included in the target area 491 extracted from the first image memory 220 on the image (#1) 471 extracted from the second image memory 230 and combines the images. The image combining unit 190 causes the first image memory 220 to store the image included in the target area 491 overwritten on and combined with the image (#1) 471 in the position of the target area 491 in the first image memory 220. The image (#1) 471 is deleted from the second image memory 230.

As shown in FIG. 36A, the image combining unit 190 causes the second image memory 230 to store the image (#2) 472 corresponding to a third frame forming the moving image. As shown in FIG. 36B, the image combining unit 190 extracts the image (#2) 472 stored in the second image memory 230. The image combining unit 190 calculates a target area 492 including the image (#") 472 stored in the second image memory 230. The image combining unit 190 extracts an image included in the target area 492 in the combined image including the image (#0) 470 and the image (#1) 471 stored in the first image memory 220. The image combining unit 190 overwrites the image included in the target area 492 extracted from the first image memory 220 on the image (#2) 472 extracted from the second image memory 230 and combines the images. The image combining unit 190 causes the first image memory 220 to store the image included in the target area 492 overwritten on and combined with the image (#2) 472 in the position of the target area 492 in the first image memory 220. The image (#2) 472 is deleted from the second image memory 230.

As shown in FIG. 37A, the image combining unit 190 causes the second image memory 230 to store the image (#3) 473 corresponding to a fourth frame forming the moving image. As shown in FIG. 37B, the image combining unit 190 extracts the image (#3) 473 stored in the second image memory 230. The image combining unit 190 calculates a target area 493 including the image (#3) 473 stored in the second image memory 230. The image combining unit 190 extracts an image included in the target area 493 in combined image including the images (#0) 470 to (#2) 472 stored in the first image memory 220. The image combining unit 190 overwrites the image included in the target area 493 extracted from the first image memory 220 on the image (#3) 473 extracted from the second image memory 230 and combines the images. The image combining unit 190c a uses the first image memory 220 to store the image included in the target area 493 overwritten on and combined with the image (#3) 473 in the position of the target area 493 in the first image memory 220. The image (#3) 473 is deleted from the second image memory 230.

Concerning fifth and subsequent frames forming the moving image, similarly, combined images are created by using the first image memory 220 and the second image memory 230. In this way, after an image corresponding to the present frame is pasted to the second image memory 230, an image included in a target area pasted to the first image memory 220 is extracted. The extracted image is overwritten on and combined with the image corresponding to the present frame. The overwritten and combined image included in the target area is pasted to a target area of the first image memory 220. Therefore, it is possible to perform combination processing from a leading frame toward a later frame on a time axis, overwrite an earlier image on a later image, and combine the images. It is possible to perform image combination processing without extracting all combined images in an image memory to which an image corresponding to the immediately preceding frame of the present frame is pasted. Therefore, it is possible to reduce time necessary for pasting processing and reduce a memory copy amount. It is assumed that a combined image stored in the combined-image storing unit 240 is the combined image stored in the first image memory 220.

Operation Example of the Image Processing Apparatus

Figure 38:
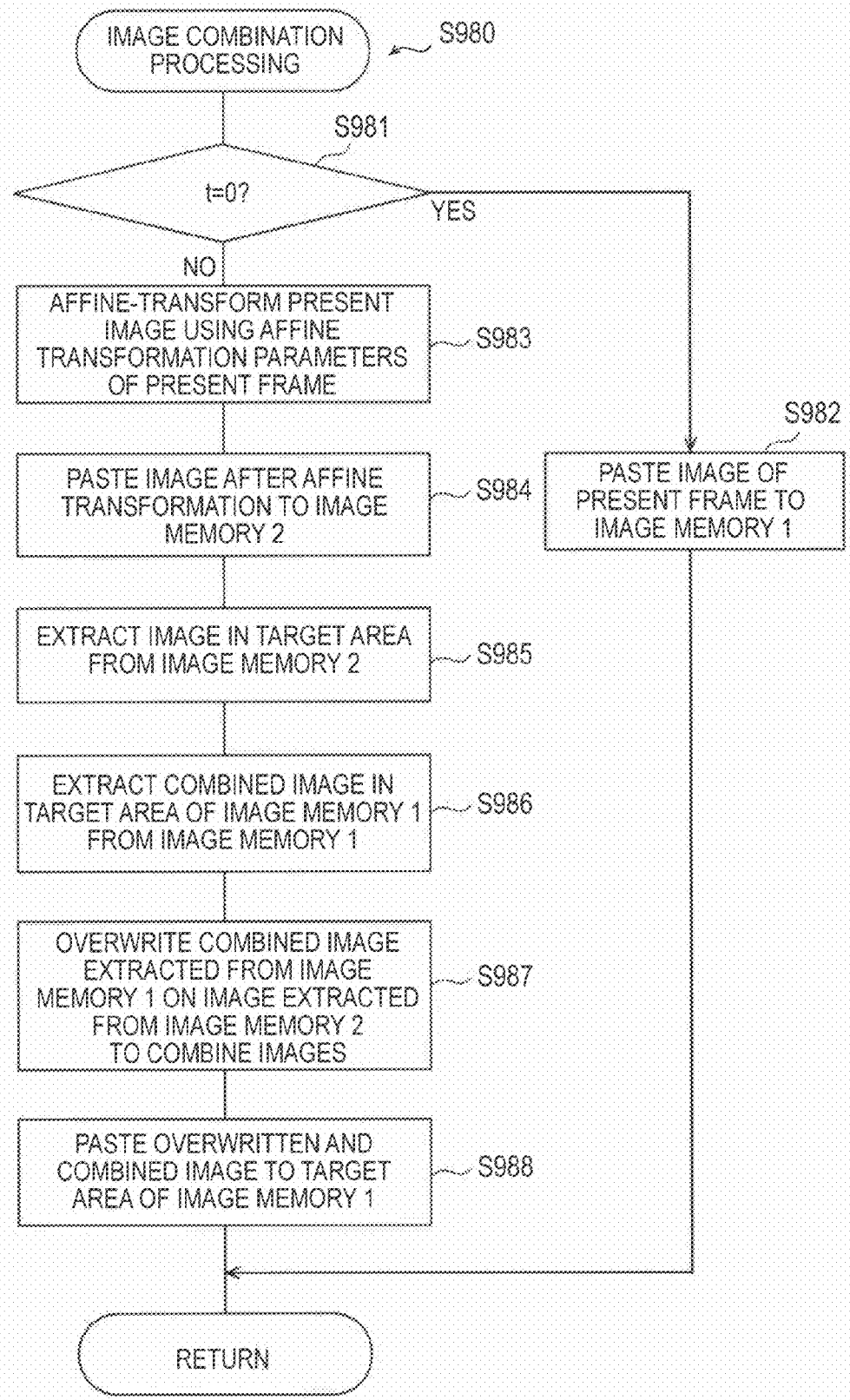
FIG. 38 is a flowchart of a processing procedure of an image combination processing procedure by the image processing apparatus 100 according to the third embodiment.

FIG. 38 is a flowchart of a processing procedure of an image combination processing procedure by the image processing apparatus 100 according to the third embodiment. This example is a modification of the combined image creation processing (the processing procedure in step S940 shown in FIG. 30) according to the first embodiment.

First, it is determined whether the variable "t" is "0" (step S981). When the variable "t" is "0" (Yes in step S981), the image combining unit 190 causes the first image memory 220 to store an image corresponding to the present frame without affine-transforming the image (step S982). In this case, the image corresponding to the present frame is stored in a position where an image corresponding to a leading frame is stored. On the other hand, when the variable "t" is not "0" (No in step S981), the image transforming unit 180 affine-transforms the image corresponding to the present frame using affine transformation parameters corresponding to the present frame (step S983).

Subsequently, the image combining unit 190 causes the second image memory 230 to store the affine-transformed image corresponding to the present frame (step S984). The image combining unit 190 extracts the image (an image in a target area including the image) stored in the second image memory 230 (step S985). The image combining unit 190 extracts the image included in the target area in the combined image stored in the first image memory 220 (step S986). The image combining unit 190 overwrites the image included in the target area extracted from the first image memory 220 on the image extracted from the second image memory 230 and combines the images (step S987). The image combining unit 190 causes the first image memory 220 to store, in the position of the target area in the first image memory 220, the image overwritten and combined with the image included in the target area (step S988). The image extracted from the second image memory 230 is deleted from the second image memory 230. Step S983 is an example of the image transforming procedure described in the appended claims. Steps S984 to S988 are an example of the image combining procedure described in the appended claims.

4. Fourth Embodiment

Functional Configuration Example of an Image Pickup Apparatus

The embodiments of the present invention can be applied to an image pickup apparatus such as a digital video camera that can image a subject and generate a picked-up moving image. An image pickup apparatus including an image pickup unit is explained in detail with reference to the drawings.

FIG. 39 is a block diagram of a functional configuration example of an image pickup apparatus 800 according to a fourth embodiment of the present invention. A functional configuration of the image pickup apparatus 800 is the same as that of the image processing apparatus 100 except that an image pickup unit 810 is provided instead of the moving-image input unit 110 in the image processing apparatus 100 shown in FIG. 1. Therefore, components same as those of the functional configuration of the image processing apparatus 100 are denoted by the same reference numerals and explanation of the components is omitted. The image pickup apparatus 800 includes the image pickup unit 810.

The image pickup unit 810 includes an image pickup device (not shown) and a signal processing unit (not shown) that processes an output signal of the image pickup device and generates a picked-up image (image data). In the image pickup unit 810, an optical image of a subject made incident thereon via a lens (not shown) is focused on an image pickup surface of the image pickup device. The image pickup device performs image pickup operation in this state and the signal processing unit applies signal processing to an image pickup signal, whereby a picked-up moving image is generated. The generated picked-up image is output to the camerawork detecting unit 120.

As explained above, according to the embodiments of the present invention, in viewing a moving image photographed by the image pickup apparatus, it is possible to display a combined image as an icon representing the moving image. Therefore, it is possible to easily grasp contents of moving images. Further, it is possible to display, according to a taste of a user, at least one of a combined image in which an earlier image is overwritten on and combined with a later image and a combined image in which a later image is overwritten on and combined with an earlier image. Therefore, it is possible to improve the interest in a moving image. It is possible to display an appropriate combined image corresponding to content of a moving image as an icon.

In the examples explained in the embodiments, the combined image creation processing is repeated concerning all frames forming a moving image file to create a combined image. However, the combined image creation processing may be repeated concerning at least a fixed number of frames among the frames forming the moving image file to create a combined image.

In the examples explained in the embodiments, plural moving image files are stored in the moving-image storing unit 200 and metadata files corresponding to the moving images are stored in the metadata storing unit 210. However, a moving image and affine transformation parameters corresponding to the moving image may be stored as a moving image file and, during reproduction, the affine transformation parameters may be extracted from the moving image file and used.

In the examples explained in the embodiments, a combined image is displayed on the display unit 260. However, image information for causing the display unit 260 to display the combined image may be output to another image display device to cause the image display device to display the combined image. The combined image may be recorded in a recording medium or the like and used for other reproduction display and the like. The embodiments of the present invention can be applied to a moving image reproducing apparatus such as a television and an image processing apparatus such as a video viewing apparatus that can reproduce a moving image.

The embodiments indicate examples for embodying the present invention and respectively have correspondence relation with claimed elements in the appended claims as explained above. However, the present invention is not limited to the embodiments. Various modifications can be applied to the present invention without departing from the spirit of the present invention.

The processing procedures explained in the embodiments may be grasped as a method having the series of procedures or may be grasped as a computer program for causing a computer to execute the series of procedures or a recording medium that stores the computer program. As the recording medium, for example, a CD (Compact Disc), a MD (Mini-Disc), a DVD (Digital Versatile Disk), a memory card, and a Blu-ray disc (registered trademark) can be used.

The present application contains subject matter related to that disclosed in Japanese Priority Patent Application JP 2008-241925 filed in the Japan Patent Office on Sep. 22, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a first image storing unit that stores a first history image including a first picked-up image forming a picked-up moving image;
   an image transforming unit that transforms a second picked-up image based on transformation information of the first picked-up image and the second picked-up image forming the picked-up moving image located after the first picked-up image on a time axis of the picked-up moving image;
   an image combining unit that causes a second image storing unit different from the first image storing unit to store the transformed second picked-up image, overwrites the first history image stored in the first image storing unit on the transformed second picked-up image stored in the second image storing unit, and combines the first history image and the transformed second picked-up image to create a first combined image; and
   a transformation-information correcting unit that calculates components of motion information based on affine transformation parameters, wherein the transformation-information correcting unit further determines whether or not at least one value of the components of motion information is equal to or larger than a threshold, upon determination by the transformation-information correcting unit that the at least one value is equal or larger than the threshold, the transformation-information correcting unit modifies the affine transformation parameters to a unit matrix and outputs the modified affine transformation parameters to the image transforming unit, and upon determination by the transformation-information correcting unit that the at least one value is not equal or larger than the threshold, the transformation-information correcting unit outputs the affine transformation parameters to the image transforming unit without modification.

2. The image processing apparatus according to claim 1, wherein the image combining unit overwrites the first history image in a position of the second image storing unit corresponding to a storage position of the first history image in the first image storing unit and combines the first history image and the second picked-up image.

3. The image processing apparatus according to claim 1, wherein the first history image is formed by combining a third picked-up image forming the picked-up moving image located before the first picked-up image on the time axis of the picked-up moving image and the first picked-up image, the second image storing unit stores a second history image including the third picked-up image, and the image combining unit overwrites the transformed second picked-up image on the second history image stored in the second image storing unit, combines the second picked-up image and the second history image, and causes the second image storing unit to store a second combined image.

4. The image processing apparatus according to claim 3, wherein the first history image is formed by combining a picked-up image forming the picked-up moving image located before the third picked-up image on the time axis of the picked-up moving image, the first picked-up image, and the third picked-up image, and the image combining unit overwrites an image included in an area including the third picked-up image and the first picked-up image in the first history image stored in the first image storing unit on the second picked-up image stored in the second image storing unit and combines the image and the second picked-up image.

5. The image processing apparatus according to claim 1, wherein the first history image is formed by combining a third picked-up image forming the picked-up moving image located before the first picked-up image on the time axis of the picked-up moving image and the first picked-up image, and the image combining unit deletes the first history image stored in the first image storing unit after overwriting the first history image on the second picked-up image stored in the second image storing unit and after combining the first history image and the second picked-up image.

6. The image processing apparatus according to claim 1, wherein the first history image is formed by combining a third picked-up image forming the picked-up moving image located before the first picked-up image on the time axis of the picked-up moving image and the first picked-up image, and the image combining unit overwrites an image in a target area corresponding to an area including the transformed second picked-up image in the first history image stored in the first image storing unit on the second picked-up image and combines the image and the second picked-up image, causes the first image storing unit to store a third combined image in the target area, and deletes the second picked-up image stored in the second image storing unit.

7. The image processing apparatus according to claim 1, wherein the first picked-up image and the second picked-up image correspond to two continuous frames forming the picked-up moving image, and the image processing apparatus further includes:

a feature-point extracting unit that extracts feature points of the second picked-up image based on pixels forming the second picked-up image;

a shift-amount calculating unit that calculates a shift amount of the second picked-up image with respect to the first picked-up image based on the extracted feature points; and a transformation-information calculating unit that calculates the transformation information based on the calculated shift amount.

8. The image processing apparatus according to claim 1, further comprising:

a display control unit that causes a display unit to display, as a representative image representing the picked-up moving image, the first combined image formed by overwriting the first history image on the second picked-up image and by combining the first history image and the second picked-up image.

9. The image processing apparatus according to claim 1, wherein overlapping areas between the first history image and the second picked in the combined image are created from the first history image or the second picked-up image to remove a portion of one of the second picked-up image and the first history image.

10. The image processing apparatus according to claim 1, wherein the transformation is an affine transformation.

11. The image processing apparatus according to claim 1, further comprising:

a combined-image-division determining unit that determines whether to divide the first combined image and to store the first combined image in a combined-image storing unit.

12. The image processing apparatus according to claim 1, further comprising:

a scene-change determining unit that calculates a scene change score based on a calculated difference value between the first and second picked up images and detects a scene change point between the first and second picked up images based on the scene change score, wherein upon determination that a composition and a color change, and a histogram difference value between the first and second picked up images is equal to or larger than a second threshold, a boundary point between the first and second picked up images is detected as a scene change point.

13. The image processing apparatus according to claim 1, further comprising:

a feature-point extracting unit that extracts feature points from the picked-up moving image;

an optical-flow calculating unit that calculates optical flows corresponding to the feature points output from the feature-point extracting unit; and a camerawork-parameter calculating unit that calculates the transformation information based on the calculated optical flows corresponding to the feature points output from the optical-flow calculating unit.

14. An image pickup apparatus comprising:

an image pickup unit that picks up an image of a subject and generates a picked-up moving image;

a first image storing unit that stores a first history image including a first picked-up image forming the picked-up moving image;

a transformation-information calculating unit that calculates, based on the first picked-up image and a second picked-up image forming the picked-up moving image located after the first picked-up image on a time axis of the picked-up moving image, transformation information of the first picked-up image and the second picked-up image;

an image transforming unit that transforms the second picked-up image based on the calculated transformation information;

an image combining unit that causes a second image storing unit different from the first image storing unit to store the transformed second picked-up image, overwrites the first history image stored in the first image storing unit on the second picked-up image stored in the second image storing unit, and combines the first history image and the second picked-up image to create a first combined image; and a transformation-information correcting unit that calculates components of motion information based on affine transformation parameters, wherein the transformation-information correcting unit further determines whether or not at least one value of components of motion information is equal to or larger than a threshold, upon determination by the transformation-information correcting unit that the at least one value is equal or larger than the threshold, the transformation-information correcting unit modifies the affine transformation parameters to a unit matrix and outputs the modified affine transformation parameters to the image transforming unit, and upon determination by the transformation-information correcting unit that the at least one value is not equal or larger than the threshold, the transformation-information correcting unit outputs the affine transformation parameters to the image transforming unit without modification.

15. An image processing method comprising the steps of:

transforming a second picked-up image based on transformation information of a first picked-up image forming a picked-up moving image picked up by an image pickup apparatus and the second picked-up image forming the picked-up moving image located after the first picked-up image on a time axis of the picked-up moving image;

causing a second image storing unit different from a first image storing unit, which stores a first history image including the first picked-up image, to store the transformed second picked-up image, overwriting the first history image stored in the first image storing unit on the second picked-up image stored in the second image storing unit, and combining the first history image and the second picked-up image to create a first combined image; and calculating components of motion information based on affine transformation parameters, wherein the calculating further includes determining whether or not at least one value of the components of motion information is equal to or larger than a threshold, upon determination by the determining step that the at least one value is equal or larger than the threshold, modifying the affine transformation parameters to a unit matrix and outputting the modified affine transformation parameters to the transforming, and upon determination by the determining step that the at least one value is not equal or larger than the threshold, outputting the affine transformation parameters to the transforming without modification.

16. A non-transitory computer readable storage medium having stored thereon a computer program which when executed on a computer causes the computer to perform a method comprising:

an image transforming procedure for transforming a second picked-up image based on transformation information concerning a first picked-up image forming a picked-up moving image picked up by an image pickup apparatus and the second picked-up image forming the picked-up moving image located after the first picked-up image on a time axis of the picked-up moving image;

an image combining procedure for causing a second image storing unit different from a first image storing unit, which stores a first history image including the first picked-up image, to store the transformed second picked-up image, overwriting the first history image stored in the first image storing unit on the second picked-up image stored in the second image storing unit, and combining the first history image and the second picked-up image to create a first combined image; and a transformation-information correcting procedure for calculating components of motion information based on affine transformation parameters, wherein in the transformation-information correcting procedure further determines whether or not at least one value of the components of motion information is equal to or larger than a threshold, upon determination by transformation-information correcting procedure that the at least one value is equal or larger than the threshold, the transformation-information correcting procedure modifies the affine transformation parameters to a unit matrix and outputs the modified affine transformation parameters to the image transforming procedure, and upon determination by transformation-information correcting procedure that the at least one value is not equal or larger than the threshold, the transformation-information correcting procedure outputs the affine transformation parameters to the image transforming procedure without modification.

* * * * *